United States Patent
Mestres et al.

(10) Patent No.: US 11,494,793 B2
(45) Date of Patent: Nov. 8, 2022

(54) SYSTEMS AND METHODS FOR THE GENERATION, ADMINISTRATION AND ANALYSIS OF CLICK TESTING

(71) Applicant: USERZOOM TECHNOLOGIES, INC., Dover, DE (US)

(72) Inventors: Xavier Mestres, Barcelona (ES); Alfonso de la Nuez, San Jose, CA (US); Albert Recolons, Barcelona (ES); Francesc del Castillo, Barcelona (ES); Jordi Ibañez, Barcelona (ES); Anna Barba, Barcelona (ES); Andrew Jensen, San Jose, CA (US)

(73) Assignee: USERZOOM TECHNOLOGIES, INC., Dover, DE (US)

( * ) Notice: Subject to any disclaimer, the term of this patent is extended or adjusted under 35 U.S.C. 154(b) by 263 days.

(21) Appl. No.: 16/861,083

(22) Filed: Apr. 28, 2020

(65) Prior Publication Data
US 2020/0320558 A1 Oct. 8, 2020

Related U.S. Application Data

(63) Continuation-in-part of application No. 16/730,954, filed on Dec. 30, 2019, now Pat. No. 11,068,374, and
(Continued)

(51) Int. Cl.
*G06Q 30/02* (2012.01)
*G06F 3/0482* (2013.01)
(Continued)

(52) U.S. Cl.
CPC ....... *G06Q 30/0203* (2013.01); *G06F 3/0482* (2013.01); *G06F 3/04845* (2013.01); *G06F 16/50* (2019.01)

(58) Field of Classification Search
CPC .............. G06Q 30/0203; G06F 3/0482; G06F 3/04845; G06F 16/50
See application file for complete search history.

(56) References Cited

U.S. PATENT DOCUMENTS

| 4,845,665 A | 7/1989 | Heath et al. |
| 5,086,393 A | 2/1992 | Kerr |

(Continued)

FOREIGN PATENT DOCUMENTS

WO    WO 2001024057    4/2001

OTHER PUBLICATIONS

User-Centred Library Websites: Usability Evaluation Methods by Carole George, Edition:2008.
(Continued)

*Primary Examiner* — Michael A Keller
(74) *Attorney, Agent, or Firm* — Kang S. Lim

(57) ABSTRACT

Systems and methods for generating, administering and analyzing a click test study are provided. This includes uploading a static image and selecting portions of the static image as answers. The study author also generates a prompt for a participant, which is then presented, along with the static image. The participant then clicks with a cursor, or other selection mechanism, and the selection location(s) are recorded. Delay between the prompt display and the click is measuring in some embodiments. The recorded clicks are used to generate a heat map when aggregated with the results of other users. Likewise, the at least one click location may be compared to the selected portions to generate success metrics. In addition to the regular heat map, a high-contrast negative image heat map may likewise be generated.

23 Claims, 58 Drawing Sheets

Related U.S. Application Data a continuation-in-part of application No. 16/730,957, filed on Dec. 30, 2019, and a continuation-in-part of application No. 13/112,792, filed on May 20, 2011, now Pat. No. 10,691,583, said application No. 16/730,957 is a continuation-in-part of application No. 16/163,913, filed on Oct. 18, 2018, now abandoned, said application No. 16/730,954 is a continuation-in-part of application No. 16/163,913, filed on Oct. 18, 2018, now abandoned.

(60) Provisional application No. 62/841,165, filed on Apr. 30, 2019, provisional application No. 62/799,646, filed on Jan. 31, 2019, provisional application No. 61/348,431, filed on May 26, 2010.

(51) Int. Cl.
 G06F 16/50 (2019.01)
 G06F 3/04845 (2022.01)

(56) References Cited

U.S. PATENT DOCUMENTS

| | | | |
|---|---|---|---|
| 5,220,658 A | 6/1993 | Kerr | |
| 5,724,262 A | 3/1998 | Ghahramani | |
| 5,808,908 A | 9/1998 | Ghahramani | |
| 6,237,138 B1 | 5/2001 | Hameluck | |
| 6,526,526 B1 | 2/2003 | Dong | |
| 6,738,082 B1 | 5/2004 | Dong et al. | |
| 6,859,784 B1 | 2/2005 | van Duyne et al. | |
| 6,895,437 B1 | 5/2005 | Cowdrey | |
| 7,222,078 B2 | 5/2007 | Abelow | |
| 7,433,874 B1 | 10/2008 | Wolfe | |
| 7,587,484 B1 | 9/2009 | Smith | |
| 7,941,525 B1 | 5/2011 | Yavilevich | |
| 8,892,543 B1 | 11/2014 | Kapoor | |
| 2001/0049084 A1 | 12/2001 | Mitry | |
| 2002/0143931 A1 | 10/2002 | Smith | |
| 2002/0178163 A1 | 11/2002 | Mayer | |
| 2002/0194053 A1 | 12/2002 | Barrett | |
| 2002/0196277 A1 | 12/2002 | Bushey | |
| 2003/0046057 A1 | 3/2003 | Okunishi | |
| 2004/0015867 A1 | 1/2004 | MacKo | |
| 2004/0177002 A1 | 9/2004 | Abelow | |
| 2005/0254775 A1 | 11/2005 | Hamilton | |
| 2006/0184917 A1 | 8/2006 | Troan | |
| 2007/0106641 A1 | 5/2007 | Chi | |
| 2007/0209010 A1 | 9/2007 | West | |
| 2008/0313149 A1 | 12/2008 | Li | |
| 2008/0313617 A1 | 12/2008 | Zhu | |
| 2008/0313633 A1 | 12/2008 | Zhu | |
| 2009/0138292 A1 | 5/2009 | Dusi | |
| 2009/0204573 A1 | 8/2009 | Neuneier | |
| 2009/0271788 A1 | 10/2009 | Holt | |
| 2009/0281819 A1 | 11/2009 | Garg | |
| 2009/0281852 A1 | 11/2009 | Abhari et al. | |
| 2010/0030792 A1 | 2/2010 | Swinton et al. | |
| 2010/0095208 A1 | 4/2010 | White et al. | |
| 2010/0251291 A1 | 9/2010 | Pino, Jr. et al. | |
| 2011/0166884 A1 | 7/2011 | Lesselroth | |
| 2011/0314092 A1 | 12/2011 | Lunt et al. | |
| 2012/0078660 A1 | 3/2012 | Mangicaro | |
| 2012/0131476 A1 | 5/2012 | Mestres | |
| 2012/0210209 A1 | 8/2012 | Biddle | |
| 2013/0132833 A1 | 5/2013 | White | |
| 2013/0254735 A1 | 9/2013 | Sakhardande | |
| 2014/0052853 A1* | 2/2014 | Mestres | G06F 11/3688 709/224 |
| 2014/0189054 A1 | 7/2014 | Snider et al. | |
| 2016/0217481 A1 | 7/2016 | Pastore | |
| 2016/0360382 A1* | 12/2016 | Gross | G06F 3/04186 |
| 2017/0228745 A1 | 8/2017 | Garcia et al. | |
| 2017/0278417 A1* | 9/2017 | Ur | G09B 7/06 |
| 2018/0241882 A1* | 8/2018 | Lee | G06V 40/172 |
| 2019/0123989 A1 | 4/2019 | Mestres et al. | |

OTHER PUBLICATIONS

Richard Atterer, Monika Wnuk, and Albrecht Schmidt (Knowing the User's Every Move—User Activity Tracking for Website Usability Evaluation and Implicit Interaction, International World Wide Web Conference Committee, May 23-26, 2006, Edinburgh, Scotland). (Year:2006).

Jason I. Hong, Jeffrey Heer, Sarah Waterson, and James A. Landay (WebQuilt: a Proxy-based Approach to Remote Web Usability Testing, ACM Transactions on Information Systems, vol. 19, No. 3, Jul. 2001, pp. 263-285). (Year: 2001).

Non-Final Office Action for U.S. Appl. No. 13/112,792 dated Aug. 1, 2014, 41 pages.

ISA/US, "Notification of Transmittal of the ISR and the Written Opinion of the International Searching Authority, or the Declaration," in PCT Application No. PCT/US2020/012218, dated May 28, 2020, 9 pages.

ISA/US, "Notification of Transmittal of the ISR and the Written Opinion of the International Searching Authority, or the Declaration," in PCT Application No. PCT/US2020/030558, dated Oct. 9, 2020, 11 pages.

\* cited by examiner

SYSTEMS AND METHODS FOR THE GENERATION, ADMINISTRATION AND ANALYSIS OF CLICK TESTING

CROSS REFERENCE TO RELATED APPLICATIONS

This application is a continuation-in-part application and claims priority to U.S. application Ser. No. 13/112,792, filed on May 20, 2011, entitled "System and Method for Unmoderated Remote User Testing and Card Sorting", which application claims priority to U.S. Provisional Application No. 61/348,431, filed on May 26, 2010, of the same title, by inventors Mestres et al.

This continuation-in-part application also claims the priority of U.S. application Ser. No. 16/730,954, (Title: Generation, Administration and Analysis of User Experience Testing) and Ser. No. 16/730,957, (Title: Advanced Analysis of Online User Experience Studies), both filed on Dec. 30, 2019, by inventors Mestres et al., which both claim the priority of U.S. Provisional Application No. 62/799,646, filed on Jan. 31, 2019, entitled "Systems and Methods for the Generation, Administration and Analysis of User Experience Testing", by inventors Mestres et al. Also, both U.S. application Ser. Nos. 16/730,954 and 16/730,957 claim priority as continuation-in-part applications to U.S. application Ser. No. 16/163,913, filed on Oct. 18, 2018, entitled "Unmoderated Remote User Testing and Card Sorting", by inventors Mestres et al.

This Non-Provisional and continuation-in-part application additionally claims priority to U.S. Provisional Application No. 62/841,165, filed on Apr. 30, 2019, of the same title, by inventors Mestres et al.

Lastly, this continuation-in-part application is related to co-pending Non-Provisional U.S. application Ser. No. 16/860,653, filed on Apr. 28, 2020, entitled "Systems and Methods for Improvements to User Experience Testing" by inventors Mestres et al.

All of the above-listed applications are incorporated herein in their entirety by this reference.

BACKGROUND

The present invention relates to systems and methods for the generation of studies that allow for insight generation for the usability of a website. Generally, this type of testing is referred to as "User Experience" or merely "UX" testing. In particular, attention will be focused upon a test known as a "click test", which tracks user activity when asked a prompt.

The Internet provides new opportunities for business entities to reach customers via web sites that promote and describe their products or services. Often, the appeal of a web site and its ease of use may affect a potential buyer's decision to purchase the product/service.

Especially as user experiences continue to improve and competition online becomes increasingly aggressive, the ease of use by a particular retailer's website may have a material impact upon sales performance. Unlike a physical shopping experience, there is minimal hurdles to a user going to a competitor for a similar service or good. Thus, in addition to traditional motivators (e.g., competitive pricing, return policies, brand reputation, etc.) the ease of a website to navigate is of paramount importance to a successful online presence.

As such, assessing the appeal, user friendliness, and effectiveness of a web site is of substantial value to marketing managers, web site designers and user experience specialists; however, this information is typically difficult to obtain. Focus groups are sometimes used to achieve this goal but the process is long, expensive and not reliable, in part, due to the size and demographics of the focus group that may not be representative of the target customer base.

In more recent years advances have been made in the automation and implementation of mass online surveys for collecting user feedback information. Typically these systems include survey questions, or potentially a task on a website followed by feedback requests. While such systems are useful in collecting some information regarding user experiences, the studies often suffer from biases in responses, and limited types of feedback collected.

It is therefore apparent that an urgent need exists for advancements in the generation, implementation and analysis of studies into user experiences. Such systems and methods allow for improvements in web site design, marketing and brand management.

SUMMARY

To achieve the foregoing and in accordance with the present invention, systems and methods for generating, administering and analyzing a click test study are provided. This enables the efficient generation of insights regarding the user experience so that the experience can be changed to improve the customer or user experience.

In some embodiments, the system and methods includes uploading a static image and selecting portions of the static image as answers. The study author also generates a prompt for a participant, which is then presented, along with the static image. The participant then clicks with a cursor, or other selection mechanism, and the selection location(s) are recorded. Delay between the prompt display and the click is measuring in some embodiments. In some cases the prompt is a question or instruction, such as an instruction to navigate to a particular goal.

The recorded clicks are used to generate a heat map when aggregated with the results of other users. In some cases, only frequency of the clicks corresponds to the darkness of the heat map illustration. Other times, the delay may likewise alter the heat map intensity (with shorter delay resulting in greater heat map intensity). Likewise, the at least one click location may be compared to the selected portions to generate success metrics. In addition to the regular heat map, a high-contrast negative image heat map may likewise be generated.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIGS. 28-37 are example illustrations of task setting for the click test, in accordance with some embodiment;

DETAILED DESCRIPTION

Figure 1A:
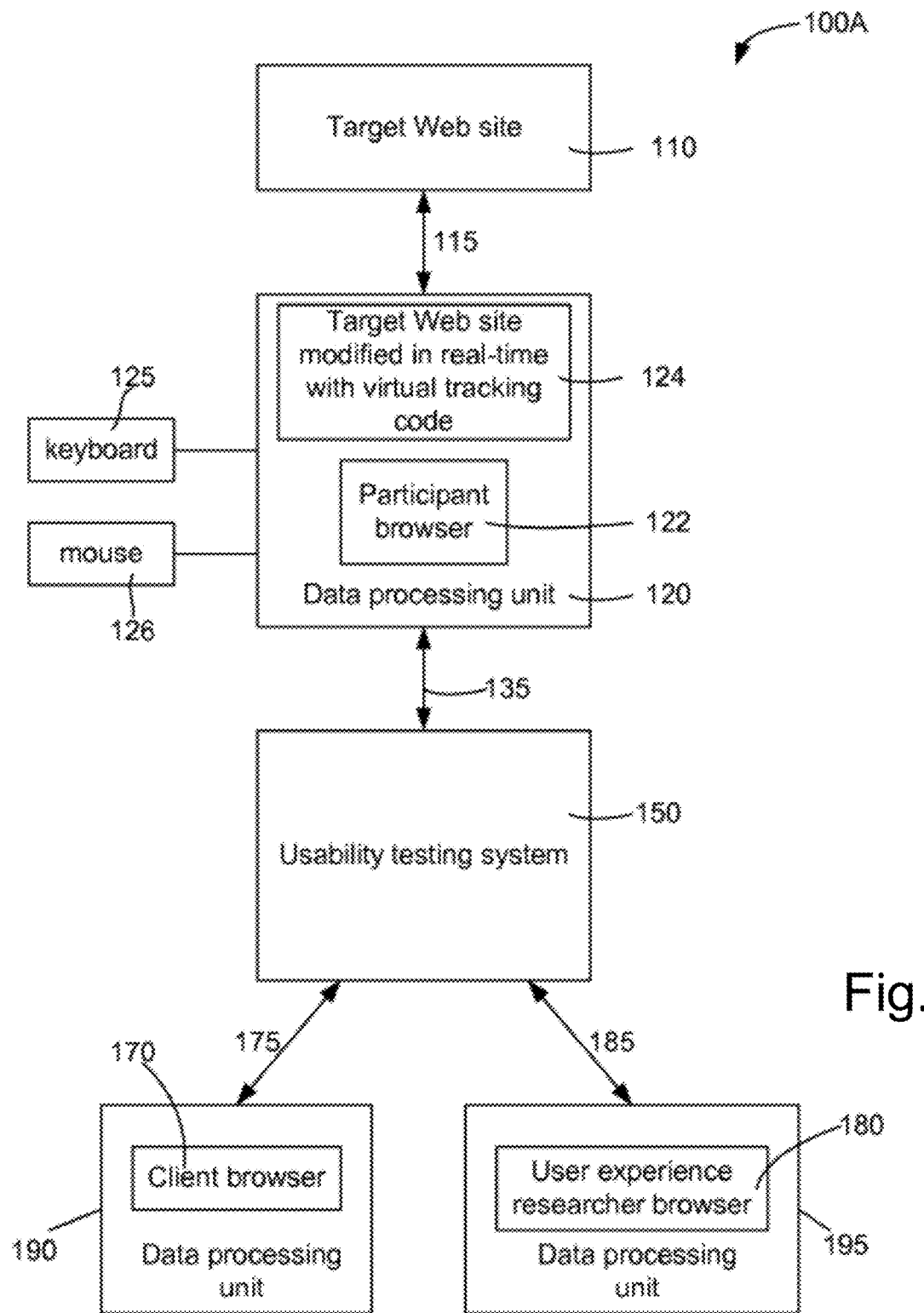
FIG. 1A is an example logical diagram of a system for user experience studies, in accordance with some embodiment.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The present invention relates to enhancements to traditional user experience testing and subsequent insight generation. While such systems and methods may be utilized with any user experience environment, embodiments described in greater detail herein are directed to providing insights into user experiences in an online/webpage environment. Some descriptions of the present systems and methods will also focus nearly exclusively upon the user experience within a retailer's website. This is intentional in order to provide a clear use case and brevity to the disclosure, however it should be noted that the present systems and methods apply equally well to any situation where a user experience in an online platform is being studied. As such, the focus herein on a retail setting is in no way intended to artificially limit the scope of this disclosure.

The following description of some embodiments will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

The following systems and methods are particularly for improvements in click testing studies. These studies prompt a user to complete a task, and record the clicks/paths taken by the user to complete the task. These studies provide information regarding user's initial reaction to a webpage or similar computer interface.

In the following it is understood that the term usability refers to a metric scoring value for judging the ease of use of a target web site. A client refers to a sponsor who initiates and/or finances the usability study. The client may be, for example, a marketing manager who seeks to test the usability of a commercial web site for marketing (selling or advertising) certain products or services. Participants or users may be a selected group of people who participate in the usability study and may be screened based on a predetermined set of questions. Remote usability testing or remote usability study refers to testing or study in accordance with which participants (referred to use their computers, mobile devices or otherwise) access a target web site in order to provide feedback about the web site's ease of use, connection speed, and the level of satisfaction the participant experiences in using the web site. Unmoderated usability testing refers to communication with test participants without a moderator, e.g., a software, hardware, or a combined software/hardware system can automatically gather the participants' feedback and records their responses. The system can test a target web site by asking participants to view the web site, perform test tasks, and answer questions associated with the tasks (known as a click test study).

To facilitate the discussion, FIG. 1 is a simplified block diagram of a user testing platform 100A according to an embodiment. Platform 100A is adapted to test a target web site 110. Platform 100A is shown as including a usability testing system 150 that is in communications with data processing units 120, 190 and 195. Data processing units 120, 190 and 195 may be a personal computer equipped with a monitor, a handheld device such as a tablet PC, an electronic notebook, a wearable device such as a cell phone, or a smart phone.

Data processing unit 120 includes a browser 122 that enables a user (e.g., usability test participant) using the data processing unit 120 to access target web site 110. Data processing unit 120 includes, in part, an input device such as a keyboard 125 or a mouse 126, and a participant browser 122. In one embodiment, data processing unit 120 may insert a virtual tracking code to target web site 110 in real-time while the target web site is being downloaded to the data processing unit 120. The virtual tracking code may be a proprietary JavaScript code, whereby the run-time data processing unit interprets the code for execution. The tracking code collects participants' activities on the downloaded web page such as the number of clicks, key strokes, keywords, scrolls, time on tasks, and the like over a period of time. Data processing unit 120 simulates the operations performed by the tracking code and is in communication with usability testing system 150 via a communication link 135. Communication link 135 may include a local area network, a metropolitan area network, and a wide area network. Such a communication link may be established through a physical wire or wirelessly. For example, the communication link may be established using an Internet protocol such as the TCP/IP protocol.

Activities of the participants associated with target web site 110 are collected and sent to usability testing system 150 via communication link 135. In one embodiment, data processing unit 120 may instruct a participant to perform predefined tasks on the downloaded web site during a usability test session, in which the participant evaluates the web site based on a series of usability tests. The virtual tracking code (e.g., a proprietary JavaScript) may record the participant's responses (such as the number of mouse clicks) and the time spent in performing the predefined tasks. The usability testing may also include gathering performance data of the target web site such as the ease of use, the connection speed, the satisfaction of the user experience. Because the web page is not modified on the original web site, but on the downloaded version in the participant data processing unit, the usability can be tested on any web sites including competitions' web sites.

Data collected by data processing unit 120 may be sent to the usability testing system 150 via communication link 135. In an embodiment, usability testing system 150 is further accessible by a client via a client browser 170 running on data processing unit 190. Usability testing system 150 is further accessible by user experience researcher browser 180 running on data processing unit 195. Client browser 170 is shown as being in communications with usability testing system 150 via communication link 175. User experience research browser 180 is shown as being in communications with usability testing system 150 via communications link 185. A client and/or user experience researcher may design one or more sets of questionnaires for screening participants and for testing the usability of a web site. Usability testing system 150 is described in detail below.

Figure 1B:
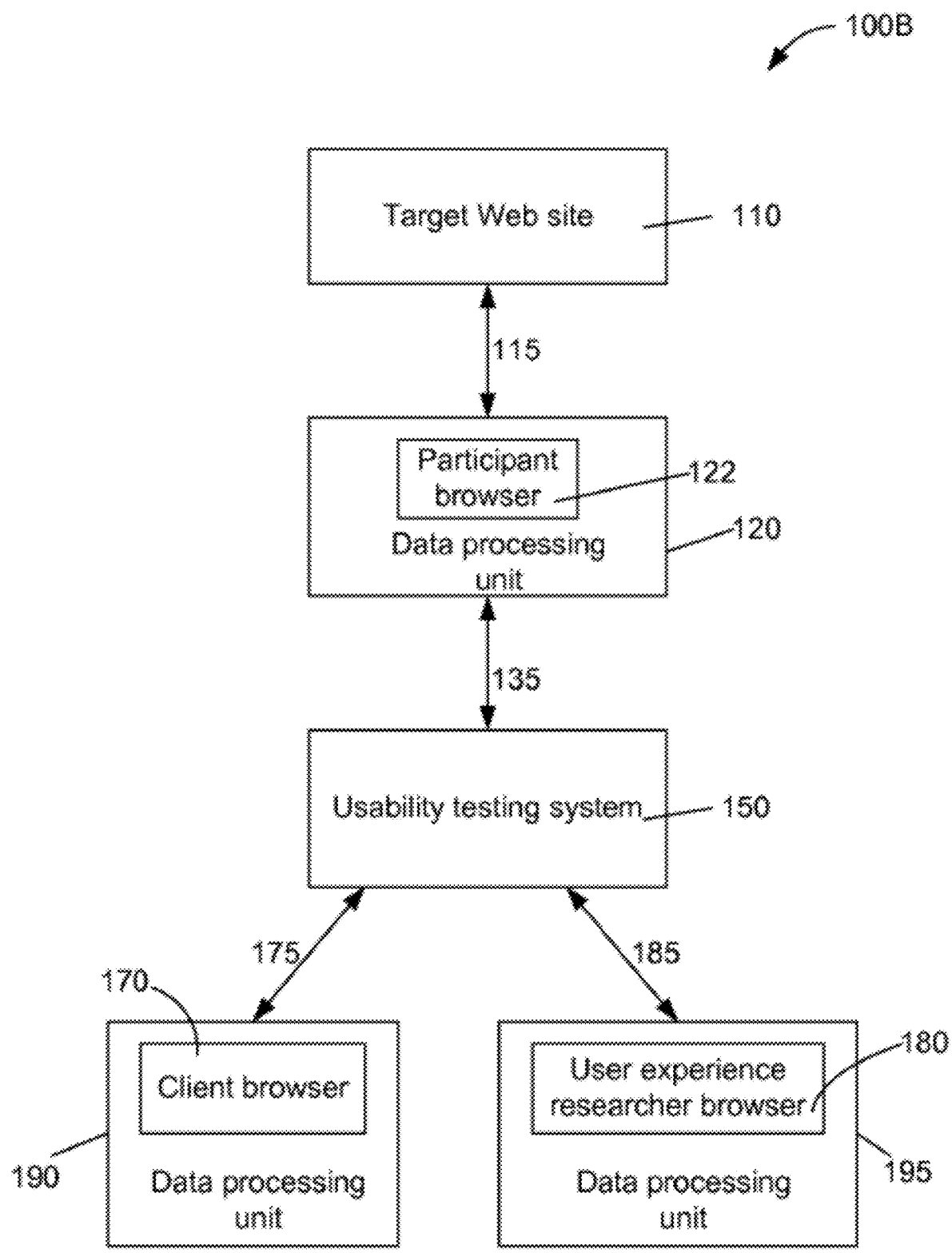
FIG. 1B is a second example logical diagram of a system for user experience studies, in accordance with some embodiment.

FIG. 1B is a simplified block diagram of a user testing platform 100B according to another embodiment of the present invention. Platform 100B is shown as including a target web site 110 being tested by one or more participants using a standard web browser 122 running on data processing unit 120 equipped with a display. Participants may communicate with a usability test system 150 via a communication link 135. Usability test system 150 may communicate with a client browser 170 running on a data processing unit 190. Likewise, usability test system 150 may communicate with user experience researcher browser running on data processing unit 195. Although a data processing unit is illustrated, one of skill in the art will appreciate that data processing unit 120 may include a configuration of multiple single-core or multi-core processors configured to process instructions, collect usability test data (e.g., number of clicks, mouse movements, time spent on each web page, connection speed, and the like), store and transmit the collected data to the usability testing system, and display graphical information to a participant via an input/output device (not shown).

Figure 1C:
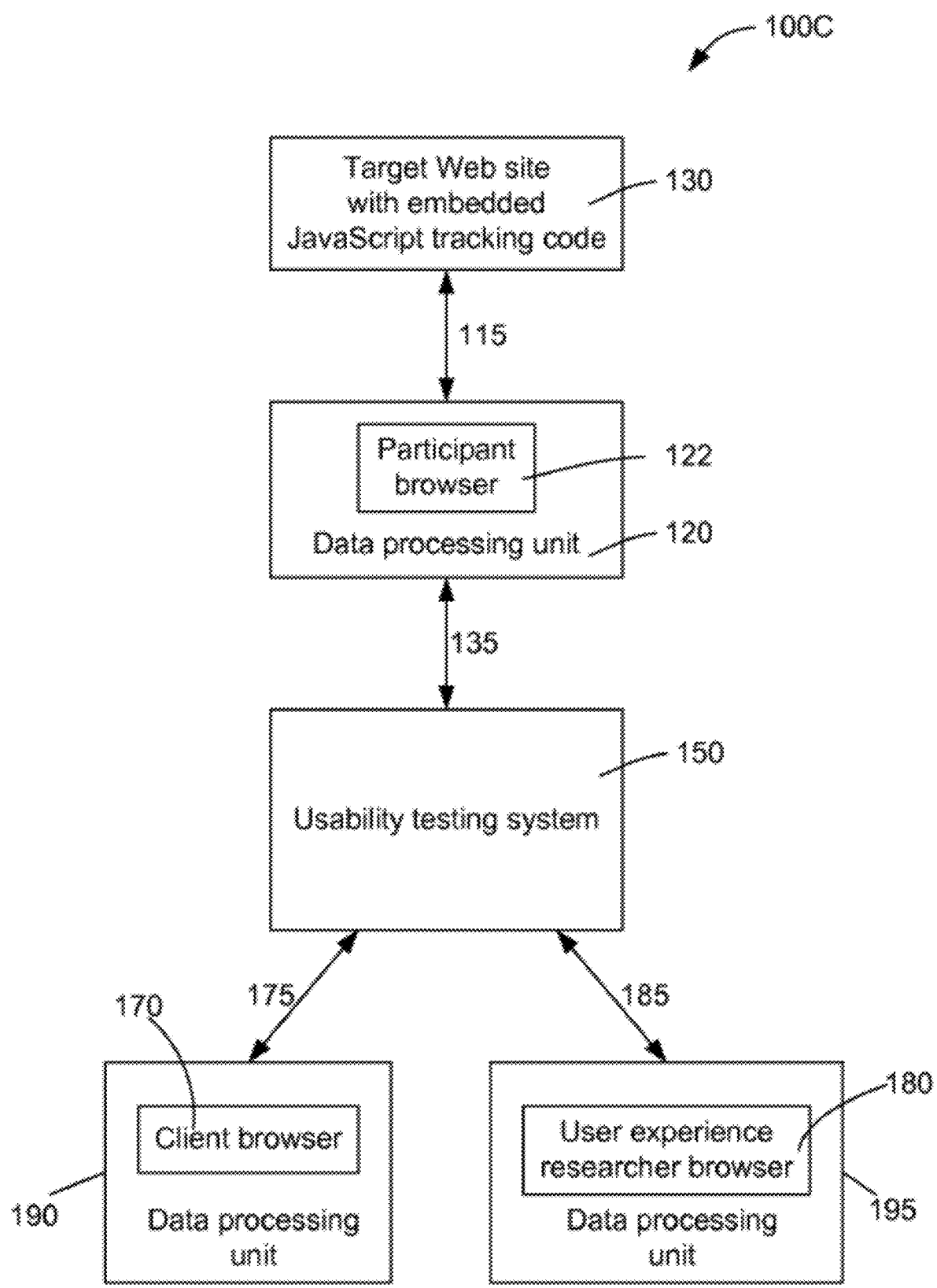
FIG. 1C is a third example logical diagram of a system for user experience studies, in accordance with some embodiment.

FIG. 1C is a simplified block diagram of a user testing platform 100C according to yet another embodiment of the present invention. Platform 100C is shown as including a target web site 130 being tested by one or more participants using a standard web browser 122 running on data processing unit 120 having a display. The target web site 130 is shown as including a tracking program code configured to track actions and responses of participants and send the tracked actions/responses back to the participant's data processing unit 120 through a communication link 115. Communication link 115 may be computer network, a virtual private network, a local area network, a metropolitan area network, a wide area network, and the like. In one embodiment, the tracking program is a JavaScript configured to run tasks related to usability testing and sending the test/study results back to participant's data processing unit for display. Such embodiments advantageously enable clients using client browser 170 as well as user experience researchers using user experience research browser 180 to design mockups or prototypes for usability testing of variety of web site layouts. Data processing unit 120 may collect data associated with the usability of the target web site and send the collected data to the usability testing system 150 via a communication link 135.

In one exemplary embodiment, the testing of the target web site (page) may provide data such as ease of access through the Internet, its attractiveness, ease of navigation, the speed with which it enables a user to complete a transaction, and the like. In another exemplary embodiment, the testing of the target web site provides data such as duration of usage, the number of keystrokes, the user's profile, and the like. It is understood that testing of a web site in accordance with embodiments of the present invention can provide other data and usability metrics. Information collected by the participant's data processing unit is uploaded to usability testing system 150 via communication link 135 for storage and analysis.

Figure 2:
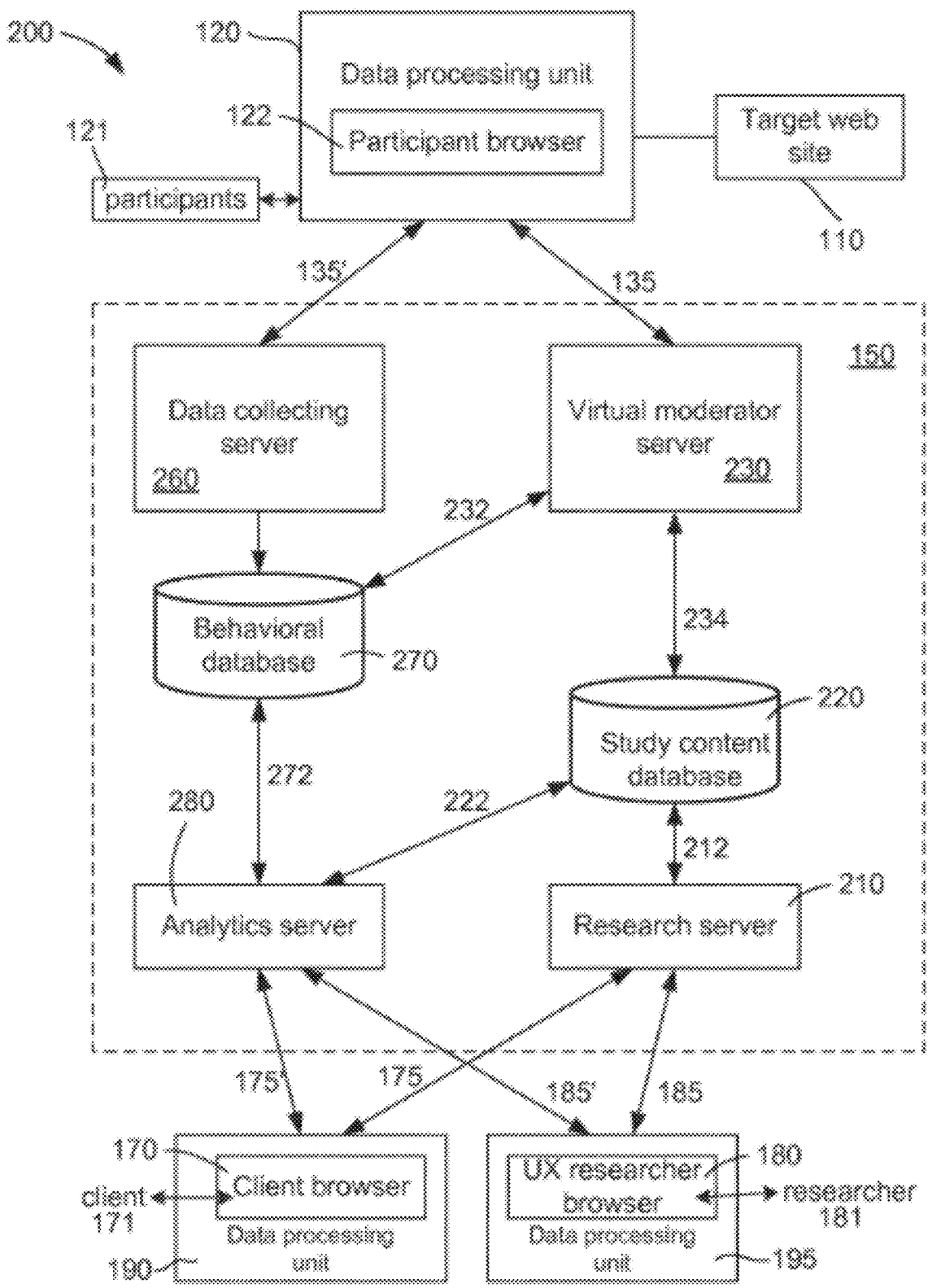
FIG. 2 is an example logical diagram of the usability testing system, in accordance with some embodiment.

FIG. 2 is a simplified block diagram of an exemplary embodiment platform 200 according to one embodiment of the present invention. Platform 200 is shown as including, in part, a usability testing system 150 being in communications with a data processing unit 125 via communications links 135 and 135'. Data processing unit 125 includes, in part, a participant browser 120 that enables a participant to access a target web site 110. Data processing unit 125 may be a personal computer, a handheld device, such as a cell phone, a smart phone or a tablet PC, or an electronic notebook. Data processing unit 125 may receive instructions and program codes from usability testing system 150 and display predefined tasks to participants 120. The instructions and program codes may include a web-based application that instructs participant browser 122 to access the target web site 110. In one embodiment, a tracking code is inserted to the target web site 110 that is being downloaded to data processing unit 125. The tracking code may be a JavaScript code that collects participants' activities on the downloaded target web site such as the number of clicks, key strokes, movements of the mouse, keywords, scrolls, time on tasks and the like performed over a period of time.

Data processing unit 125 may send the collected data to usability testing system 150 via communication link 135' which may be a local area network, a metropolitan area network, a wide area network, and the like and enable usability testing system 150 to establish communication with data processing unit 125 through a physical wire or wirelessly using a packet data protocol such as the TCP/IP protocol or a proprietary communication protocol.

Usability testing system 150 includes a virtual moderator software module running on a virtual moderator server 230 that conducts interactive usability testing with a usability test participant via data processing unit 125 and a research module running on a research server 210 that may be connected to a user research experience data processing unit 195. User experience researcher 181 may create tasks relevant to the usability study of a target web site and provide the created tasks to the research server 210 via a communication link 185. One of the tasks may be a set of questions designed to classify participants into different categories or to prescreen participants. Another task may be, for example, a set of questions to rate the usability of a target web site based on certain metrics such as ease of navigating the web site, connection speed, layout of the web page, ease of finding the products (e.g., the organization of product indexes). Yet another task may be a survey asking participants to press a "yes" or "no" button or write short comments about participants' experiences or familiarity with certain products and their satisfaction with the products. All these tasks can be stored in a study content database 220, which can be retrieved by the virtual moderator module running on virtual moderator server 230 to forward to participants 120. Research module running on research server 210 can also be accessed by a client (e.g., a sponsor of the usability test) 171 who, like user experience researchers 181, can design her own questionnaires since the client has a personal interest to the target web site under study. Client 171 can work together with user experience researchers 181 to create tasks for usability testing. In an embodiment, client 171 can modify tasks or lists of questions stored in the study content database 220. In another embodiment, client 171 can add or delete tasks or questionnaires in the study content database 220. In yet another embodiment, client 171 may be user experience researcher 181.

In some embodiment, one of the tasks may be open or closed card sorting studies for optimizing the architecture and layout of the target web site. Card sorting is a technique that shows how online users organize content in their own mind. In an open card sort, participants create their own names for the categories. In a closed card sort, participants are provided with a predetermined set of category names. Client 171 and/or user experience researcher 181 can create proprietary online card sorting tool that executes card sorting exercises over large groups of participants in a rapid and cost-effective manner. In an embodiment, the card sorting exercises may include up to 100 items to sort and up to 12 categories to group. One of the tasks may include categorization criteria such as asking participants questions "why do you group these items like this?." Research module on research server 210 may combine card sorting exercises and online questionnaire tools for detailed taxonomy analysis. In an embodiment, the card sorting studies are compatible with SPSS applications.

In an embodiment, the card sorting studies can be assigned randomly to participant 120. User experience (UX) researcher 181 and/or client 171 may decide how many of those card sorting studies each participant is required to complete. For example, user experience researcher 181 may create a card sorting study within 12 tasks, group them in 4 groups of 3 tasks and manage that each participant just has to complete one task of each group.

After presenting the thus created tasks to participants 120 through virtual moderator module (running on virtual moderator serer 230) and communication link 135, the actions/responses of participants will be collected in a data collecting module running on a data collecting server 260 via a communication link 135'. In an embodiment, communication link 135' may be a distributed computer network and share the same physical connection as communication link 135. This is, for example, the case where data collecting module 260 locates physically close to virtual moderator module 230, or if they share the usability testing system's processing hardware. In the following description, software modules running on associated hardware platforms will have the same reference numerals as their associated hardware platform. For example, virtual moderator module will be assigned the same reference numeral as the virtual moderator server 230, and likewise data collecting module will have the same reference numeral as the data collecting server 260.

Data collecting module 260 may include a sample quality control module that screens and validates the received responses, and eliminates participants who provide incorrect responses, or do not belong to a predetermined profile, or do not qualify for the study. Data collecting module 260 may include a "binning" module that is configured to classify the validated responses and stores them into corresponding categories in a behavioral database 270.

Merely as an example, responses may include gathered web site interaction events such as clicks, keywords, URLs, scrolls, time on task, navigation to other web pages, and the like. In one embodiment, virtual moderator server 230 has access to behavioral database 270 and uses the content of the behavioral database to interactively interface with participants 120. Based on data stored in the behavioral database, virtual moderator server 230 may direct participants to other pages of the target web site and further collect their interaction inputs in order to improve the quantity and quality of the collected data and also encourage participants' engagement. In one embodiment, virtual moderator server may eliminate one or more participants based on data collected in the behavioral database. This is the case if the one or more participants provide inputs that fail to meet a predetermined profile.

Usability testing system 150 further includes an analytics module 280 that is configured to provide analytics and reporting to queries coming from client 171 or user experience (UX) researcher 181. In an embodiment, analytics module 280 is running on a dedicated analytics server that offloads data processing tasks from traditional servers. Analytics server 280 is purpose-built for analytics and reporting and can run queries from client 171 and/or user experience researcher 181 much faster (e.g., 100 times faster) than conventional server system, regardless of the number of clients making queries or the complexity of queries. The purpose-built analytics server 280 is designed for rapid query processing and ad hoc analytics and can deliver higher performance at lower cost, and, thus provides a competitive advantage in the field of usability testing and reporting and allows a company such as UserZoom (or Xperience Consulting, SL) to get a jump start on its competitors.

In an embodiment, research module 210, virtual moderator module 230, data collecting module 260, and analytics server 280 are operated in respective dedicated servers to provide higher performance. Client (sponsor) 171 and/or user experience research 181 may receive usability test reports by accessing analytics server 280 via respective links 175' and/or 185'. Analytics server 280 may communicate with behavioral database via a two-way communication link 272.

In an embodiment, study content database 220 may include a hard disk storage or a disk array that is accessed via iSCSI or Fibre Channel over a storage area network. In an embodiment, the study content is provided to analytics server 280 via a link 222 so that analytics server 280 can retrieve the study content such as task descriptions, question texts, related answer texts, products by category, and the like, and generate together with the content of the behavioral database 270 comprehensive reports to client 171 and/or user experience researcher 181.

Shown in FIG. 2 is a connection 232 between virtual moderator server 230 and behavioral database 270. Behavioral database 270 can be a network attached storage server or a storage area network disk array that includes a two-way communication via link 232 with virtual moderator server 230. Behavioral database 270 is operative to support virtual moderator server 230 during the usability testing session. For example, some questions or tasks are interactively presented to the participants based on data collected. It would be advantageous to the user experience researcher to set up specific questions that enhance the usability testing if participants behave a certain way. If a participant decides to go to a certain web page during the study, the virtual moderator server 230 will pop up corresponding questions related to that page; and answers related to that page will be received and screened by data collecting server 260 and categorized in behavioral database server 270. In some embodiments, virtual moderator server 230 operates together with data stored in the behavioral database to proceed to the next steps. Virtual moderator server, for example, may need to know whether a participant has successfully completed a task, or based on the data gathered in behavioral database 270, present another tasks to the participant.

Referring still to FIG. 2, client 171 and user experience researcher 181 may provide one or more sets of questions associated with a target web site to research server 210 via respective communication link 175 and 185. Research server 210 stores the provided sets of questions in a study content database 220 that may include a mass storage device, a hard disk storage or a disk array being in communication with research server 210 through a two-way interconnection link 212. The study content database may interface with virtual moderator server 230 through a communication link 234 and provides one or more sets of questions to participants via virtual moderator server 230.

Figure 3A:
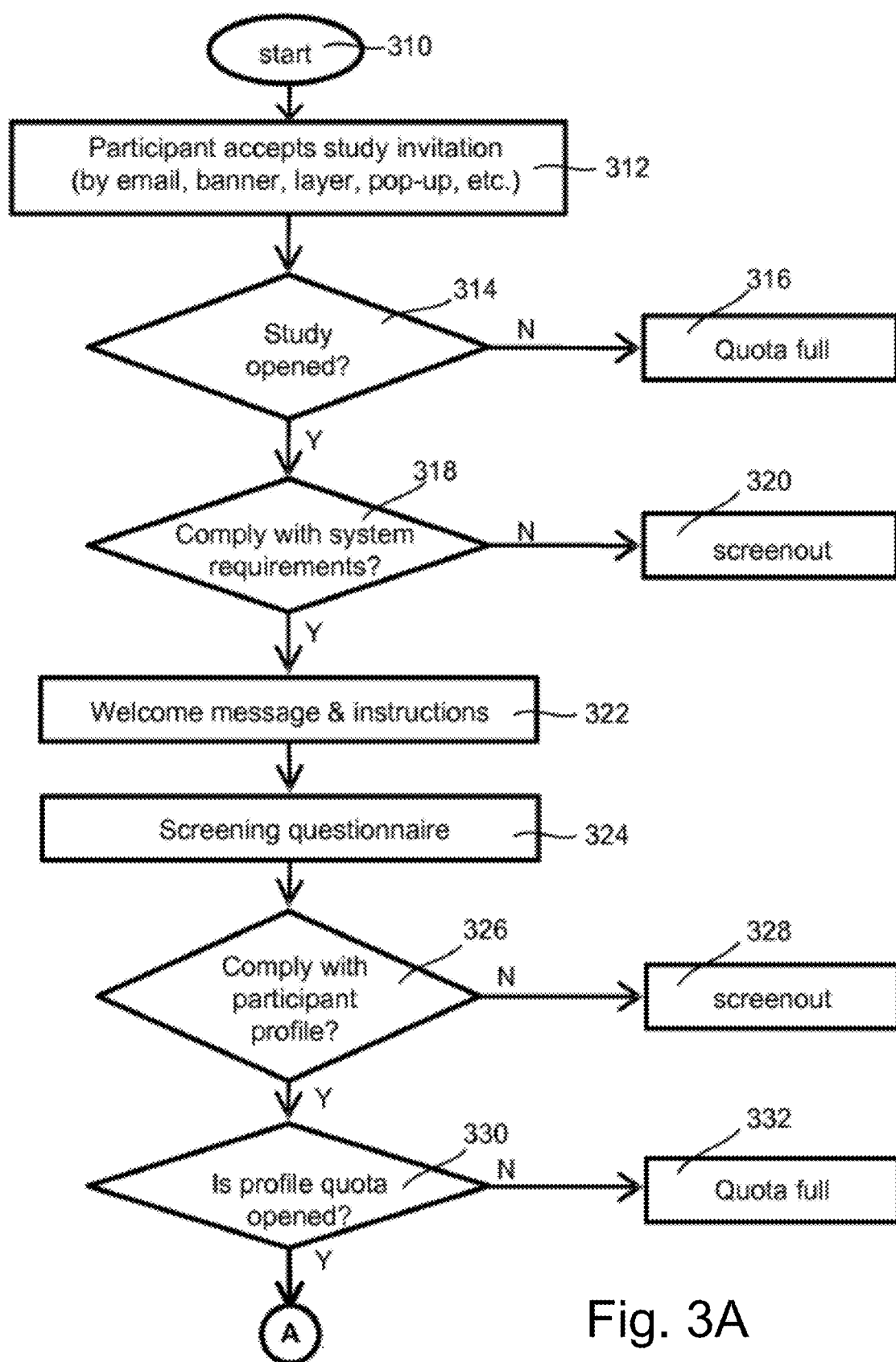
FIG. 3A is a flow diagram illustrating an exemplary process of interfacing with potential candidates and pre-screening participants for the usability testing according to an embodiment of the present invention.

FIG. 3A is a flow diagram of an exemplary process of interfacing with potential candidates and prescreening participants for the usability testing according to one embodiment of the present invention. The process starts at step 310. Initially, potential candidates for the usability testing may be recruited by email, advertisement banners, pop-ups, text layers, overlays, and the like (step 312). The number of candidates who have accepted the invitation to the usability test will be determined at step 314. If the number of candidates reaches a predetermined target number, then other candidates who have signed up late may be prompted with a message thanking for their interest and that they may be considered for a future survey (shown as "quota full" in step 316). At step 318, the usability testing system further determines whether the participants' browser comply with a target web site browser. For example, user experience researchers or the client may want to study and measure a web site's usability with regard to a specific web browser (e.g., Microsoft Edge) and reject all other browsers. Or in other cases, only the usability data of a web site related to Opera or Chrome will be collected, and Microsoft Edge or FireFox will be rejected at step 320. At step 322, participants will be prompted with a welcome message and instructions are presented to participants that, for example, explain how the usability testing will be performed, the rules to be followed, and the expected duration of the test, and the like. At step 324, one or more sets of screening questions may be presented to collect profile information of the participants. Questions may relate to participants' experience with certain products, their awareness with certain brand names, their gender, age, education level, income, online buying habits, and the like. At step 326, the system further eliminates participants based on the collected information data. For example, only participants who have used the products under study will be accepted or screened out (step 328). At step 330, a quota for participants having a target profile will be determined. For example, half of the participants must be female, and they must have online purchase experience or have purchased products online in recent years.

Figure 3B:
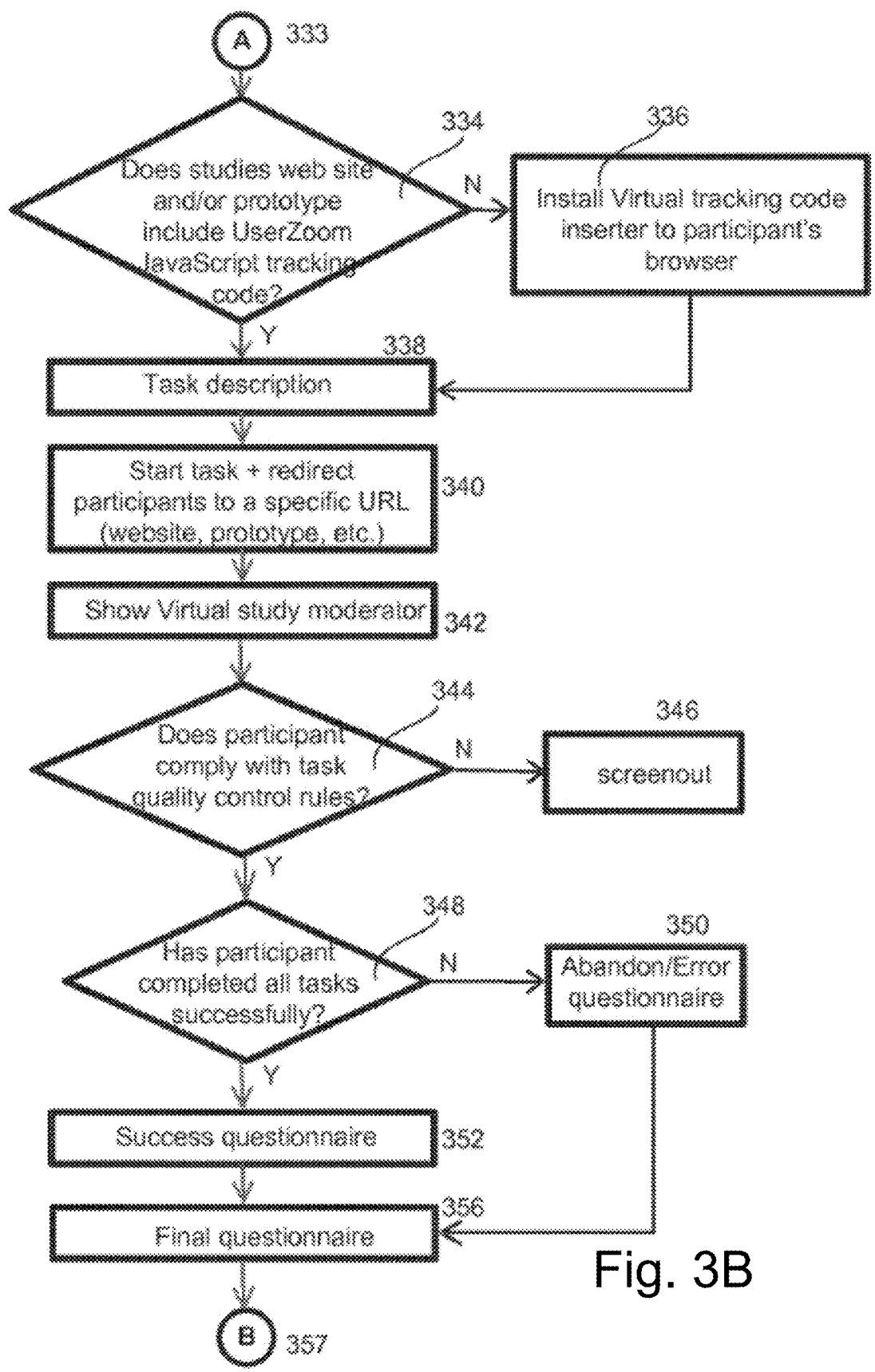
FIG. 3B is a flow diagram of an exemplary process for collecting usability data of a target web site according to an embodiment of the present invention.

FIG. 3B is a flow diagram of an exemplary process for gathering usability data of a target web site according to an embodiment of the present invention. At step 334, the target web site under test will be verified whether it includes a proprietary tracking code. In an embodiment, the tracking code is a UserZoom JavaScript code that pop-ups a series of tasks to the pre-screened participants. If the web site under study includes a proprietary tracking code (this corresponds to the scenario shown in FIG. 1C), then the process proceeds to step 338. Otherwise, a virtual tracking code will be inserted to participants' browser at step 336. This corresponds to the scenario described above in FIG. 1A.

The following process flow is best understood together with FIG. 2. At step 338, a task is described to participants. The task can be, for example, to ask participants to locate a color printer below a given price. At step 340, the task may redirect participants to a specific web site such as eBay, HP, or Amazon.com. The progress of each participant in performing the task is monitored by a virtual study moderator at step 342. At step 344, responses associated with the task are collected and verified against the task quality control rules. The step 344 may be performed by the data collecting module 260 described above and shown in FIG. 2. Data collecting module 260 ensures the quality of the received responses before storing them in a behavioral database 270 (FIG. 2). Behavioral database 270 may include data that the client and/or user experience researcher want to determine such as how many web pages a participant viewed before selecting a product, how long it took the participant to select the product and complete the purchase, how many mouse clicks and text entries were required to complete the purchase and the like. A number of participants may be screened out (step 346) during step 344 for non-complying with the task quality control rules and/or the number of participants may be required to go over a series of training provided by the virtual moderator module 230. At step 348, virtual moderator module 230 determines whether or not participants have completed all tasks successfully. If all tasks are completed successfully (e.g., participants were able to find a web page that contains the color printer under the given price), virtual moderator module 230 will prompt a success questionnaire to participants at step 352. If not, then virtual moderator module 230 will prompt an abandon or error questionnaire to participants who did not complete all tasks successfully to find out the causes that lead to the incompletion. Whether participants have completed all task successfully or not, they will be prompted a final questionnaire at step 356.

Figure 3C:
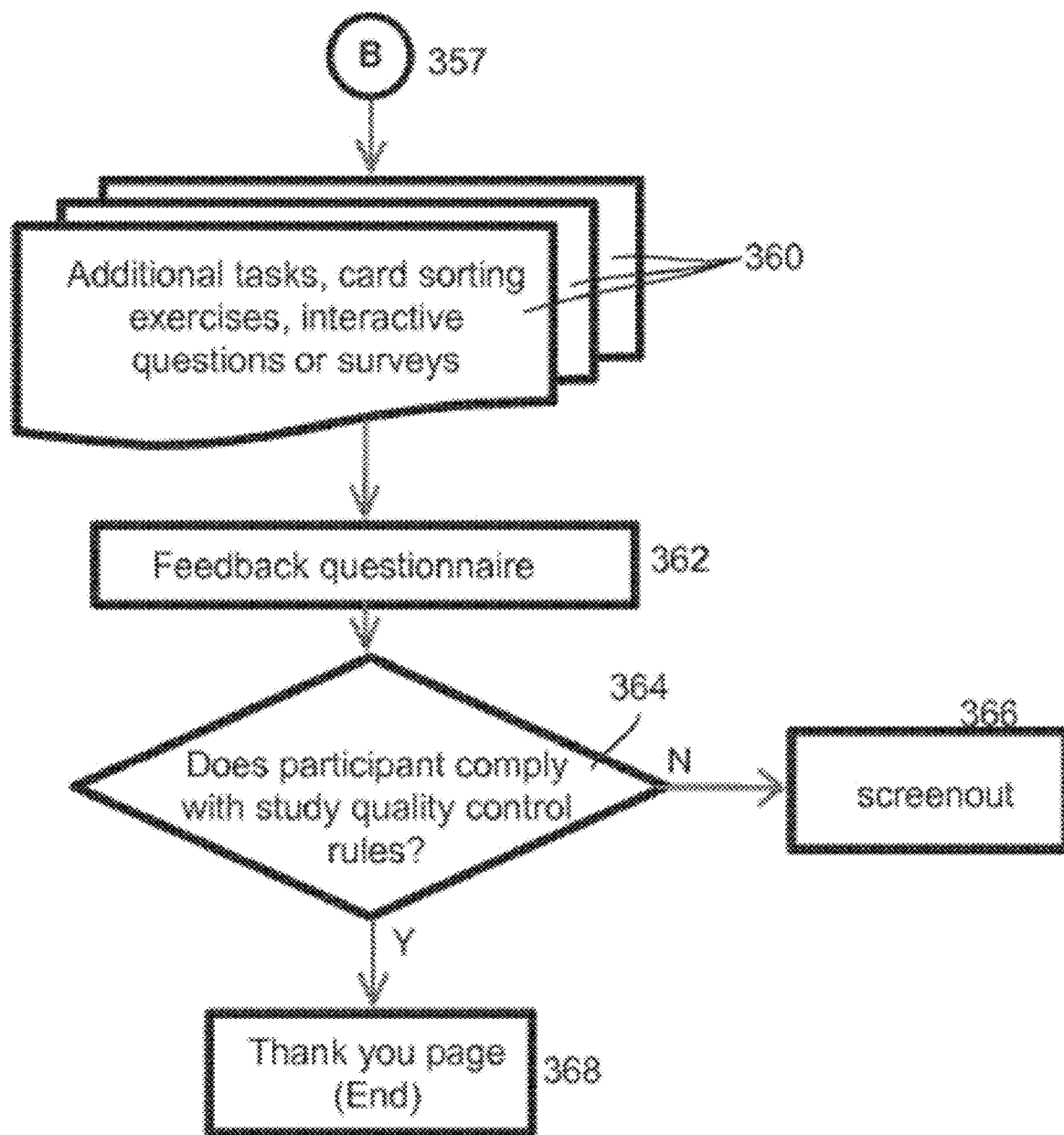
FIG. 3C is a flow diagram of an exemplary process for card sorting studies according to an embodiment of the present invention.

FIG. 3C is a flow diagram of an exemplary process for card sorting studies according to one embodiment of the present invention. At step 360, participants may be prompted with additional tasks such as card sorting exercises. Card sorting is a powerful technique for assessing how participants or visitors of a target web site group related concepts together based on the degree of similarity or a number of shared characteristics. Card sorting exercises may be time consuming. In an embodiment, participants will not be prompted all tasks but only a random number of tasks for the card sorting exercise. For example, a card sorting study is created within 12 tasks that is grouped in 6 groups of 2 tasks. Each participant just needs to complete one task of each group. It should be appreciated to one person of skill in the art that many variations, modifications, and alternatives are possible to randomize the card sorting exercise to save time and cost. Once the card sorting exercises are completed, participants are prompted with a questionnaire for feedback at step 362. The feedback questionnaire may include one or more survey questions such as a subjective rating of target web site attractiveness, how easy the product can be used, features that participants like or dislike, whether participants would recommend the products to others, and the like. At step 364, the results of the card sorting exercises will be analyzed against a set of quality control rules, and the qualified results will be stored in the behavioral database 270. In an embodiment, the analyze of the result of the card sorting exercise is performed by a dedicated analytics server 280 that provides much higher performance than general-purpose servers to provide higher satisfaction to clients. If participants complete all tasks successfully, then the process proceeds to step 368, where all participants will be thanked for their time and/or any reward may be paid out. Else, if participants do not comply or cannot complete the tasks successfully, the process proceeds to step 366 that eliminates the non-compliant participants.

Figure 4:
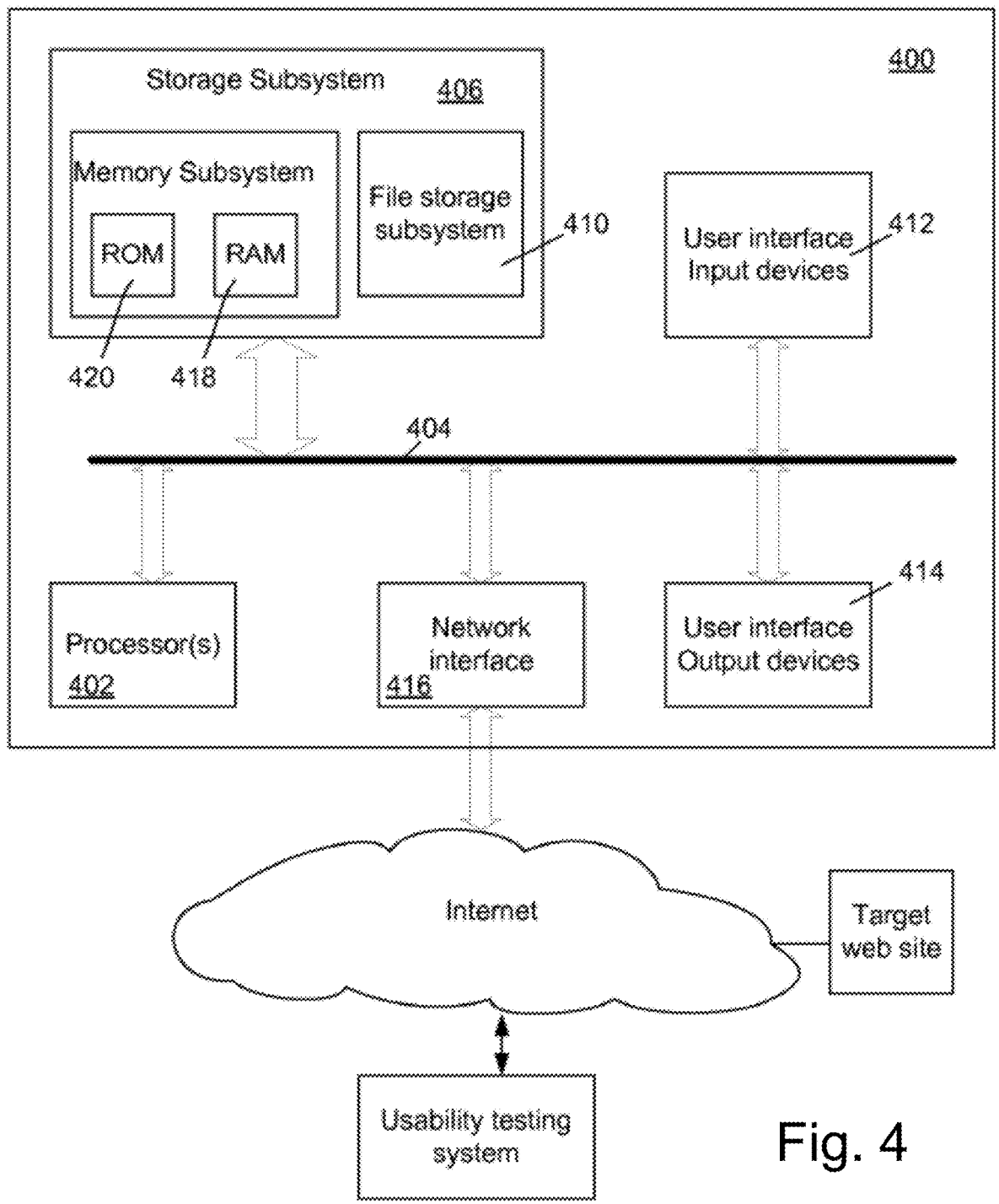
FIG. 4 is a simplified block diagram of a data processing unit configured to enable a participant to access a web site and track participant's interaction with the web site according to an embodiment of the present invention.

FIG. 4 illustrates an example of a suitable data processing unit 400 configured to connect to a target web site, display web pages, gather participant's responses related to the displayed web pages, interface with a usability testing system, and perform other tasks according to an embodiment of the present invention. System 400 is shown as including at least one processor 402, which communicates with a number of peripheral devices via a bus subsystem 404. These peripheral devices may include a storage subsystem 406, including, in part, a memory subsystem 408 and a file storage subsystem 410, user interface input devices 412, user interface output devices 414, and a network interface subsystem 416 that may include a wireless communication port. The input and output devices allow user interaction with data processing system 402. Bus system 404 may be any of a variety of bus architectures such as ISA bus, VESA bus, PCI bus and others. Bus subsystem 404 provides a mechanism for enabling the various components and subsystems of the processing device to communicate with each other. Although bus subsystem 404 is shown schematically as a single bus, alternative embodiments of the bus subsystem may utilize multiple busses.

User interface input devices 412 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term input device is intended to include all possible types of devices and ways to input information to processing device. User interface output devices 414 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term output device is intended to include all possible types of devices and ways to output information from the processing device.

Storage subsystem 406 may be configured to store the basic programming and data constructs that provide the functionality in accordance with embodiments of the present invention. For example, according to one embodiment of the present invention, software modules implementing the functionality of the present invention may be stored in storage subsystem 406. These software modules may be executed by processor(s) 402. Such software modules can include codes configured to access a target web site, codes configured to modify a downloaded copy of the target web site by inserting a tracking code, codes configured to display a list of predefined tasks to a participant, codes configured to gather participant's responses, and codes configured to cause participant to participate in card sorting exercises. Storage subsystem 406 may also include codes configured to transmit participant's responses to a usability testing system.

Memory subsystem 408 may include a number of memories including a main random access memory (RAM) 418 for storage of instructions and data during program execution and a read only memory (ROM) 420 in which fixed instructions are stored. File storage subsystem 410 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Figure 5:
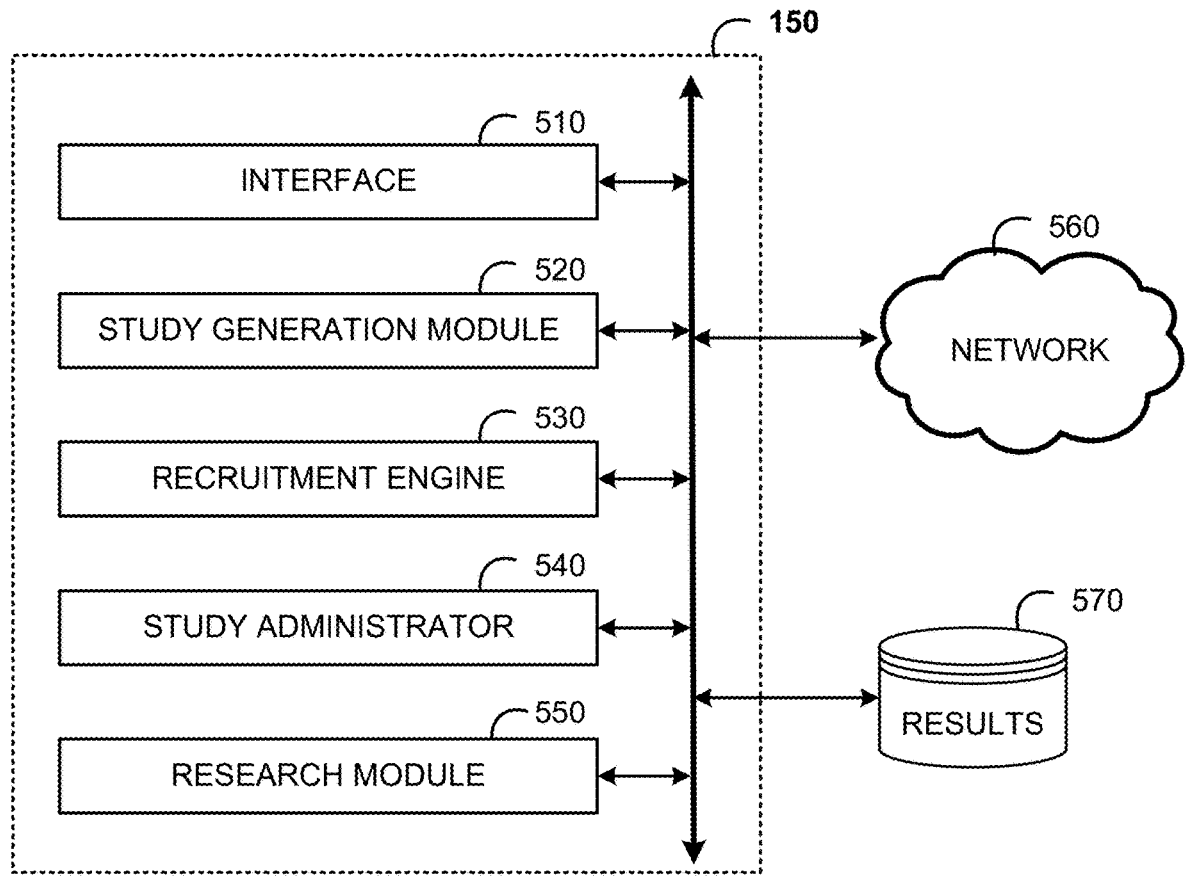
FIG. 5 is an example logical diagram of a second substantiation of the usability testing system, in accordance with some embodiment.

Now that systems and methods of usability testing have been described at a high level, attention will be directed to a particular set of embodiments of the systems and methods for user experience testing that allows for advanced insight generation. This begins with a usability testing system 150 as seen in relation to FIG. 5. In this substantiation of the usability testing system 150 a number of subcomponents are seen as logically connected with one another, including an interface 510 for accessing the results 570 which may be stored internally or in an external data repository. The interface is also configured to couple with the network 560, which most typically is the Internet, as previously discussed.

The other significant components of the user experience testing system 150 includes a study generation module 520, a recruitment engine 530, a study administrator 540 and a research module 550, each of which will be described in greater detail below. Each of the components of the user experience testing systems 150 may be physically or logically coupled, allowing for the output of any given component to be used by the other components as needed.

Figure 6:
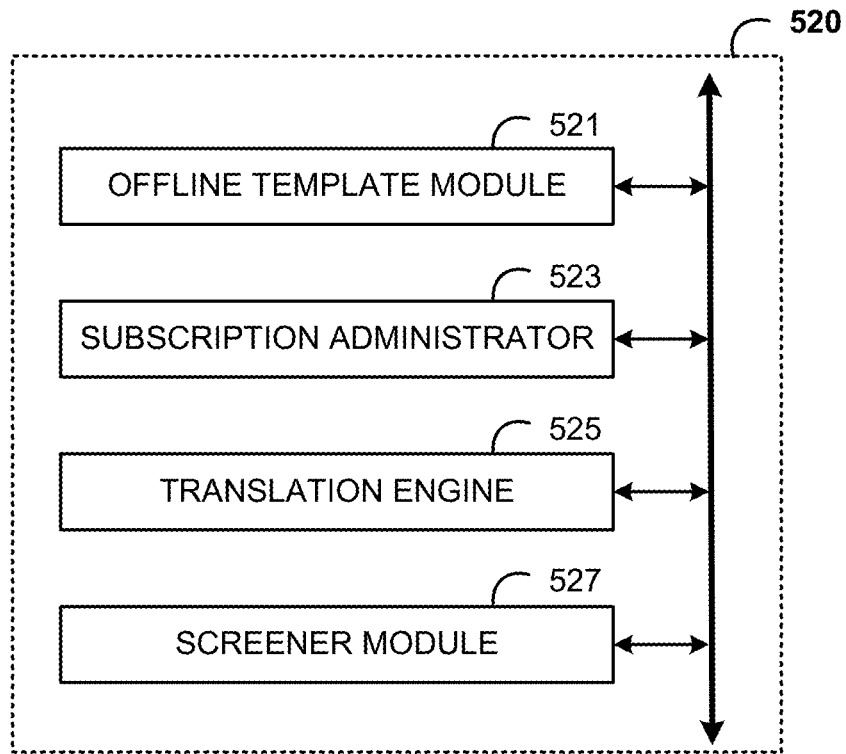
FIG. 6 is a logical diagram of the study generation module, in accordance with some embodiment.

Turning to FIG. 6, the study generation module 520 is provided in greater detail. An offline template module 521 provides a system user with templates in a variety of languages (pre-translated templates) for study generation, screener questions and the like, based upon study type. Users are able to save any screener question, study task, etc. for usage again at a later time or in another study.

In some embodiments a user may be able to concurrently design an unlimited number of studies, but is limited in the deployment of the studies due to the resource expenditure of participants and computational expense of the study insight generation. As such, a subscription administrator 523 manages the login credentialing, study access and deployment of the created studies for the user. In some embodiments, the user is able to have subscriptions that scale in pricing based upon the types of participants involved in a stud, and the number of studies concurrently deployable by the user/client.

The translation engine 525 may include machine translation services for study templates and even allow on the fly question translations. A screener module 527 is configured to allow for the generation of screener questions to weed through the participants to only those that are suited for the given study. This may include basic Boolean expressions with logical conditions to select a particular demographic for the study. However, the screener module 527 may also allow for advanced screener capabilities where screener groups and quotas are defined, allowing for advanced logical conditions to segment participants. For example, the study may wish to include a group of 20 women between the ages of 25-45 and a group of men who are between the ages of 40-50 as this may more accurately reflect the actual purchasing demographic for a particular retailer. A single participant screening would be unable to generate this mix of participants, so the advanced screener interface is utilized to ensure the participants selected meet the user's needs for the particular study.

Figure 7:
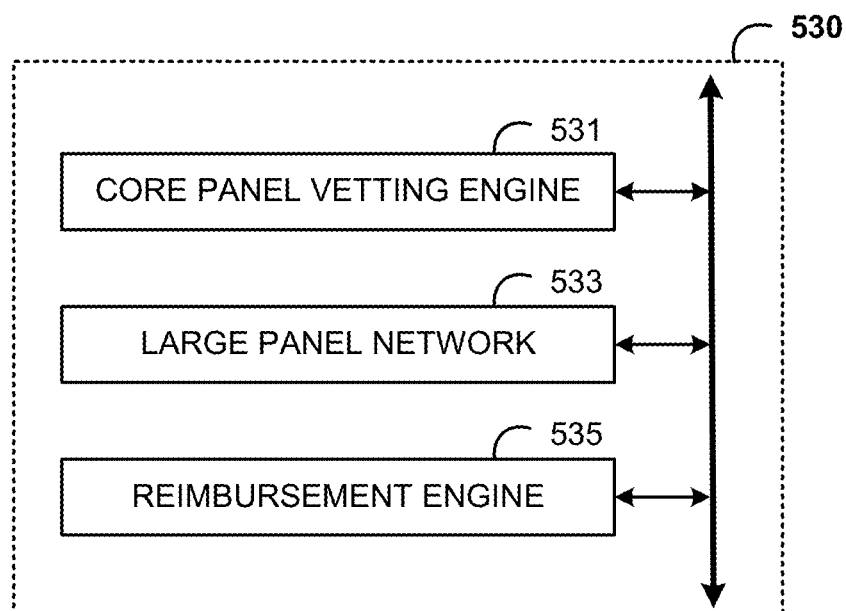
FIG. 7 is a logical diagram of the recruitment engine, in accordance with some embodiment.

Turning now to FIG. 7, a more detailed illustration of the recruitment engine 530 is provided. The recruitment engine 530 is responsible for the recruiting and management of participants for the studies. Generally, participants are one of three different classes: 1) core panel participants, 2) general panel participants, and 3) client provided participants. The core panel participants are compensated at a greater rate, but must first be vetted for their ability and willingness to provide comprehensive user experience reviews. Significant demographic and personal information can be collected for these core panel participants, which can enable powerful downstream analytics. The core panel vetting engine 531 collects public information automatically for the participants as well as eliciting information from the participant to determine if the individual is a reliable panelist. Traits like honesty and responsiveness may be ascertained by comparing the information derived from public sources to the participant supplied information. Additionally, the participant may provide a video sample of a study. This sample is reviewed for clarity and communication proficiency as part of the vetting process. If a participant is successfully vetted they are then added to a database of available core panelists. Core panelists have an expectation of reduced privacy, and may pre-commit to certain volumes and/or activities.

Beyond the core panel is a significantly larger pool of participants in a general panel participant pool. This pool of participants may have activities that they are unwilling to engage in (e.g., audio and video recording for example), and are required to provide less demographic and personal information than core panelists. In turn, the general panel participants are generally provided a lower compensation for their time than the core panelists. Additionally, the general panel participants may be a shared pooling of participants across many user experience and survey platforms. This enables a demographically rich and large pool of individuals to source from. A large panel network 533 manages this general panel participant pool.

Lastly, the user or client may already have a set of participants they wish to use in their testing. For example, if the user experience for an employee benefits portal is being tested, the client will wish to test the study on their own employees rather than the general public.

A reimbursement engine 535 is involved with compensating participants for their time (often on a per study basis). Different studies may be 'worth' differing amounts based upon the requirements (e.g., video recording, surveys, tasks, etc.) or the expected length to completion. Additionally, the compensation between general panelists and core panelists may differ even for the same study. Generally, client supplied participants are not compensated by the reimbursement engine 535 as the compensation (if any) is directly negotiated between the client and the participants.

Figure 8:
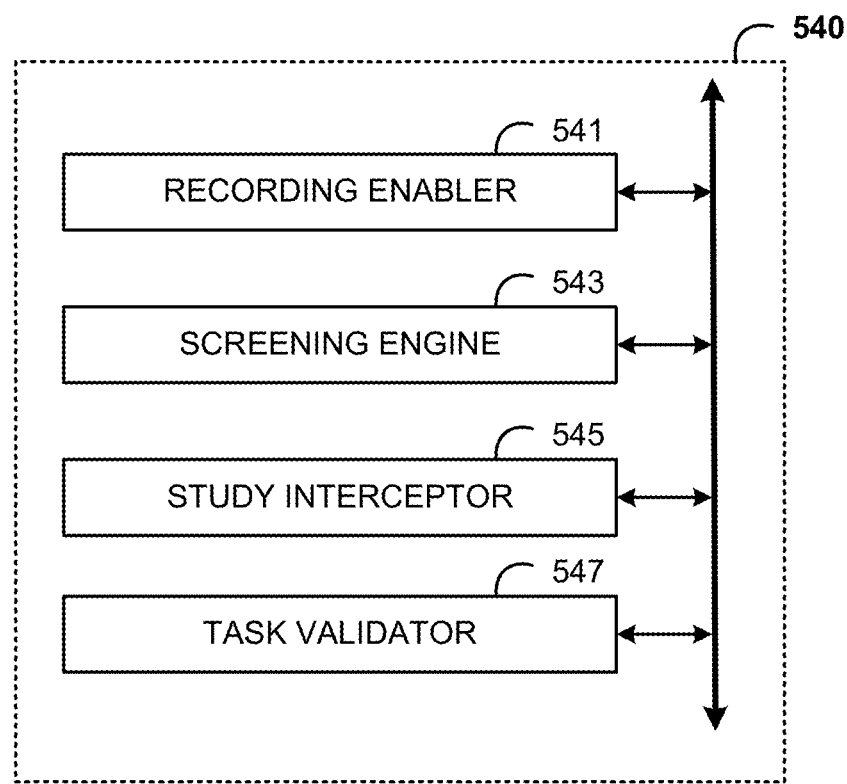
FIG. 8 is a logical diagram of the study administrator, in accordance with some embodiment.

Turning now to FIG. 8, a more detailed view of the study administrator 540 is provided. Unlike many other user experience testing programs, the presently disclosed systems and methods include the ability to record particular activities by the user. A recording enabler 541 allows for the collection of click-flow information, audio collection and even video recording. In the event of audio and/or video recording the recording only occurs during the study in order to preserve participant privacy, and to focus attention on only time periods that will provide insights into the user experience. Thus, while the participant is engaged in screening questions or other activities recording may be disabled to prevent needless data accumulation. Recording only occurs after user acceptance (to prevent running afoul of privacy laws and regulations), and during recording the user may be presented with a clear indication that the session is being recorded. For example the user may be provided a thumbnail image of the video capture, in some embodiments. This provides notice to the user of the video recording, and also indicates video quality and field of view information, thereby allowing them to readjust the camera if needed or take other necessary actions (avoiding harsh backlight, increasing ambient lighting, etc.).

The screening engine 543 administers the generated screener questions for the study. Screener questions, as previously disclosed, includes questions to the potential participants that may qualify or disqualify them from a particular study. For example, in a given study, the user may wish to target men between the ages of 21 and 35, for example. Questions regarding age and gender may be used in the screener questions to enable selection of the appropriate participants for the given study. Additionally, based upon the desired participant pool being used, the participants may be pre-screened by the system based upon known demographic data. For the vetted core panelists the amount of personal data known may be significant, thereby focusing in on eligible participants with little to no additional screener questions required. For the general panel population, however, less data is known, and often all but the most rudimentary qualifications may be performed automatically. After this qualification filtering of the participants, they may be subjected to the screener questions as discussed above.

In some embodiments it may be desirable to interrupt a study in progress in order to interject a new concept, offer or instruction. Particularly, in a mobile application there can be a software developer kit (SDK) that enables the integration into the study and interruption of the user in-process. The study interceptor 545 manages this interruptive activity. Interruption of the user experience allows for immediate feedback testing or prompts to have the participant do some other activity. For example, the interrupt may be configured to trigger when some event or action is taken, such as the participant visiting a particular URL or meeting a determined threshold (e.g. having two items in their shopping cart). The interruption allows the participant to be either redirected to another parallel user experience, or be prompted to agree to engage in a study or asked to answer a survey or the like.

Lastly, the study may include one or more events to occur in order to validate its successful completion. A task validator 547 tracks these metrics for study completion. Generally, task validation falls into three categories: 1) completion of a particular action (such as arriving at a particular URL, URL containing a particular keyword, or the like), 2) completing a task within a time threshold (such as finding a product that meets criteria within a particular time limit), and 3) by question. Questions may include any definition of success the study designer deems relevant. This may include a simple "were you successful in the task?" style question, or a more complex satisfaction question with multiple gradient answers, for example.

Figure 9:
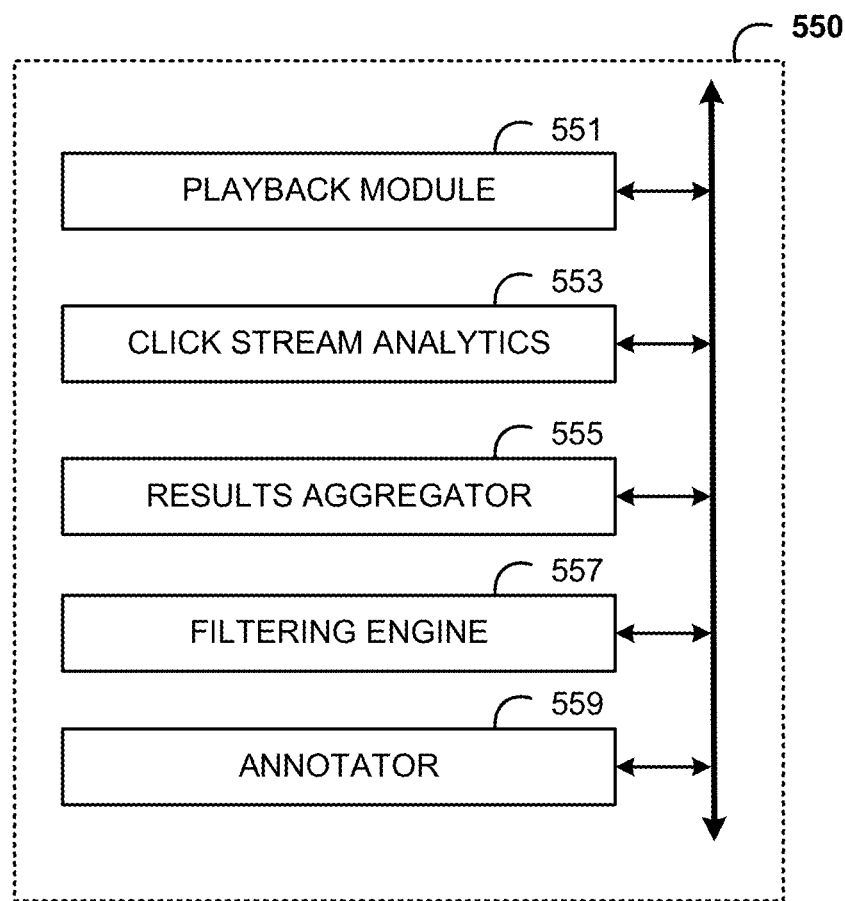
FIG. 9 is a logical diagram of the research module, in accordance with some embodiment.

Turning now to FIG. 9, the research module 550 is provided in greater detail. Compared to traditional user experience study platforms, the present systems and methods particularly excel at providing timely and accurate insights into a user's experience, due to these research tools. The research module includes basic functionalities, such as playback of any video or audio recordings by the playback module 551. This module, however, may also include a machine transcription of the audio, which is then time synchronized to the audio and/or video file. This allows a user to review and search the transcript (using keywords or the like) and immediately be taken to the relevant timing within the recording. And of the results may be annotated using an annotator 559 as well. This allows, for example the user to select a portion of the written transcription and provide an annotation relevant to the study results. The system then automatically can use the timing data to generate an edited video/audio clip associated with the annotation. If the user later searches the study results for the annotation, this auto-generated clip may be displayed for viewing.

In addition to the video and/or audio recordings, the clickstream for the participant is recorded and mapped out as a branched tree, by the click stream analyzer 553. This may be aggregated with other participants' results for the study, to provide the user an indication of what any specific participant does to complete the assigned task, or some aggregated group generally does. The results aggregator 555 likewise combines task validation findings into aggregate numbers for analysis.

All results may be searched and filtered by a filtering engine 557 based upon any delineator. For example, a user may desire to know what the pain points of a given task are, and thus filters the results only by participants that failed to complete the task. Trends in the clickstream for these individuals may illustrate common activities that result in failure to complete the task. For example, if the task is to find a laptop computer with a dedicated graphics card for under a set price, and the majority of people who fail to successfully complete this task end up stuck in computer components due to typing in a search for "graphics card" this may indicate that the search algorithm requires reworking to provide a wider set of categories of products, for example.

As noted above, the filtering may be by any known dimension (not simply success or failure events of a task). For example, during screening or as part of a survey attending the study, income levels, gender, education, age, shopping preferences, etc. may all be discovered. It is also possible that the participant pool includes some of this information in metadata associated with the participant as well. Any of this information may be used to drill down into the results filtering. For example it may be desired to filter for only participants over a certain age. If after a certain age success rates are found to drop off significantly, for example, it may be that the font sizing is too small, resulting in increased difficulty for people with deteriorating eyesight.

Likewise, any of the results may be subject to annotations. Annotations allow for different user reviewers to collectively aggregate insights that they develop by reviewing the results, and allows for filtering and searching for common events in the results.

All of the results activities are additionally ripe for machine learning analysis using deep learning. For example, the known demographic information may be fed into a recursive neural network (RNN) or convoluted neural network (CNN) to identify which features are predictive of a task being completed or not. Even more powerful is the ability for the clickstream to be fed as a feature set into the neural network to identify trends in click flow activity that are problematic or result in a decreased user experience.

Figure 10:
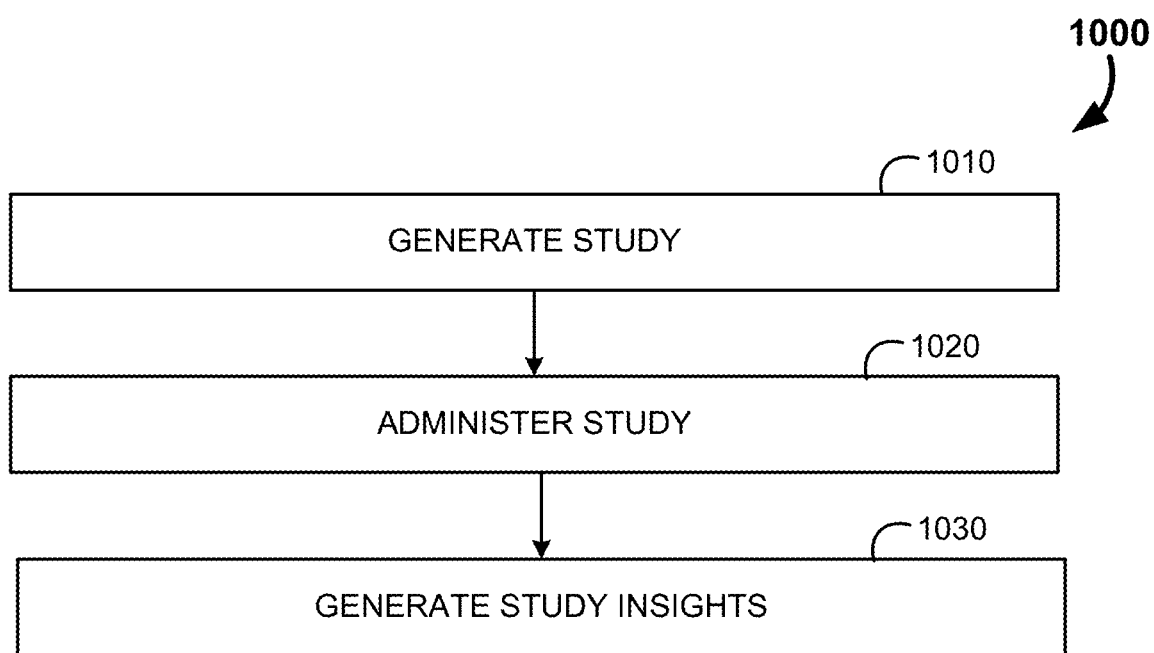
FIG. 10 is a flow diagram for an example process of user experience testing, in accordance with some embodiment.

Turning now to FIG. 10, a flow diagram of the process of user experience study testing is provided generally at 1000. At a high level this process includes three basic stages: the generation of the study (at 1010) the administration of the study (at 1020) and the generation of the study insights (at 1030). Earlier FIGS. 3A-C touched upon the study administration, and is intended to be considered one embodiment thereof.

Figure 11:
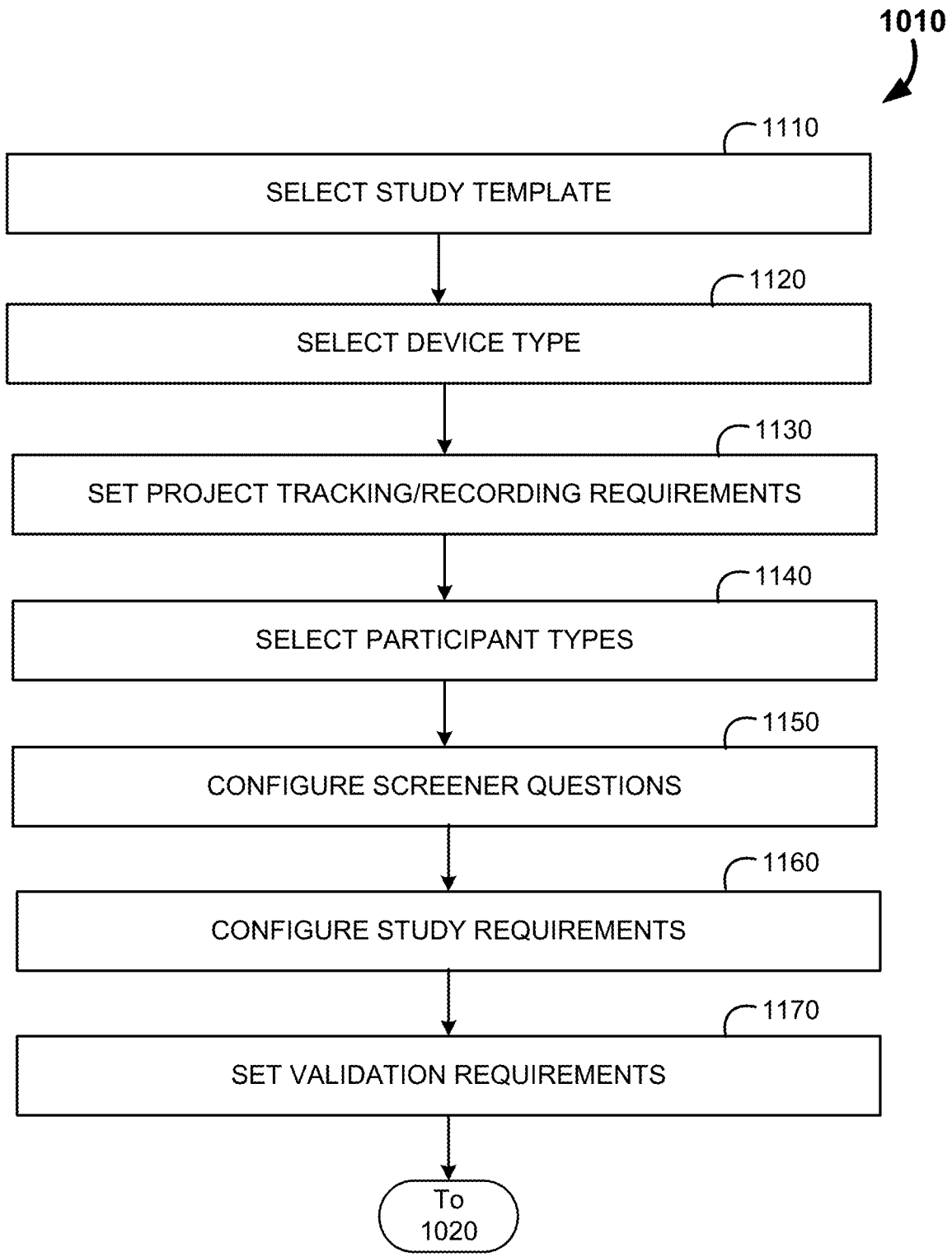
FIG. 11 is a flow diagram for the example process of study generation, in accordance with some embodiment.

FIG. 11 provides a more detailed flow diagram of the study generation 1010. As noted before, the present systems and methods allows for improved study generation by the usage of study templates which are selected (at 1110) based upon the device the study is to be implemented on, and the type of study that is being performed. Study templates may come in alternate languages as well, in some embodiments. Study types generally include basic usability testing, surveys, card sort, tree test, click test, live intercept and advanced user insight research. The basic usability test includes audio and/or video recordings for a relatively small number of participants with feedback. A survey, on the other hand, leverages large participant numbers with branched survey questions. Surveys may also include randomization and double blind studies. Card sort, as discussed in great detail previously, includes open or closed card sorting studies. Tree tests assess the ease in which an item is found in a website menu by measuring where users expect to locate specific information. This includes uploading a tree menu and presenting the participant with a task to find some item within the menu. The time taken to find the item, and rate of successful versus unsuccessful queries into different areas of the tree menu are collected as results.

Click test measures first impressions and defines success areas on a static image as a heat map graph. Accordingly, a heat map represents a hot area of clicks, i.e., more "clicks" generate more "heat". Conversely, click maps indicate the exact coordinates where the clicks are captured. Since digital interfaces are dynamic, there can be a need to calculate the exact clicks coordination based on the browser resolution and size of each specific participant in order for clicks to be able to be correctly positioned within a click map (which requires precision) and that clicks can also be comparable and can be aggregated independently if participants are using a different browser resolution. Click test processes and examples will be discussed in great detail later in this disclosure.

In the click test the participant is presented with a static image (this may include a mock layout of a website/screenshot of the webpage, an advertising image, an array of images or any other static image) and is presented a text prompt. The text prompt may include questions such "Which image makes you the hungriest?" or "select the tab where you think deals on televisions are found." The location and time the user clicks on the static image is recorded for the generation of a heat map and other metrics for analysis. Clicks that take longer (indicating a degree of uncertainty on behalf of the participant) are weighted as less strong, whereas immediate selection indicates that the reaction by the participant is surer. Over time the selections of various participants may be collected. Where many participants select an answer to a particular prompt in the same place relatively rapidly there is a darker heat map indicator. Where participants select various locations, the heat map will show a more diffuse result. Consistent location, but longer delay in the selection will also result in a concentration on the heat map, but of a lighter color, indicating the degree of insecurity by the participants.

Additionally, the user may be able to define regions on the static image that are considered 'answers' to the prompted question. This may allow for larger scale collection of success versus failure metrics, as well as enabling follow-up activities, such as a survey or additional click test, based upon where the participant clicks on the image.

Further, the answer fields may be leveraged to redirect the participant in any way the study author desires. This may include redirecting the participant to another static image for additional click testing, presenting a question to the participant, or even routing the participant to another usability test entirely.

Lastly, advanced research includes a combination of the other methodologies with logical conditions and task validation, and is the subject of much of the below discussions. Each of these study types includes separate saved template designs.

Device type is selected next (at 1120). As noted before, mobile applications enable SDK integration for user experience interruption, when this study type is desired. Additionally, the device type is important for determining recording ability/camera capability (e.g., a mobile device will have a forward and reverse camera, whereas a laptop is likely to only have a single recording camera, whereas a desktop is not guaranteed to have any recording device) and the display type that is particularly well suited for the given device due to screen size constraints and the like.

The study tracking and recording requirements are likewise set (at 1130). Further, the participant types are selected (at 1140). The selection of participants may include a selection by the user to use their own participants, or rely upon the study system for providing qualifies participants. If the study system is providing the participants, a set of screener questions are generated (at 1150). These screener questions may be saved for later usage as a screener profile. The core participants and larger general panel participants may be screened until the study quota is filled.

Next the study requirements are set (at 1160). Study requirements may differ based upon the study type that was previously selected. For example, the study questions are set for a survey style study, or advanced research study. In basic usability studies and research studies the task may likewise be defined for the participants. For tree tests the information being sought is defined and the menu uploaded. For click test the static image is selected for usage. Lastly, the success validation is set (at 1170) for the advanced research study.

Figure 12:
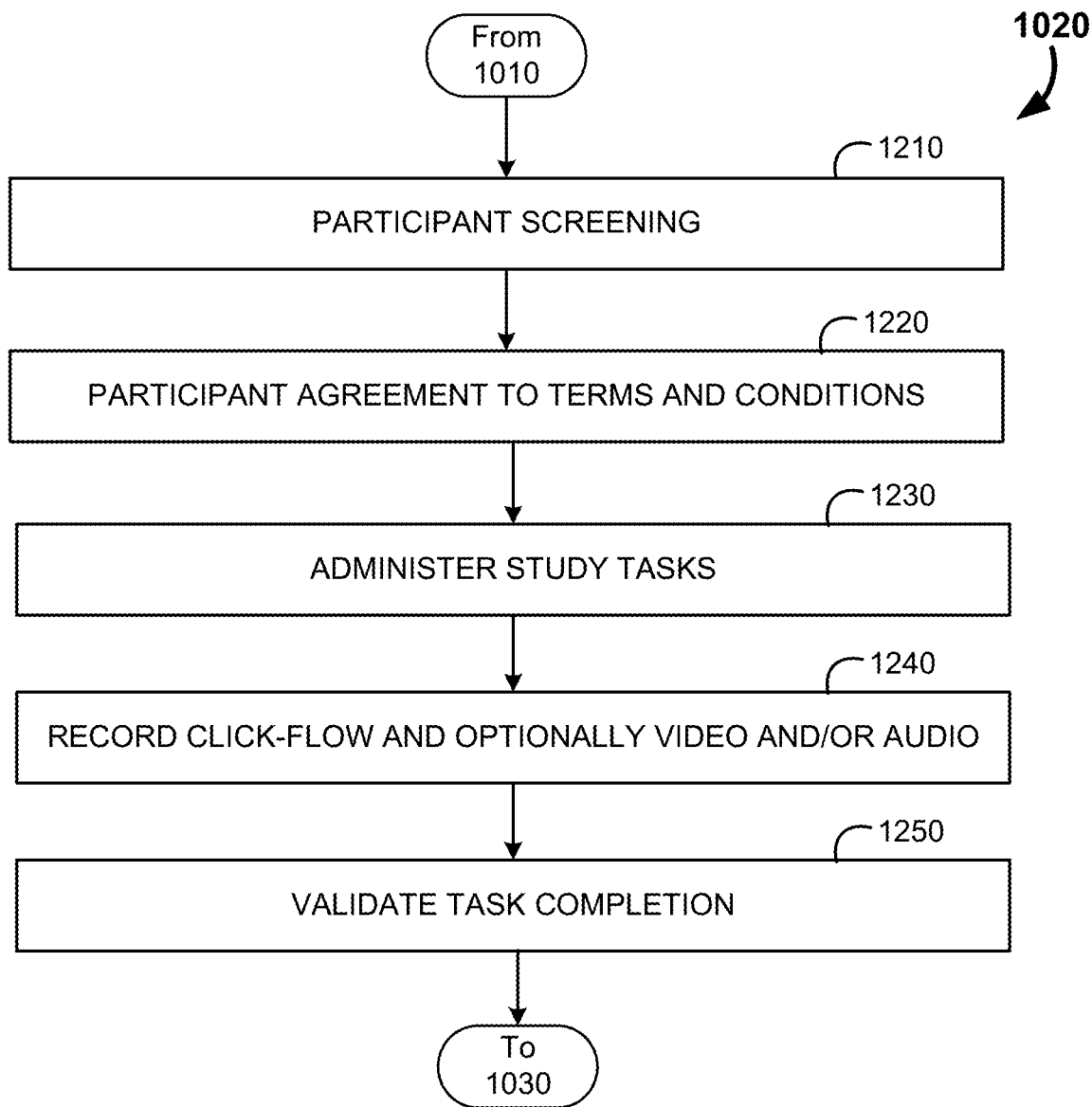
FIG. 12 is a flow diagram for the example process of study administration, in accordance with some embodiment.

After study generation, the study may be implemented, as shown in greater detail at 1020 of FIG. 12. Study implementation begins with screening of the participants (at 1210). This includes initially filtering all possible participants by known demographic or personal information to determine potentially eligible individuals. For example, basic demographic data such as age range, household income and gender may be known for all participants. Additional demographic data such as education level, political affiliation, geography, race, languages spoken, social network connections, etc. may be compiled over time and incorporated into embodiments, when desired. The screener profile may provide basic threshold requirements for these known demographics, allowing the system to immediately remove ineligible participants from the study. The remaining participants may be provided access to the study, or preferentially invited to the study, based upon participant workload, past performance, and study quota numbers. For example, a limited number (less than 30 participants) video recorded study that takes a long time (greater than 20 minutes) may be provided out on an invitation basis to only core panel participants with proven histories of engaging in these kinds of studies. In contrast, a large survey requiring a thousand participants that is expected to only take a few minutes may be offered to all eligible participants.

The initially eligible participants are then presented with the screener questions. This two-phased approach to participant screening ensures that participants are not presented with studies they would never be eligible for based upon their basic demographic data (reducing participant fatigue and frustration), but still enables the user to configure the studies to target a particular participant based upon very specific criteria (e.g., purchasing baby products in the past week for example).

After participants have been screened and are determined to still meet the study requirements, they are asked to accept the study terms and conditions (at 1220). As noted before, privacy regulations play an ever increasing role in online activity, particularly if the individual is being video recorded. Consent to such recordings is necessitated by these regulations, as well as being generally a best practice.

After conditions of the study are accepted, the participant may be presented with the study task (at 1230) which, again, depends directly upon the study type. This may include navigating a menu, finding a specific item, locating a URL, answering survey questions, providing an audio feedback, card sorting, clicking on a static image, or some combination thereof. Depending upon the tasks involved, the clickstream and optionally audio and/or video information may be recorded (at 1240). The task completion is likewise validated (at 1250) if the success criteria is met for the study. This may include task completion in a particular time, locating a specific URL, answering a question, or a combination thereof.

Figure 13:
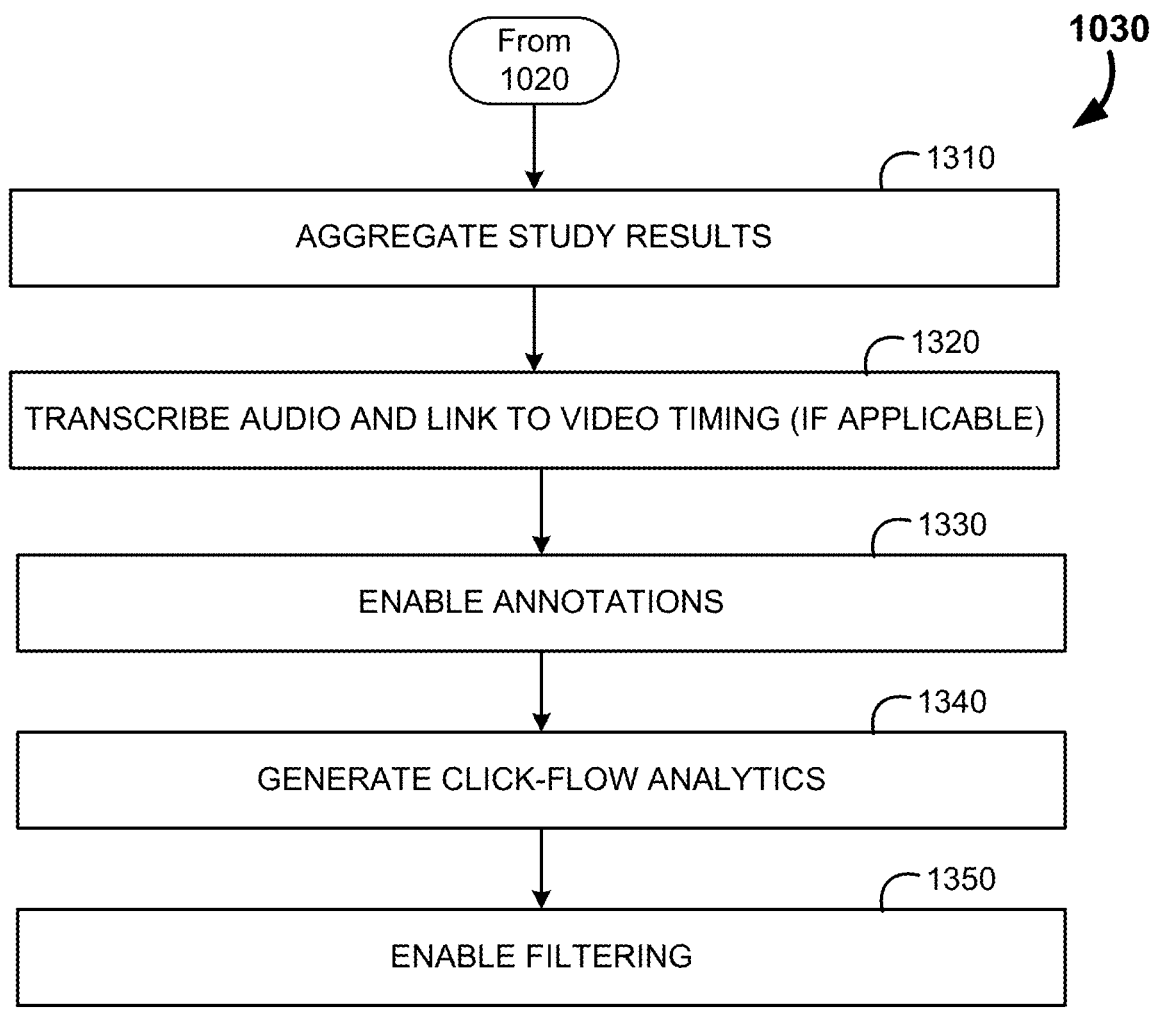
FIG. 13 is a flow diagram for the example process of insight generation, in accordance with some embodiment.

After study administration across the participant quota, insights are generated for the study based upon the results, as seen at 1030 of FIG. 13. Initially the study results are aggregated (at 1310). This includes graphing the number of studies that were successful, unsuccessful and those that were abandoned prior to completion. Confidence intervals may be calculated for these graphs. Similarly, survey question results may be aggregated and graphed. Clickstream data may be aggregated and the likelihood of any particular path may be presented in a branched graphical structure. Aggregation may include the totality of all results, and may be delineated by any dimension of the study.

When an audio or video recording has been collected for the study, these recordings may be transcribed using machine voice to text technology (at 1320). Transcription enables searching of the audio recordings by keywords. The transcriptions may be synchronized to the timing of the recording, thus when a portion of the transcription is searched, the recording will be set to the corresponding frames. This allows for easy review of the recording, and allows for automatic clip generation by selecting portions of the transcription to highlight and tag/annotate (at 1330). The corresponding video or audio clip is automatically edited that corresponds to this tag for easy retrieval. The clip can likewise be shared by a public URL for wider dissemination. Any portion of the results, such as survey results and clickstream graphs, may similarly be annotated for simplified review.

As noted, clickstream data is analyzed (at 1340). This may include the rendering of the clickstream graphical interface showing what various participants did at each stage of their task. As noted before, deep learning neural networks may consume these graphs to identify 'points of confusion' which are transition points that are predictive of a failed outcome.

All the results are filterable (at 1350) allowing for complex analysis across any study dimension. Here too, machine learning analysis may be employed, with every dimension of the study being a feature, to identify what elements (or combination thereof) are predictive of a particular outcome. This information may be employed to improve the design of subsequent website designs, menus, search results, and the like.

Figure 14:
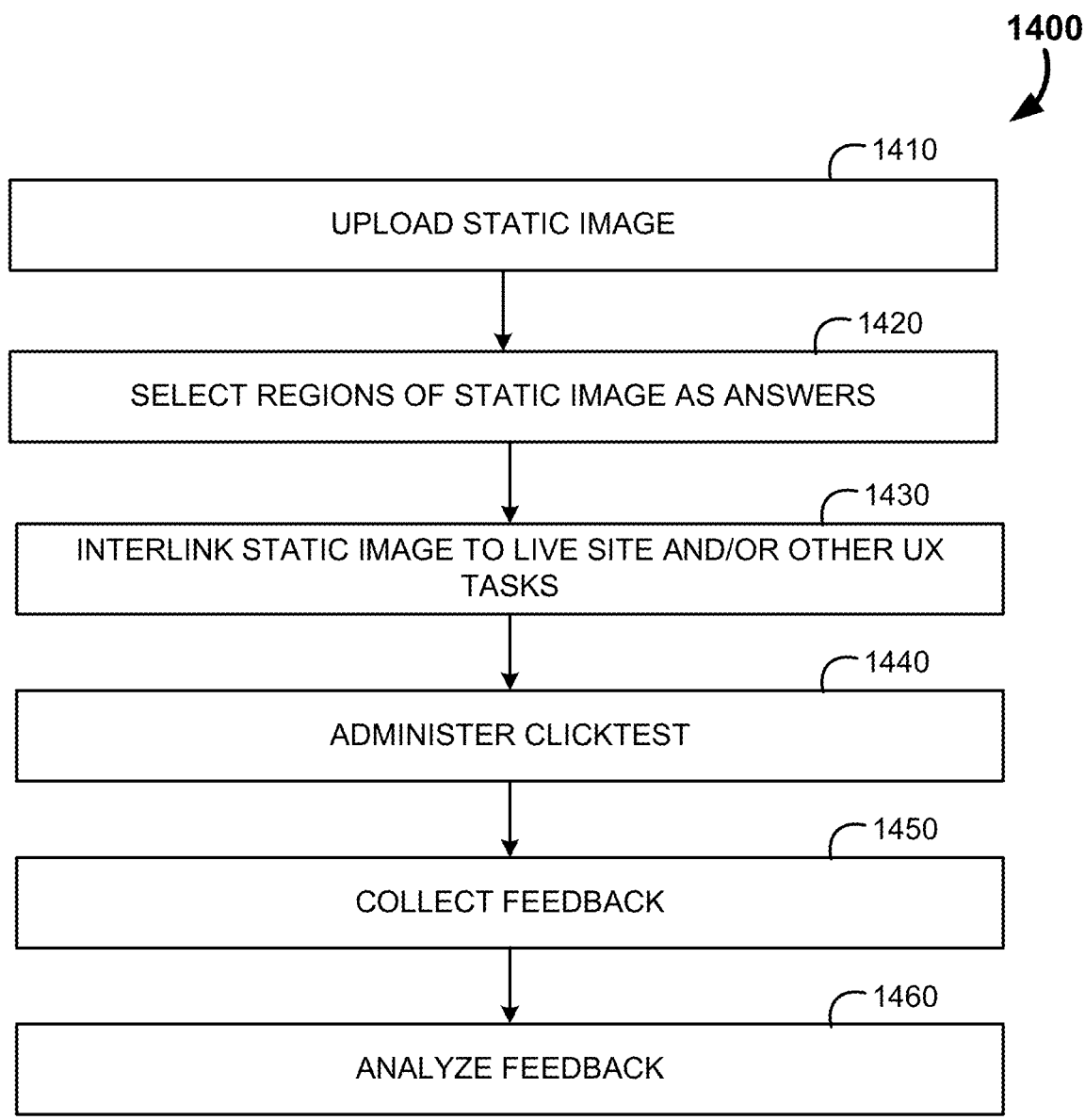
FIG. 14 is a flow diagram for the example process of click test generation and administration, in accordance with some embodiment.

Turning now to FIG. 14, a flow diagram for the example process of click test generation and administration is provided, shown generally at 1400. Unlike the more generalized user experience testing disclosed in FIG. 10-13, the remaining disclosure will focus more acutely upon click testing studies. In this example process, the static image to be analyzed is initially uploaded (at 1410). The regions of the static image are then selected as being a correct answer field, an incorrect answer field, and an "everything else" field (at 1420). This selection is enabled by the user dragging our selection boxes directly upon the image, and choosing the category of the region.

The next step (at 1430) is to interlink the static image to additional user experience tests, and/or additional static image click test screens. It is entirely possible that the single click test screen is the only thing being analyzed, in which case this interlinking step may be avoided entirely. Subsequently, the click test may be actually administered to the participants (at 1440), including providing the participant the prompt, recording their click activity, and asking any relevant follow up questions. This feedback from the participant is collected (at 1450) and subsequently analyzed (at 1460).

Figure 15:
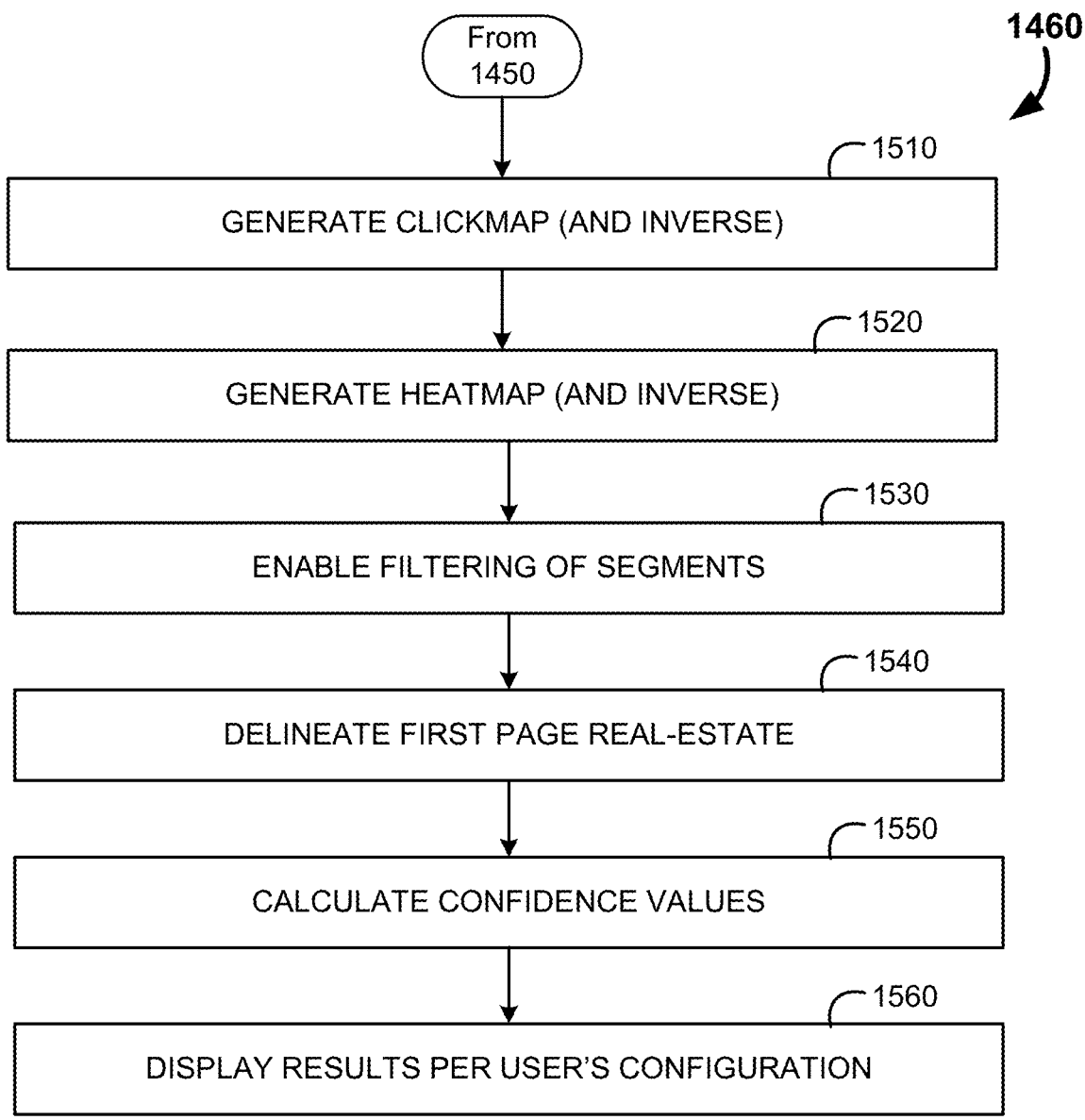
FIG. 15 is a flow diagram for the example process of click test analysis, in accordance with some embodiment.

FIG. 15 is a flow diagram for the example process of this click test analysis. Initially the click map and the inverse image of the click map are both generated (at 1510). Likewise a heat map and its inverse are likewise generated (at 1520). The reverse/negative image shades out the background and utilizes high contrast coloring to make the locations of the click activity more clear to the individual analyzing the data. All maps may be filtered by participant segment, time of click, specific numbers of clicks, and the like, which is enabled for the individual doing the analysis (at 1530). Likewise, the average "first page real estate" is shown as a delineation for the individual analyzing the data (at 1540). First page real estate is the extent to which the image is shown to a user without any scrolling. The extent of the webpage being immediately available without scrolling will, of course, depend upon the machine being used by the participant (e.g., a desktop with a widescreen may have a very different view than a mobile device), the degree of zoom used by the participant, and other factors such as screen orientation and the like. All these scenarios may be averaged to generate the first page real estate delineation. Otherwise, the individual analyzing the data may instead select the platform that they desire to see the real estate. For example, many loyalty applications are used almost exclusively on a mobile smartphone. As such, a click test for this sort of interface may only show the front page real estate for a phone screen. Conversely, orders for other outlets may still be primarily done on a traditional laptop device, and as such this front page real estate delineation would be preferred.

It should be noted that the term "click" generally refers to a selection by the participant using a mouse cursor on a traditional computer. However, for the purpose of this disclosure the term click may likewise refer to a touchscreen input (such as on a phone), stylus input (as may be used on some tablets), or any other selection interface.

After the front page delimitation has been illustrated, the confidence values, and other metrics such as time, number of clicks taken, percent complete, and the like are all calculated (at 1550). All these results, and attendant heat maps, are displayed based upon the user analyzing the data's filtering requirements (at 1560).

Although not illustrated, video recording also enables additional analysis not previously available, such as eye movement tracking and image analysis techniques. For example, a number of facial recognition tools are available for emotion detection. Key emotions such as anger, frustration, excitement and contentment may be particularly helpful in determining the user's experience. A user who exhibits frustration with a task, yet still completes the study task may warrant review despite the successful completion. Results of these advanced machine learning techniques may be automatically annotated into the recording for search by a user during analysis.

Figure 16:
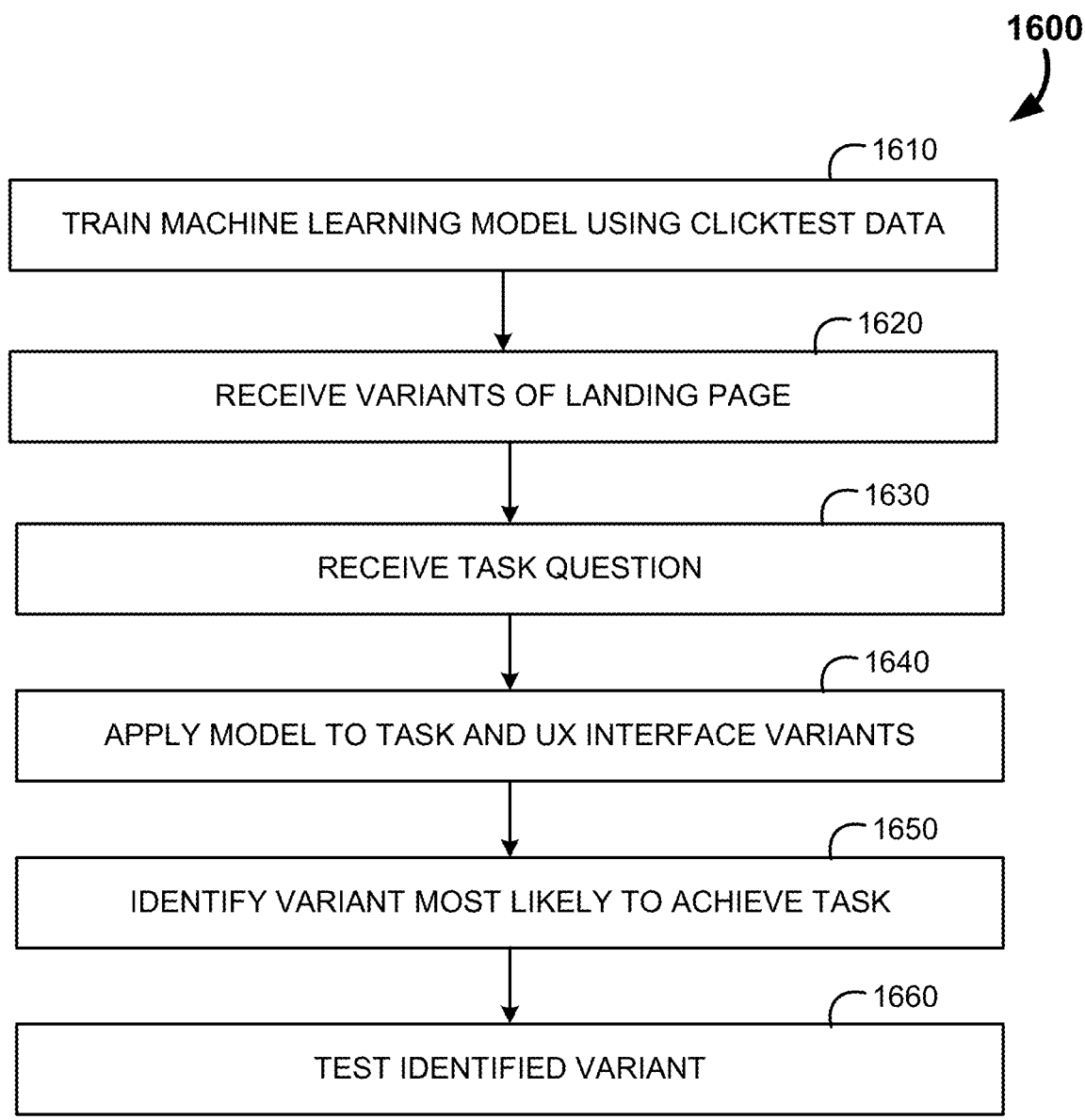
FIG. 16 is a flow diagram for the example process of advanced click test study generation, in accordance with some embodiment.

Moving on to FIG. 16, a flow diagram for the example process of advanced click test study generation is provided, at 1600. Unlike the prior process, the advanced study generation performs initial tasks in order to narrow down expected results and assists in the design of the interface for a given task goal. This is accomplished by initially training a machine learning algorithm using existing click test data for various tasks (at 1610). This training includes providing the algorithm a standardized task input. This input may be user selected from a set of pre-defined tasks, or may be automatically generated by natural language processing to tokenize the task prompt, and using a lexigraphy concept tree, select the task automatically form the pre-defined tasks. When the task cannot be automatically classified above a set confidence threshold, a user may be asked to assist in the selection of a task. In turn, the lexigraphy concept tree may be modified accordingly based upon this user input. The user may also, based upon permissions, add task categories to the set of pre-defined tasks. These predefined tasks may include, for example, finding a particular product, reading reviews, adding a product to a shopping cart, checking out of the retailer, adding a payment card, etc.

The machine learning then uses the results of the click tests study, as well as the static images used, in conjunction with the defined task, to generate likelihoods that a particular area and/or image is likely to be selected based upon the task. After the model is trained, the system may receive a set of variants of the landing page (at 1620). These variants may be user defined (such as differing layouts proposed by a web designer or marketer), or may be automatically generated from a single static image. Automatic variant generation may parse the static image into contiguous regions/image elements, and rearrange these elements on a random, or pseudorandom manner. Alternatively, the system may utilize the task model to maximize the success of various "high level" tasks (such as locating a product, going to product specifications and/or reviews, and purchasing the product). Variants of the landing page may then be used by rearranging the image elements based upon these maximized success metrics for these tasks.

Subsequently, the user may input the specific task(s) that the system is designed to test (at 1630). This task may be selected from the predefined tasks or automatically interpreted (in much the same manner as before). The model generated for the task success is then applied to each of the variant user experience images (at 1640), and the top successful predicted images are output (at 1650). This output may be for any variant that is above a set success threshold, or may be the top set number of variants (e.g., the three most successful image variants.

Only after the "best" variants are thus identified, does the process actually test these best variants (at 1660), using the same methodology described in greater detail in the prior FIG. 15.

While the above discussion has been focused upon testing the user experience in a website for data generation, it is also possible that these systems and methods are proactively deployed defensively against competitors who are themselves engaging in user experience analysis. This includes first identifying when a user experience test is being performed, and taking some reaction accordingly. Red-flag behaviors, such as redirection to the client's webpage from a competitive user experience analytics firm is one clear behavior. Others could include a pattern of unusual activity, such as a sudden increase in a very discrete activity for a short duration.

Once it is determined that a client's website has been targeted for some sort of user experience test, the event is logged. At a minimum this sort of information is helpful to the client in planning their own user experience tests, and understanding what their competitors are doing. However, in more extreme situations, alternate web portals may be employed to obfuscate the analysis being performed.

Moving on, the following figures will provide concrete examples of the generation, administration and analysis of a click test study. While these specific screenshot images are intended to better illustrate the operation of the above click test systems and methods, these images are exemplary, and not intended to limit this disclosure to any specific embodiment.

Figure 17:
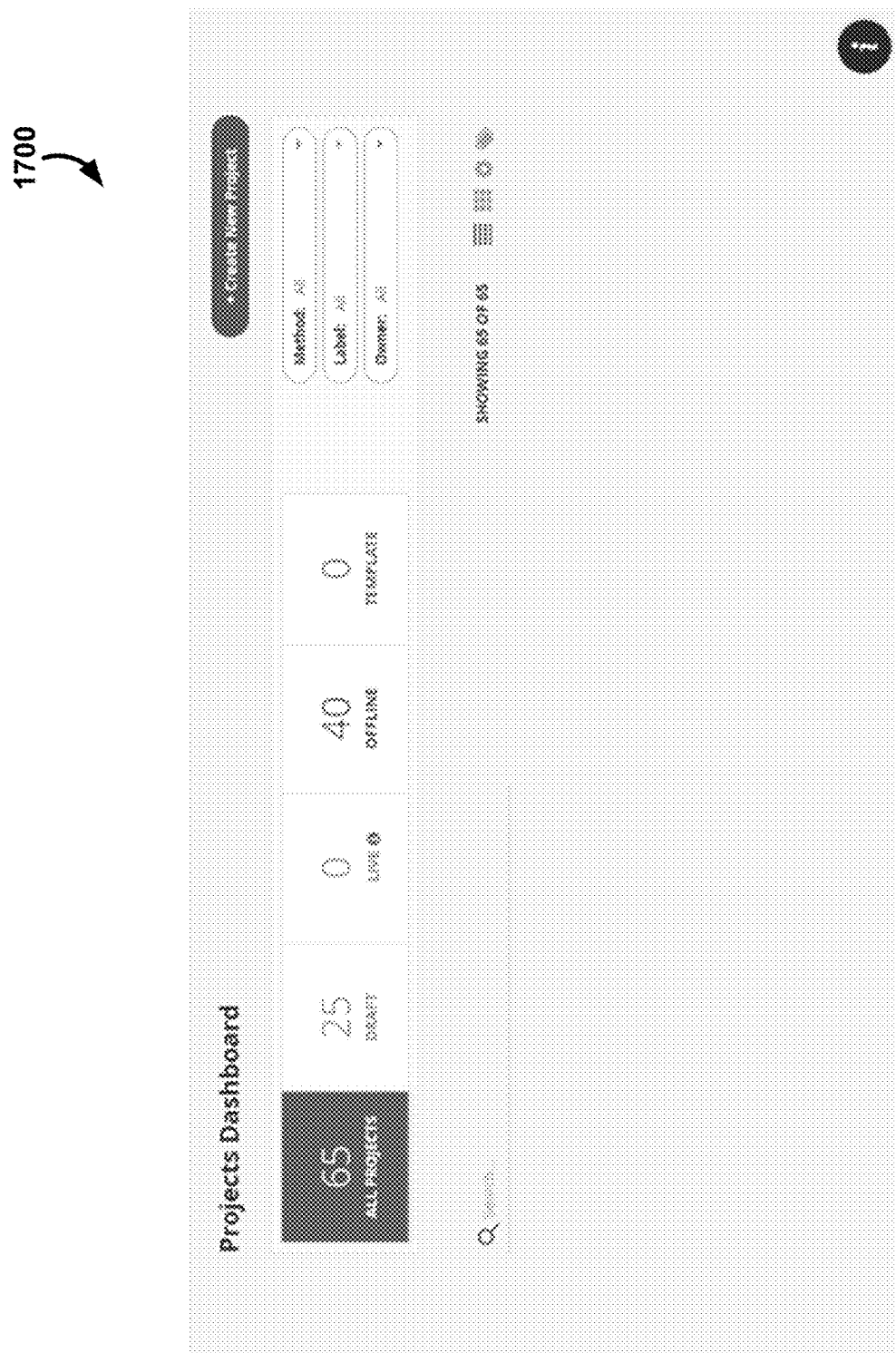
FIG. 17 is an example illustration of a project dashboard, in accordance with some embodiment.

FIG. 17 is an example illustration of a project dashboard, shown generally at 1700. This dashboard shows a user of the system the ongoing projects, draft projects, projects that have been completed, and the total number of all projects. The user may search the projects, and generate and edit project templates. Further the user can select an option to create a new project.

Figure 18:
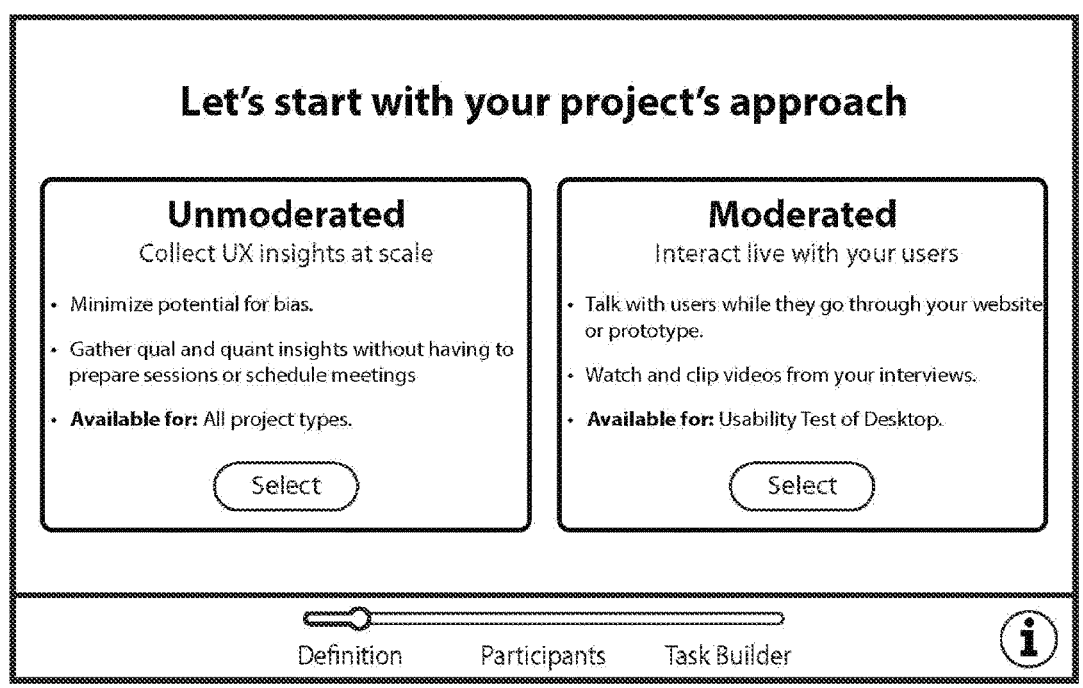
FIGS. 18-21 are example illustrations of generation of click test interfaces, in accordance with some embodiment.
Figure 19:
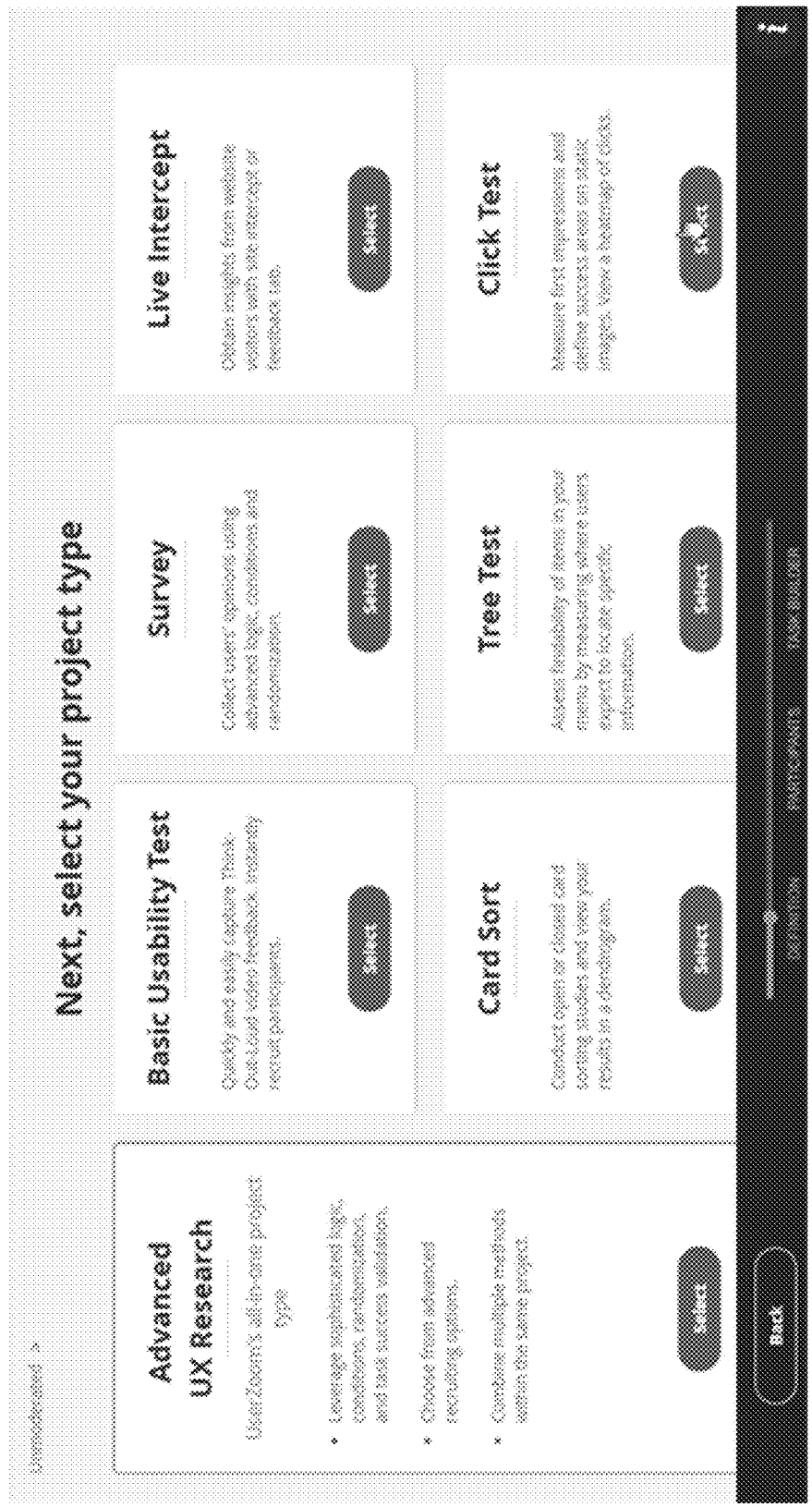
Figure 20:
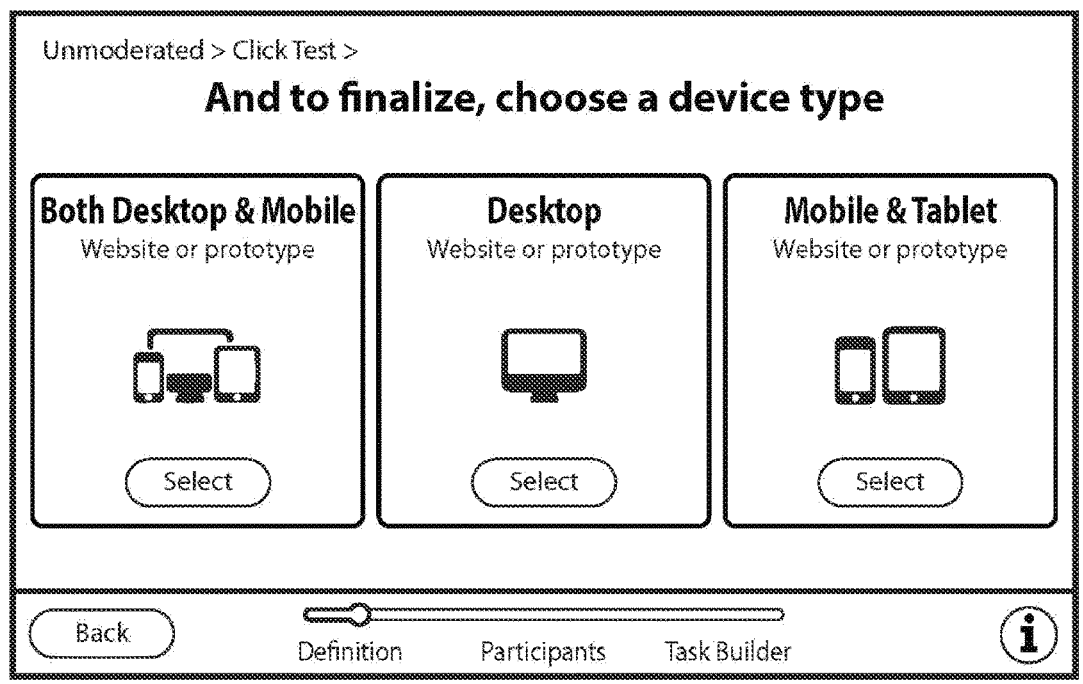

When the option to create a new project is selected, the user is redirected to a screen shown at 1800 of FIG. 18, where the user is asked whether the project is to be moderated or not. Moderated tasks are useful in getting a more in depth understanding of the user experience; however, as this selection requires a live interaction with the participant, these studies are more resource intensive and therefore scale with difficulty. Whatever the user selects, the individual generating the new project is redirected to a screen for study selection, as seen at 1900 of FIG. 19. The different usability tests are illustrated, but for this example, the user selects the click test study. This redirects the user to a page, seen at 2000 of FIG. 20, where the device type that the participants will be using is selected. This may include a full computer system/desktop, mobile type devices, or a combination thereof.

Figure 21:
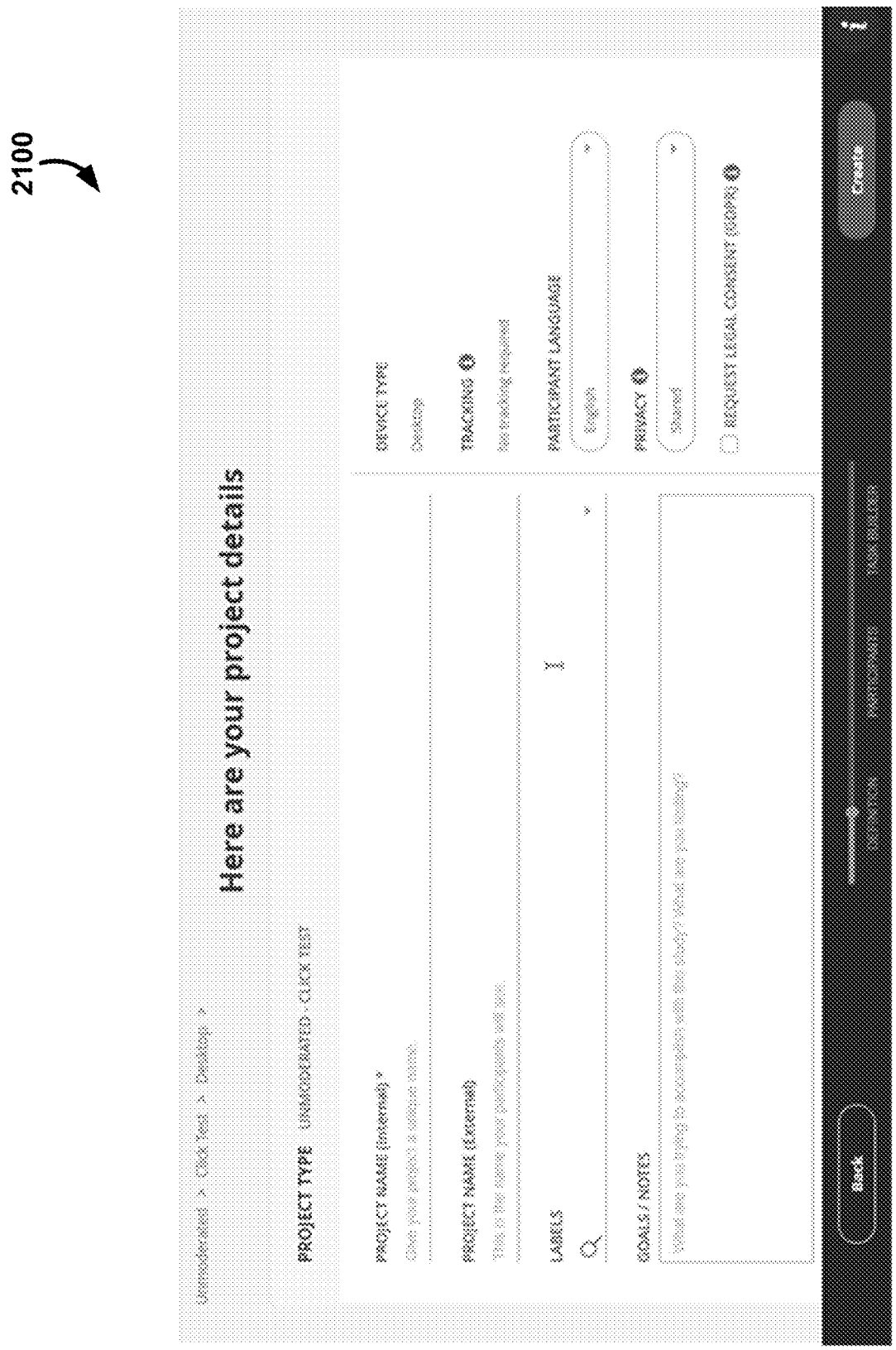
Figure 22:
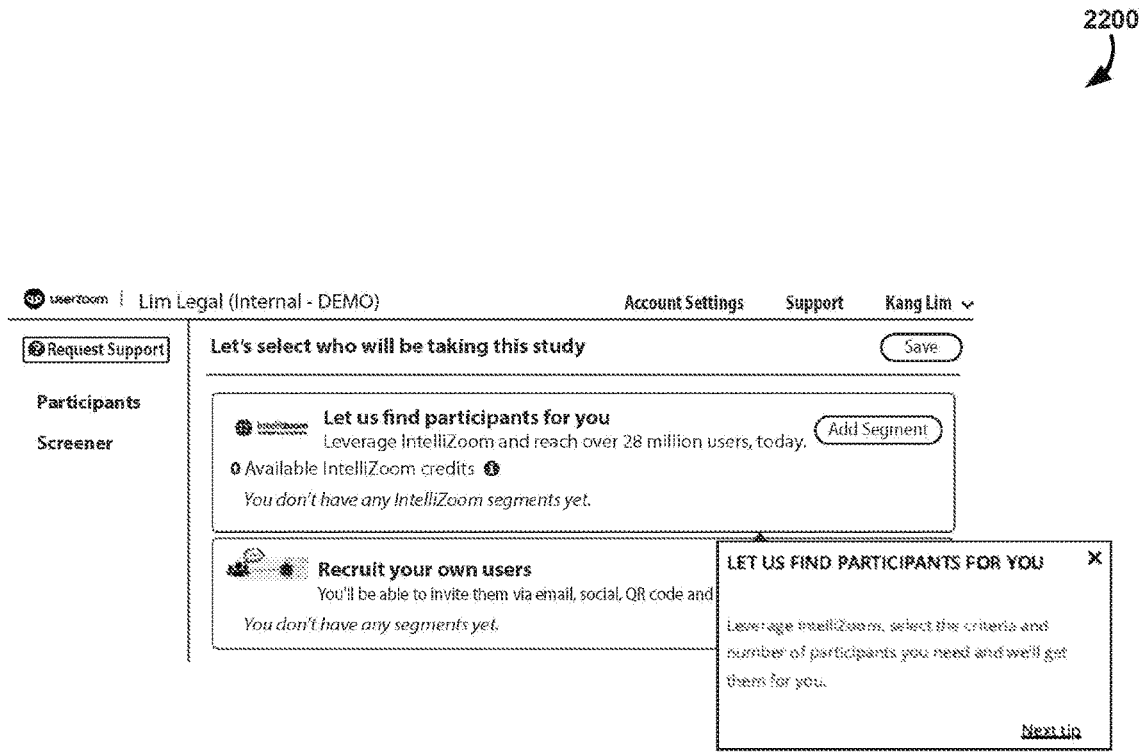
FIGS. 22-27 are example illustrations of participant sourcing, in accordance with some embodiment.

Upon selection of the device being tested, the user is directed to a page for generating the study, as seen at 2100 of FIG. 21. Here project details, such as the name, goals of the study, and user details are selected. After the test is named, the user is directed to a screen for the selection of participants, as seen at 2200 of FIG. 22. Two options are presented to the user: the first is to utilize a panel of participants that they already have (such as an employee team, or a focus group). The other option is to leverage a network of participants that may be filtered and selected that the system has access to. There is a cost of using such a participant team, but is allows access to a larger pool of eligible participants.

Figure 23:
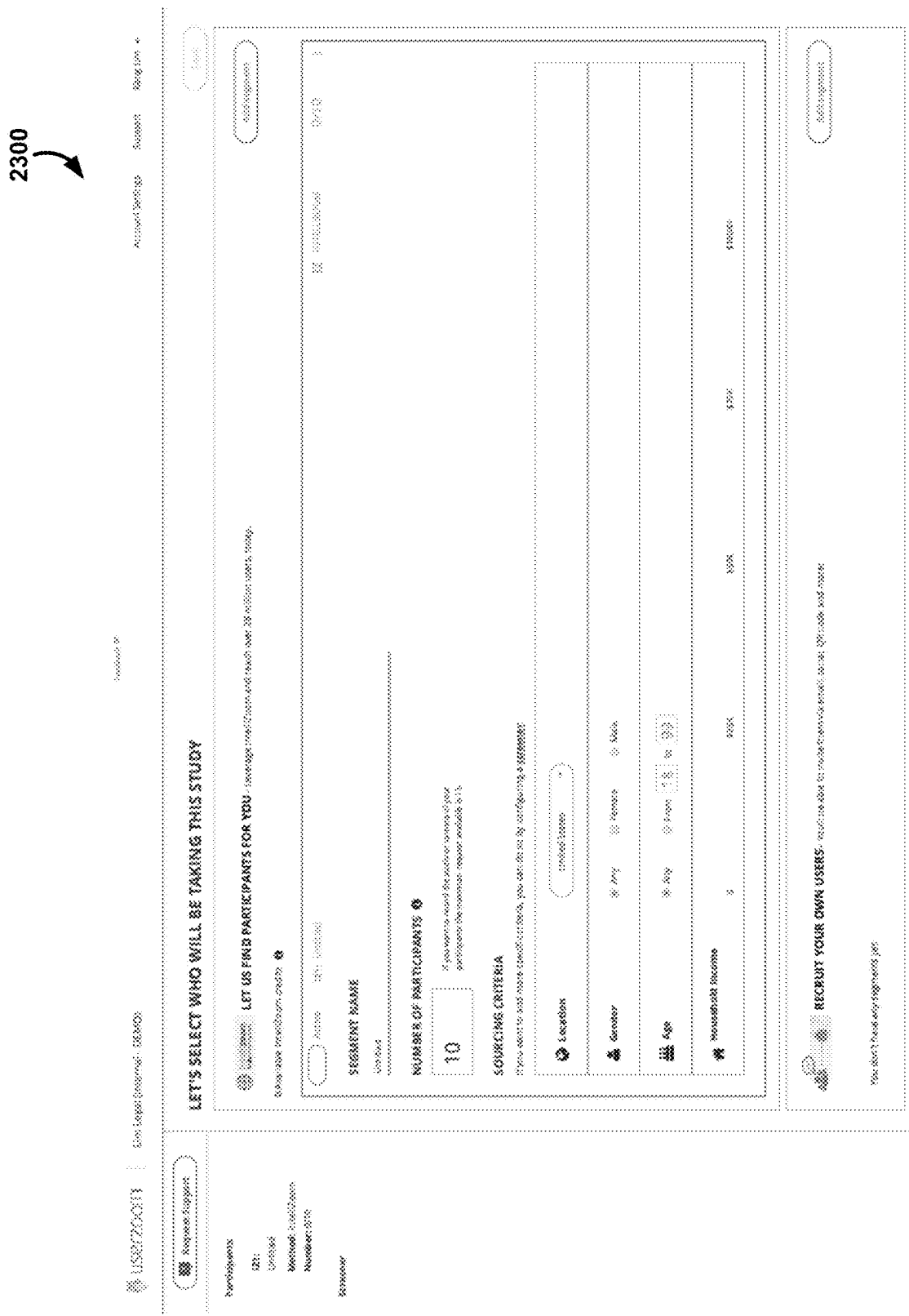
Figure 24:
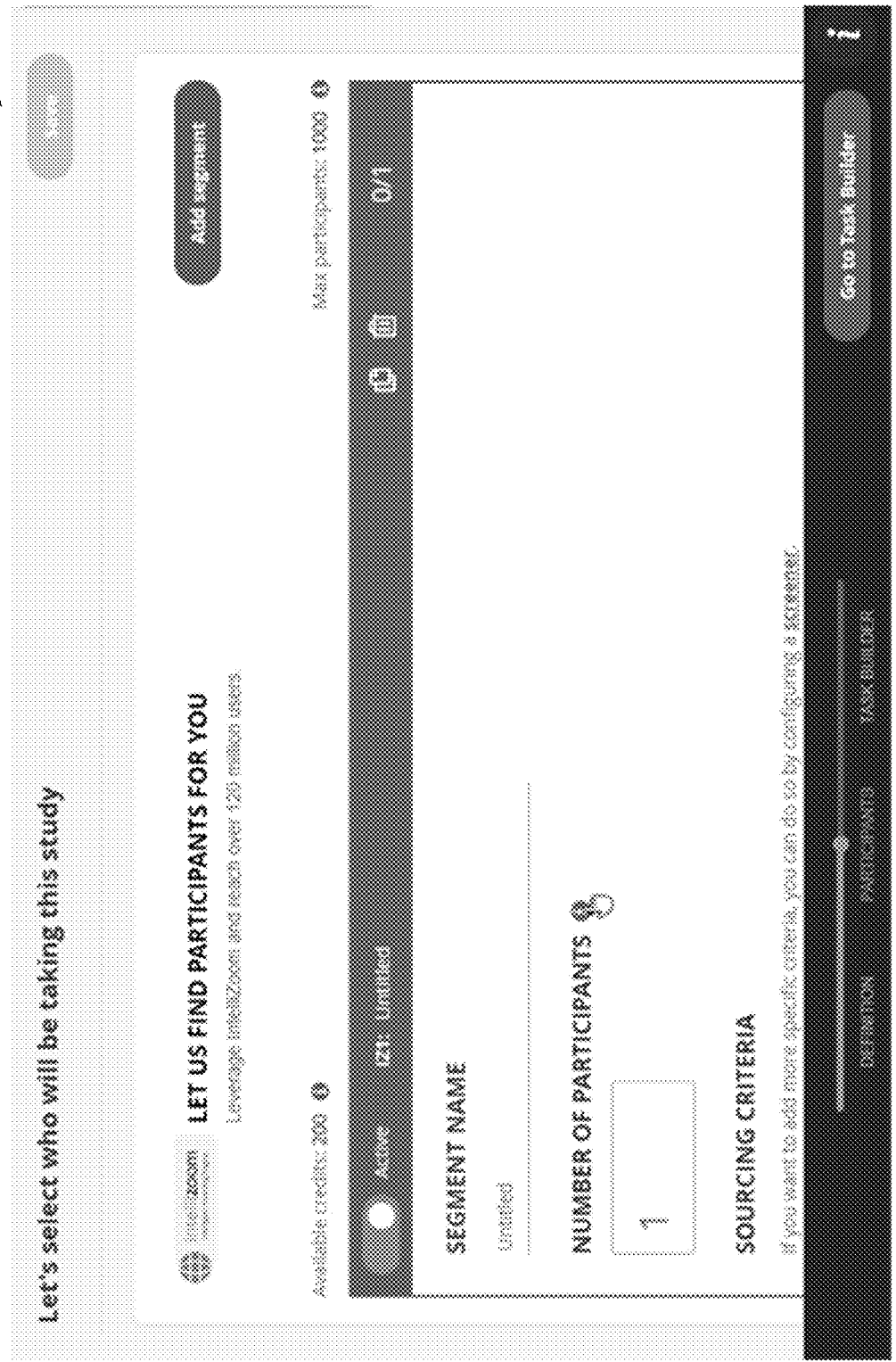
Figure 25:
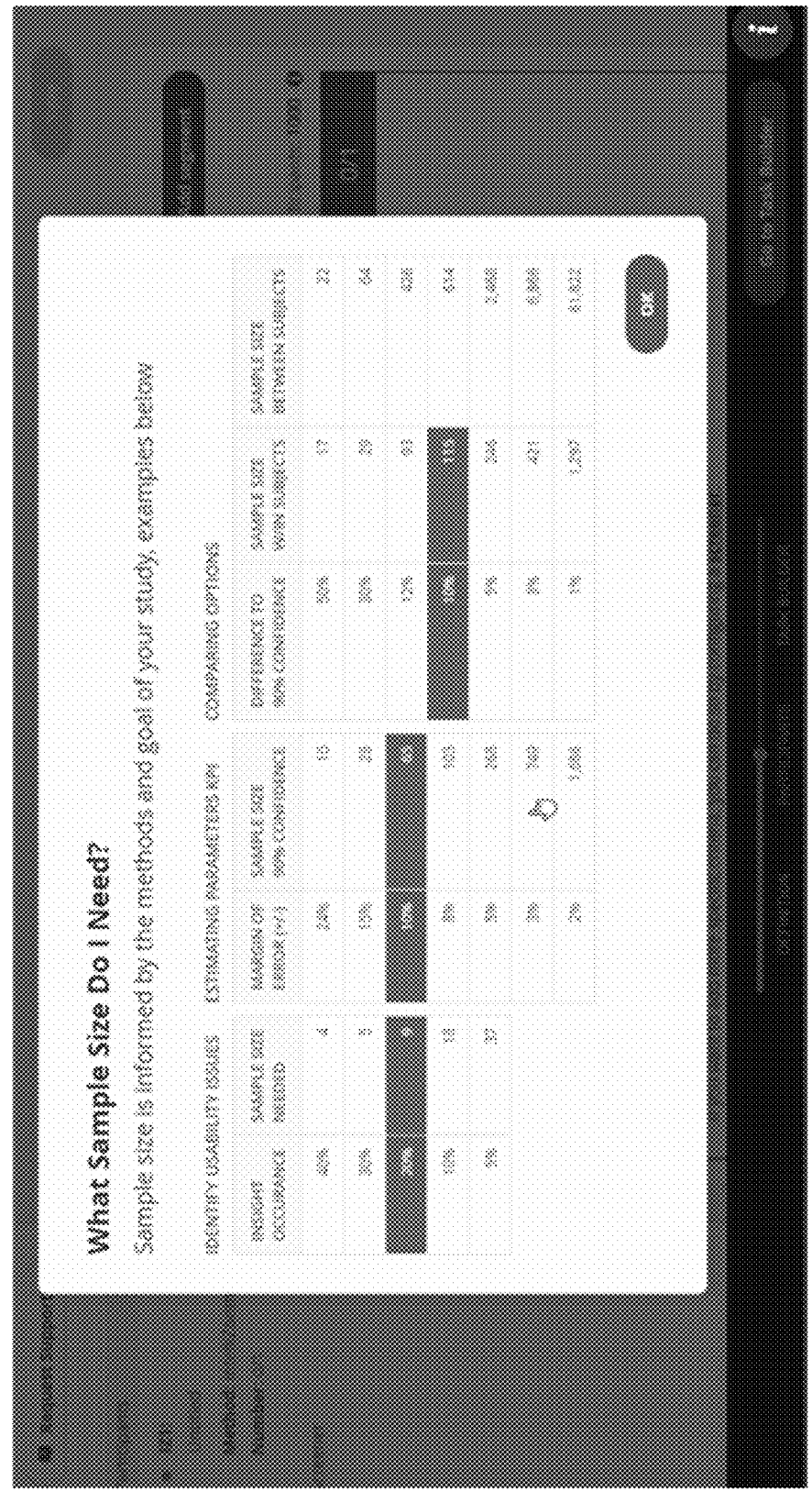

If the user selects to use participants provided by the system, the user is directed to a participant selection screen, shown at 2300 of FIG. 23. Here the number of participants desired, and basic screening requirements (such as age, gender, income levels, location, etc.) are selected. Upon selection of this basic information, the actual selection of participant segments is enabled through the screen shown at 2400, at FIG. 24. The participant selection is aided by an analyzer of confidence levels based upon participant numbers, as seen at 2500 of FIG. 25. Sample sizes are modifiable by the accuracy of the participant segments selected (some segments for example may mirror a given consumer base more accurately than other segments, for example) and through the usage of known sample confidence algorithms.

Figure 26:
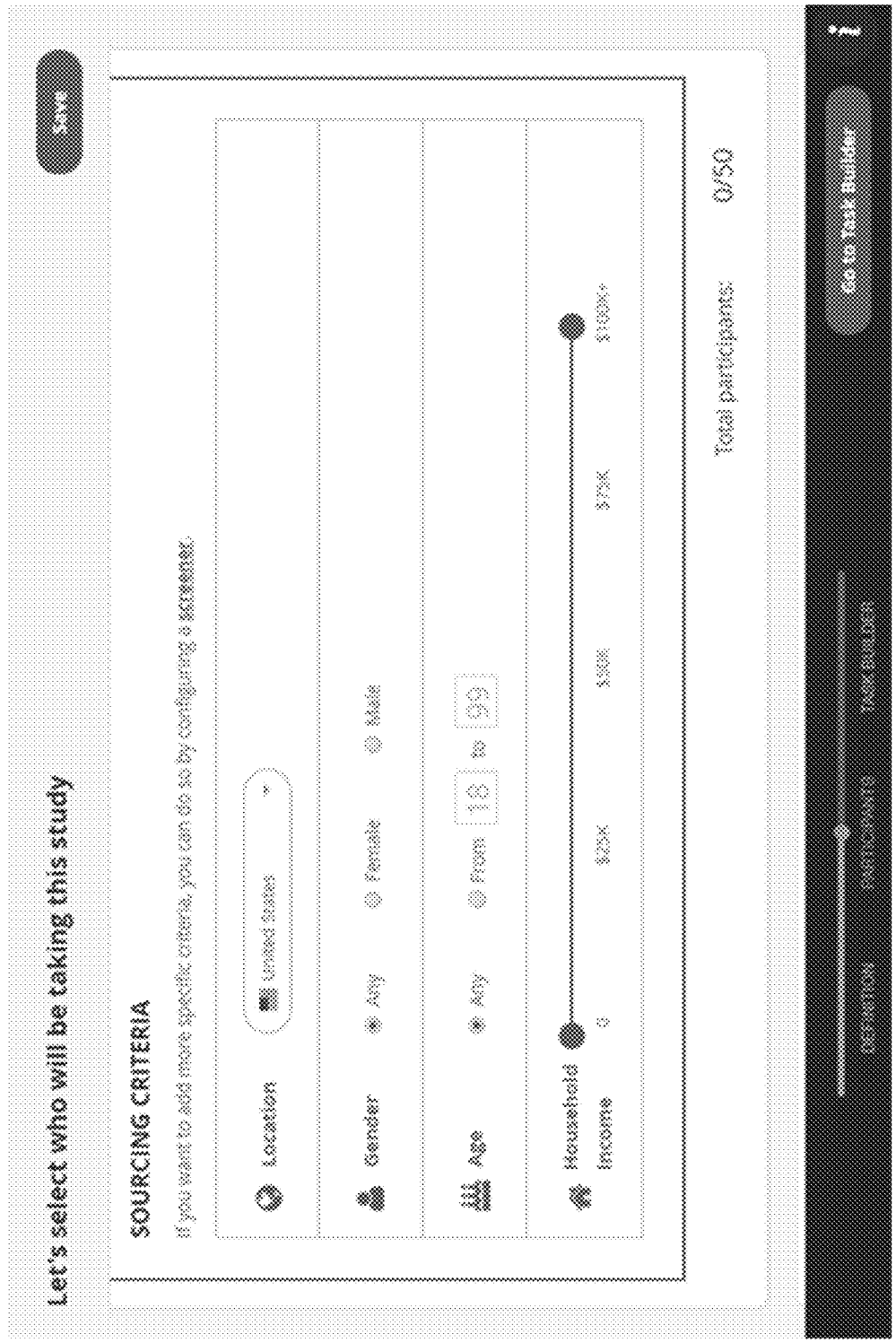
Figure 27:
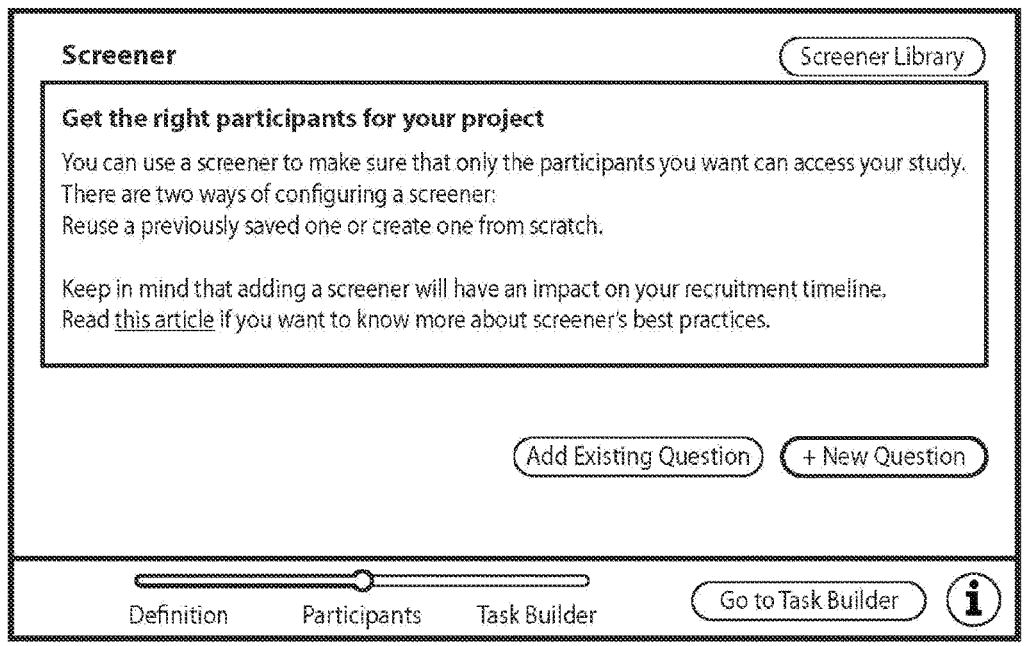
Figure 28:
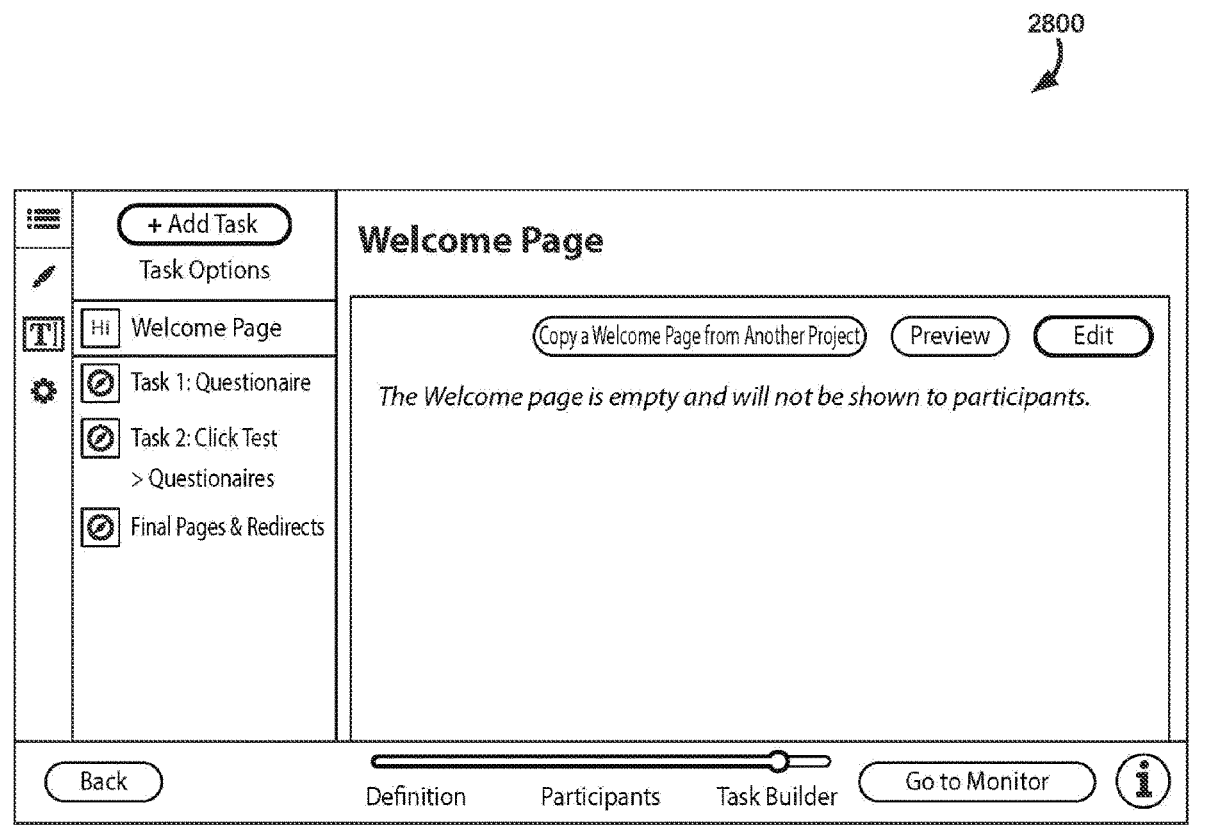
Figure 29:
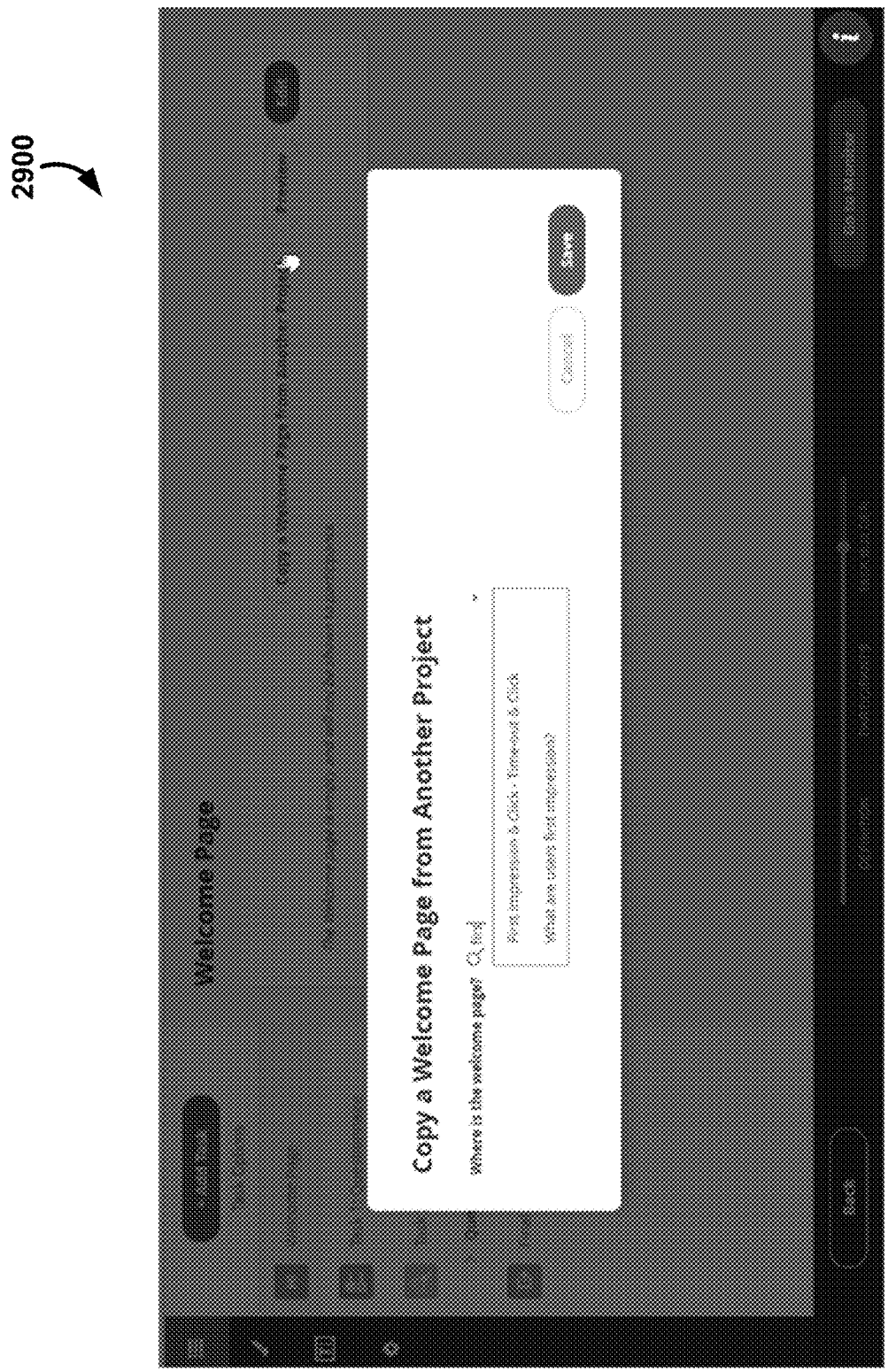
Figure 30:
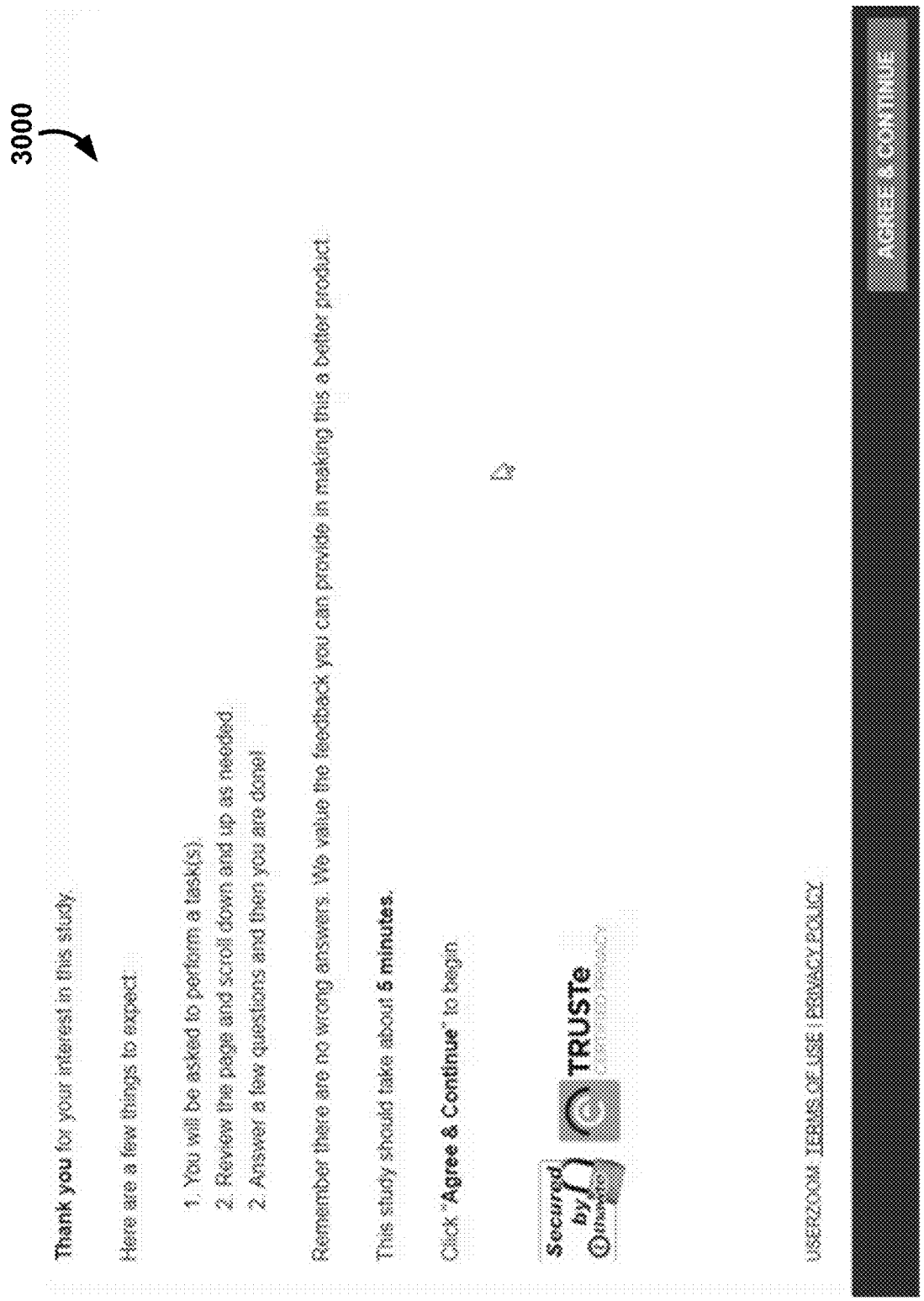

Using this sampling guidance, the user is able to make selections of the participant requirements, as seen at 2600 of FIG. 26. Additional screener questions beyond the basic filtering criteria may additional be generated (or leveraged from a library of existing questions) as seen at 2700 of FIG. 27. After setting up the participant selection requirements, the user is again redirected to building out of the study. The user is first required to generate a welcome page for the participants to first see, as shown at 2800 of FIG. 28. This welcome page may be generated from scratch by the user, or may be leveraged from another project, as seen at 2900 of FIG. 29. An example of the welcome page is provided at 3000 of FIG. 30.

Figure 31A:
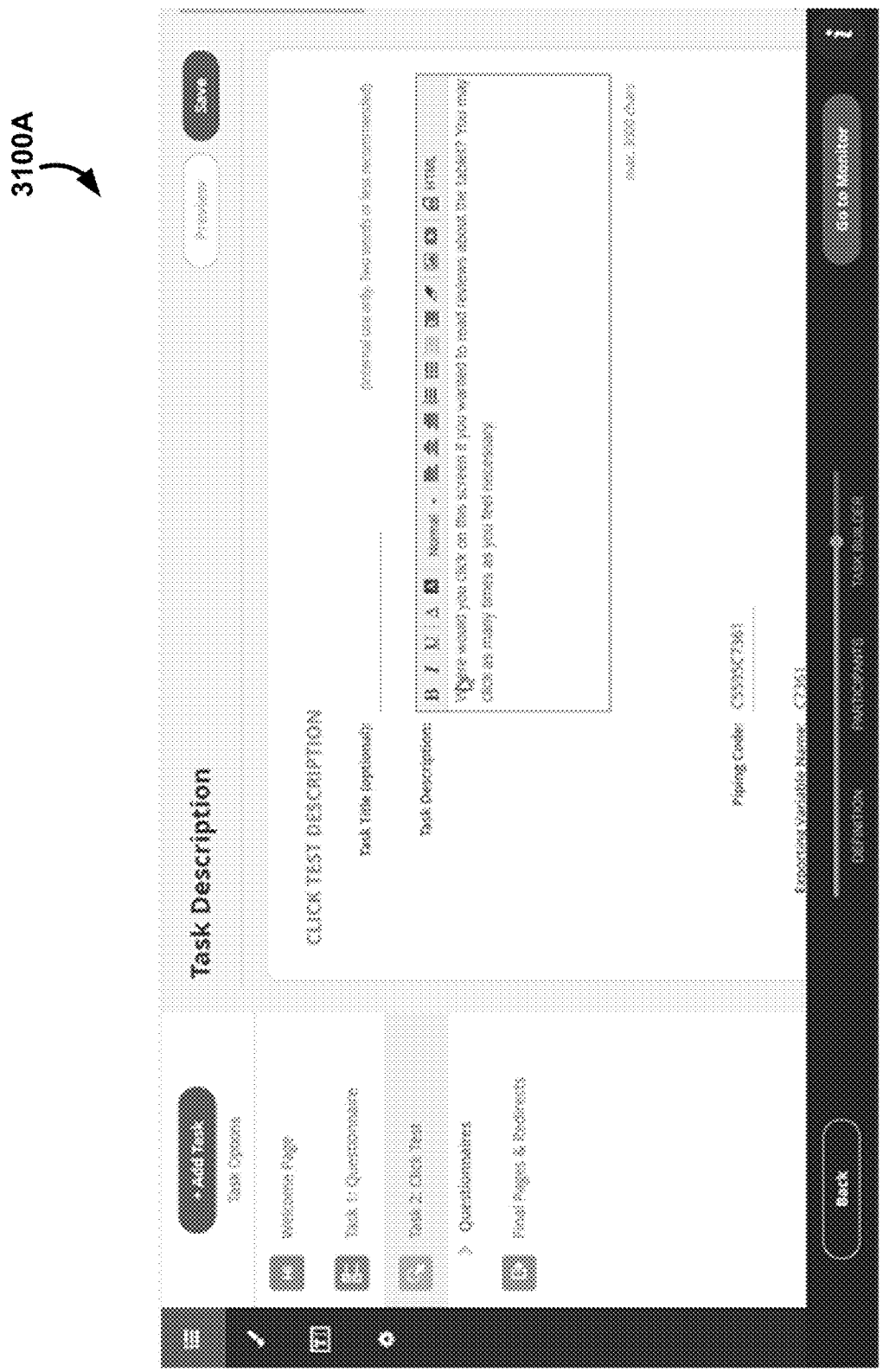
Figure 31B:
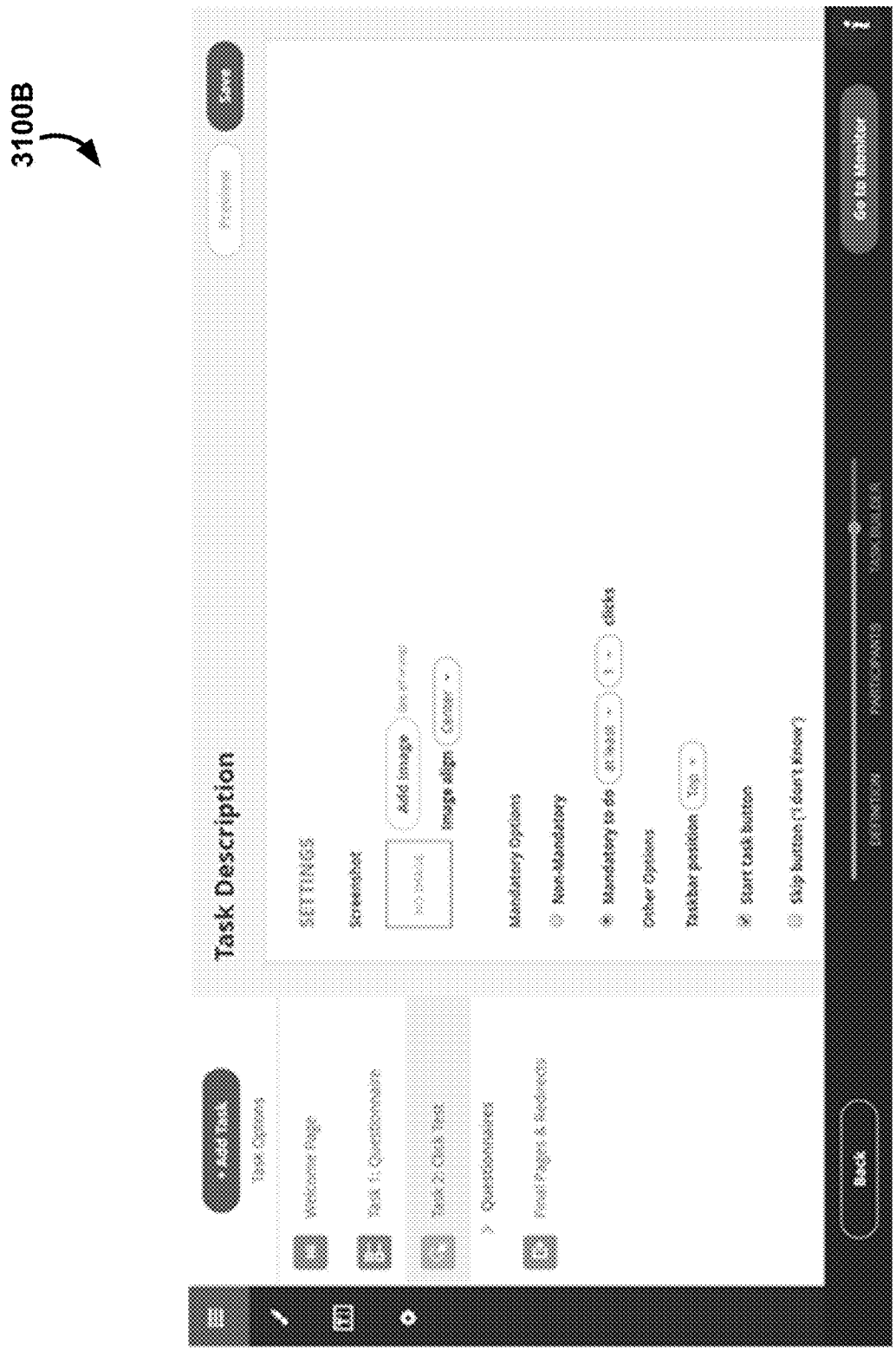

Subsequent to configuration of the welcome screen, the user is tasked with building out the tasks. FIGS. 31A and 31B provide an example of the screens 3100A and 3100B that are used to generate the study. The user inputs in a task description, including uploading an image for the click test study, determining if any specific actions are mandatory for the participants to do, as well as additional interface options (such as task bar visualization, various button options to the participant, etc.)

Figure 32:
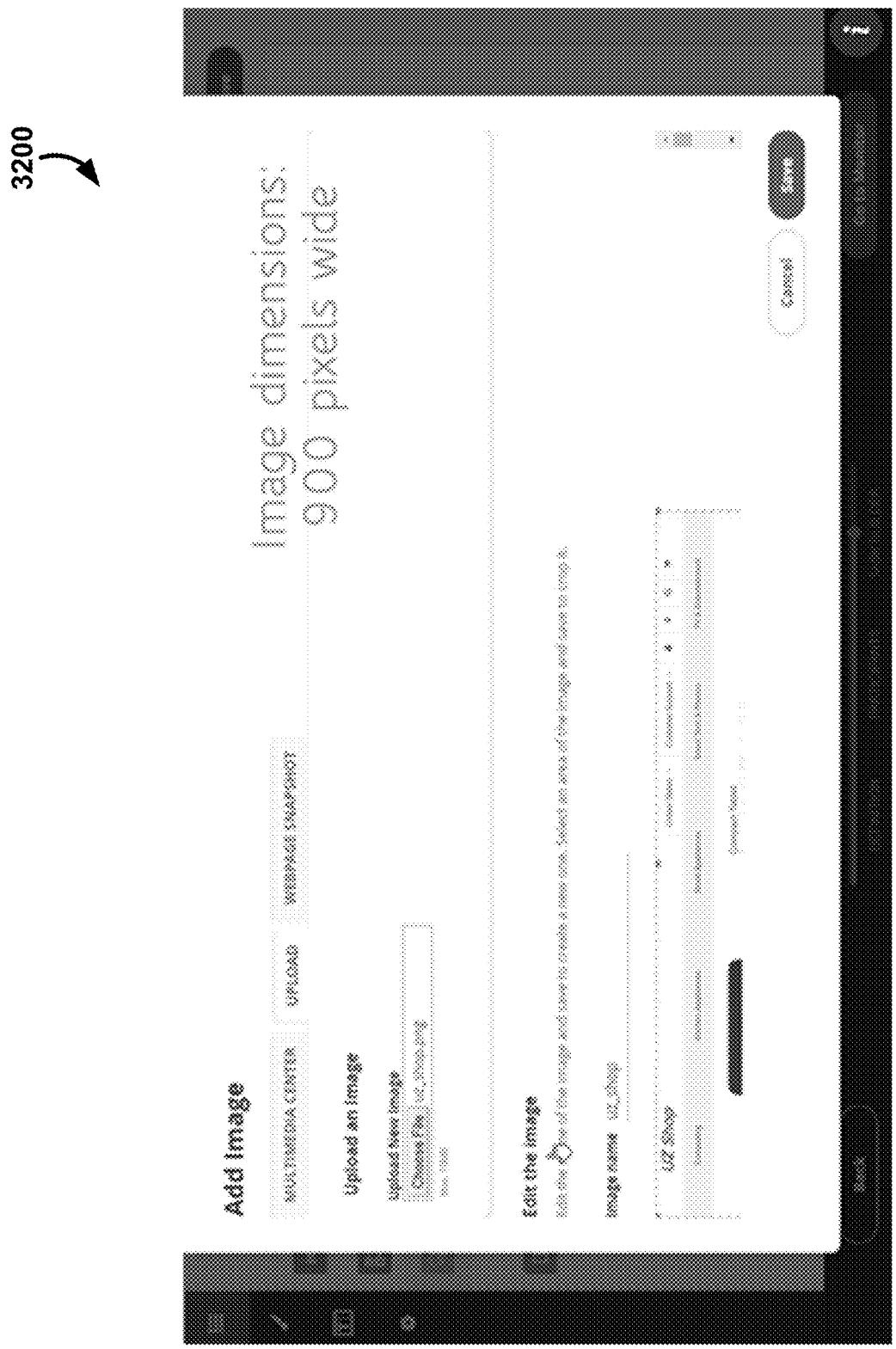
Figure 33:
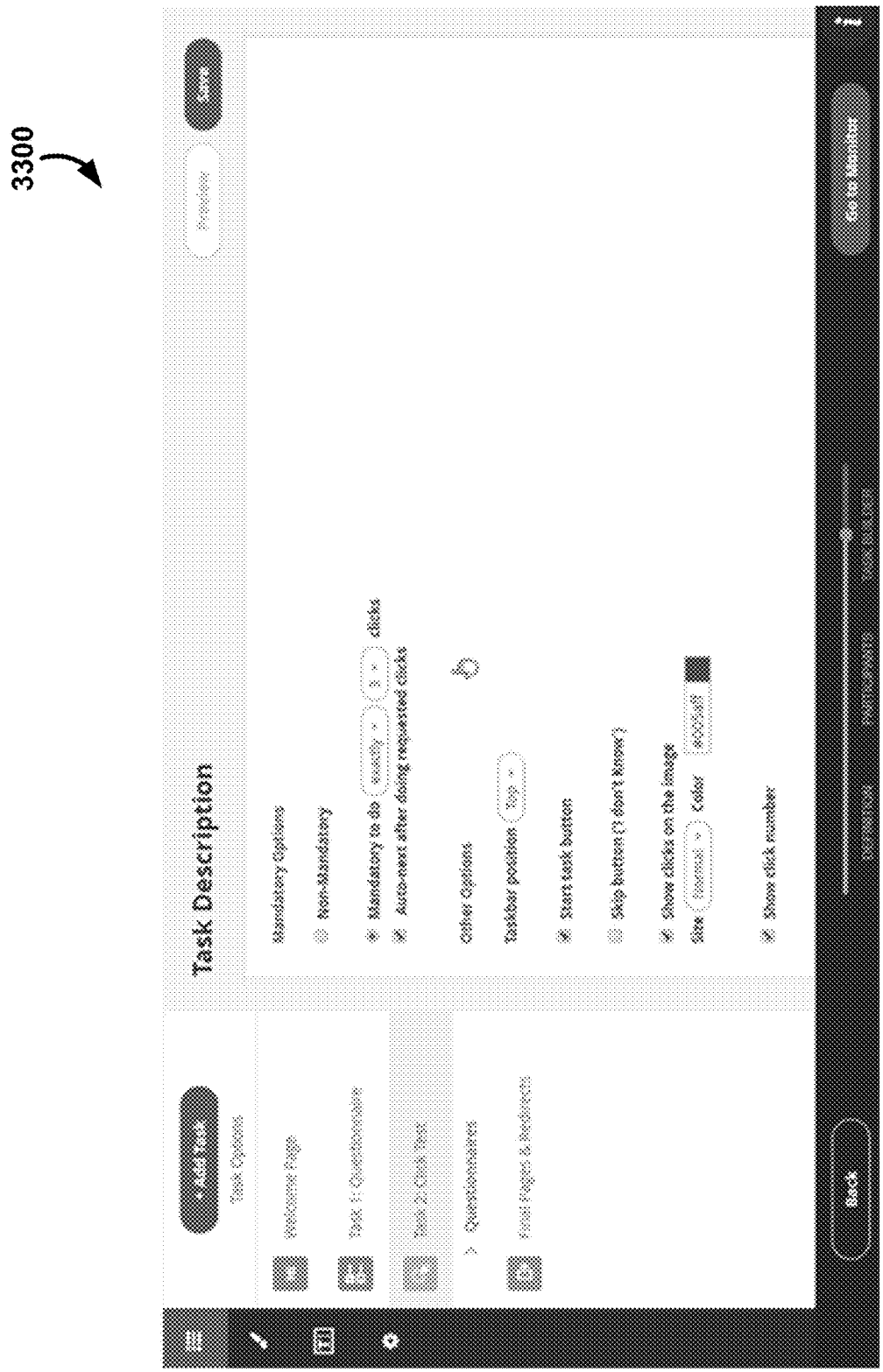
Figure 34:
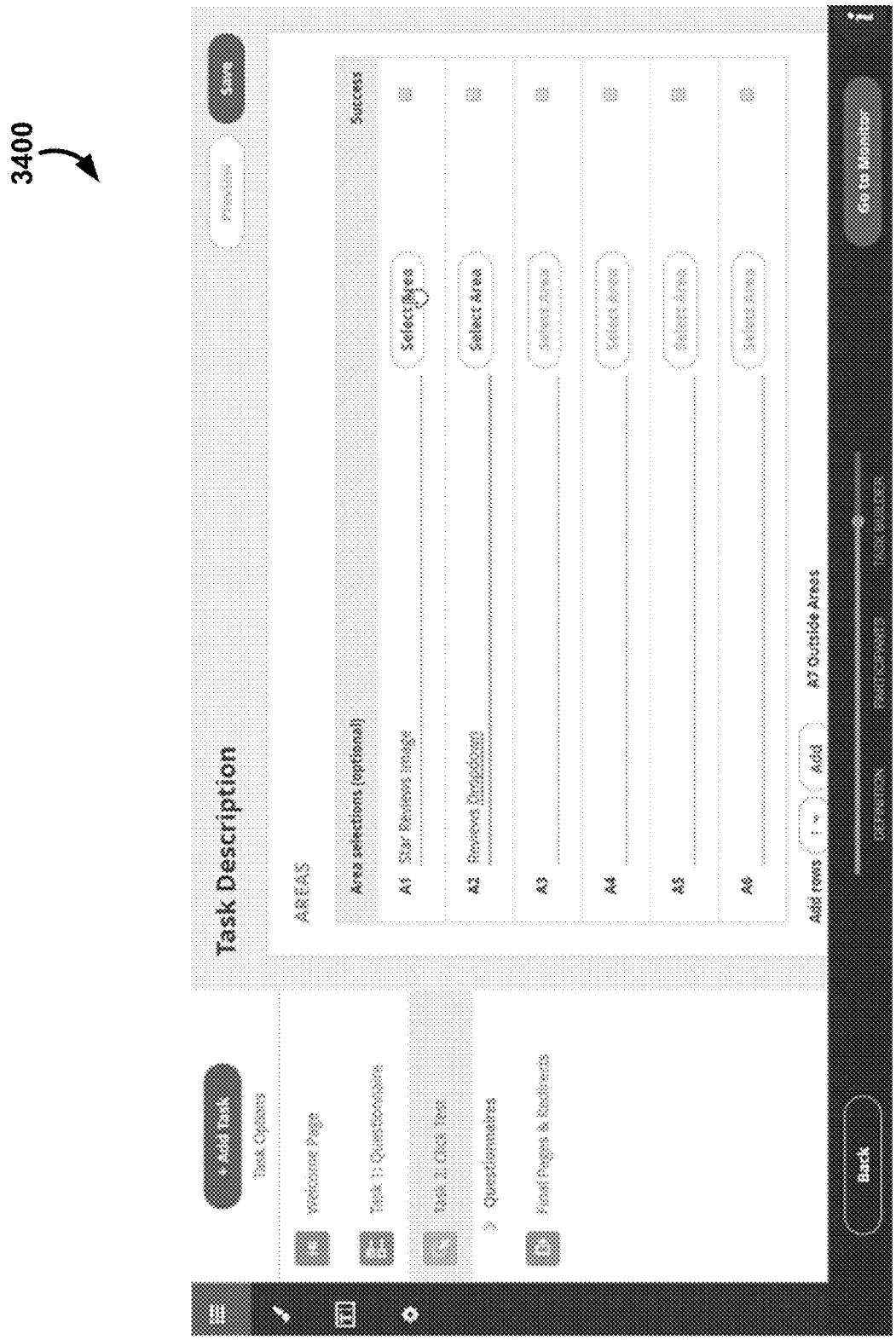
Figure 35:
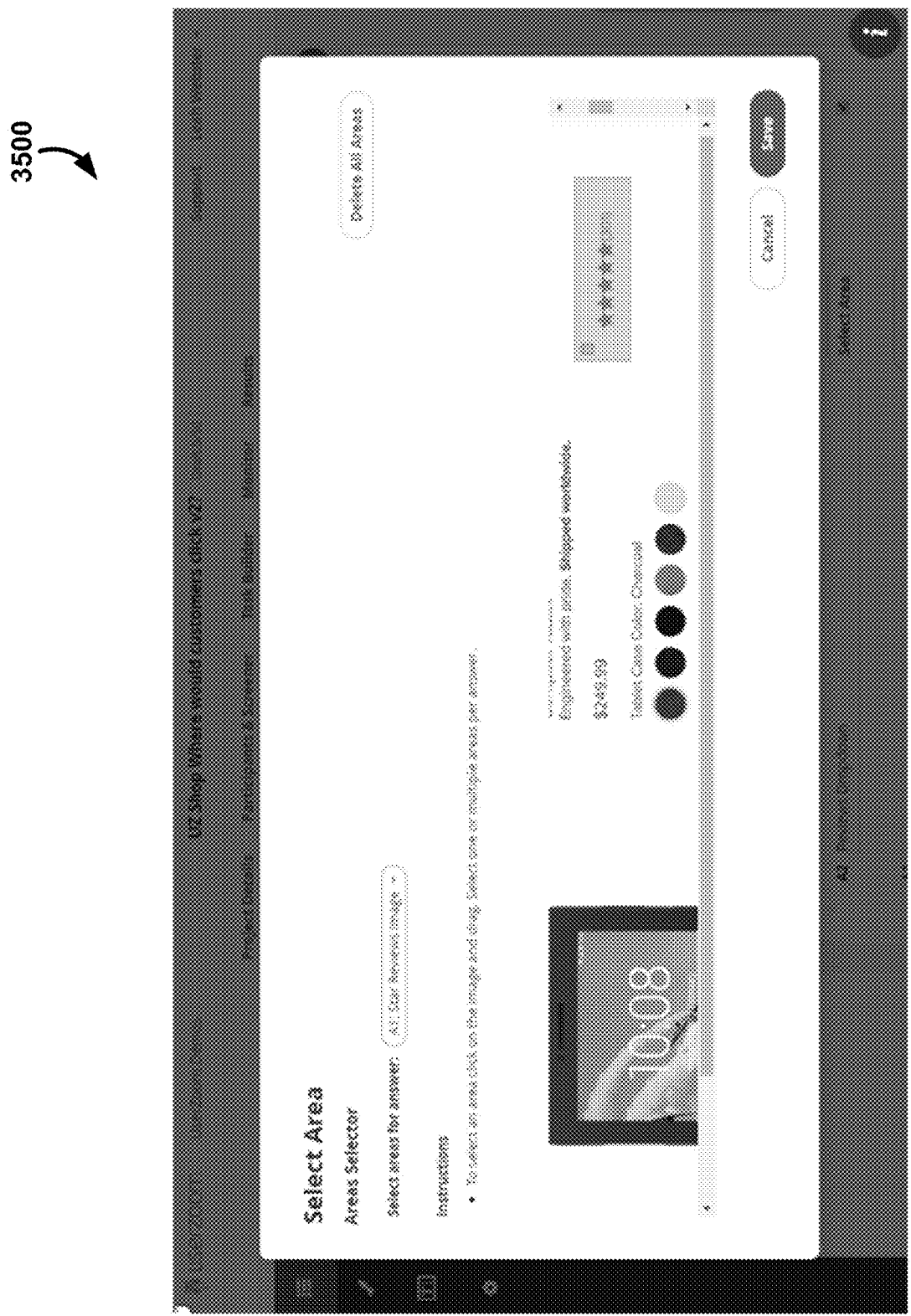

Upon selection of the addition of an image, the user is redirected to a screen 3200 for the choosing of the image for uploading, and tools to edit the image, such as altering the color, contrast and saturation, or cropping the image (if desired), as seen at FIG. 32. Once uploaded, the user has the option to further configure the task, including selecting a color/size for the clicks to be illustrated, as seen at 3300 of FIG. 33. Additionally, the "answers" for the task need to be defined, as seen at 3400 of FIG. 34. The user labels the answers, and then selects an area of the image that was uploaded to correspond to the given answer, as seen at 3500 of FIG. 35.

Figure 36:
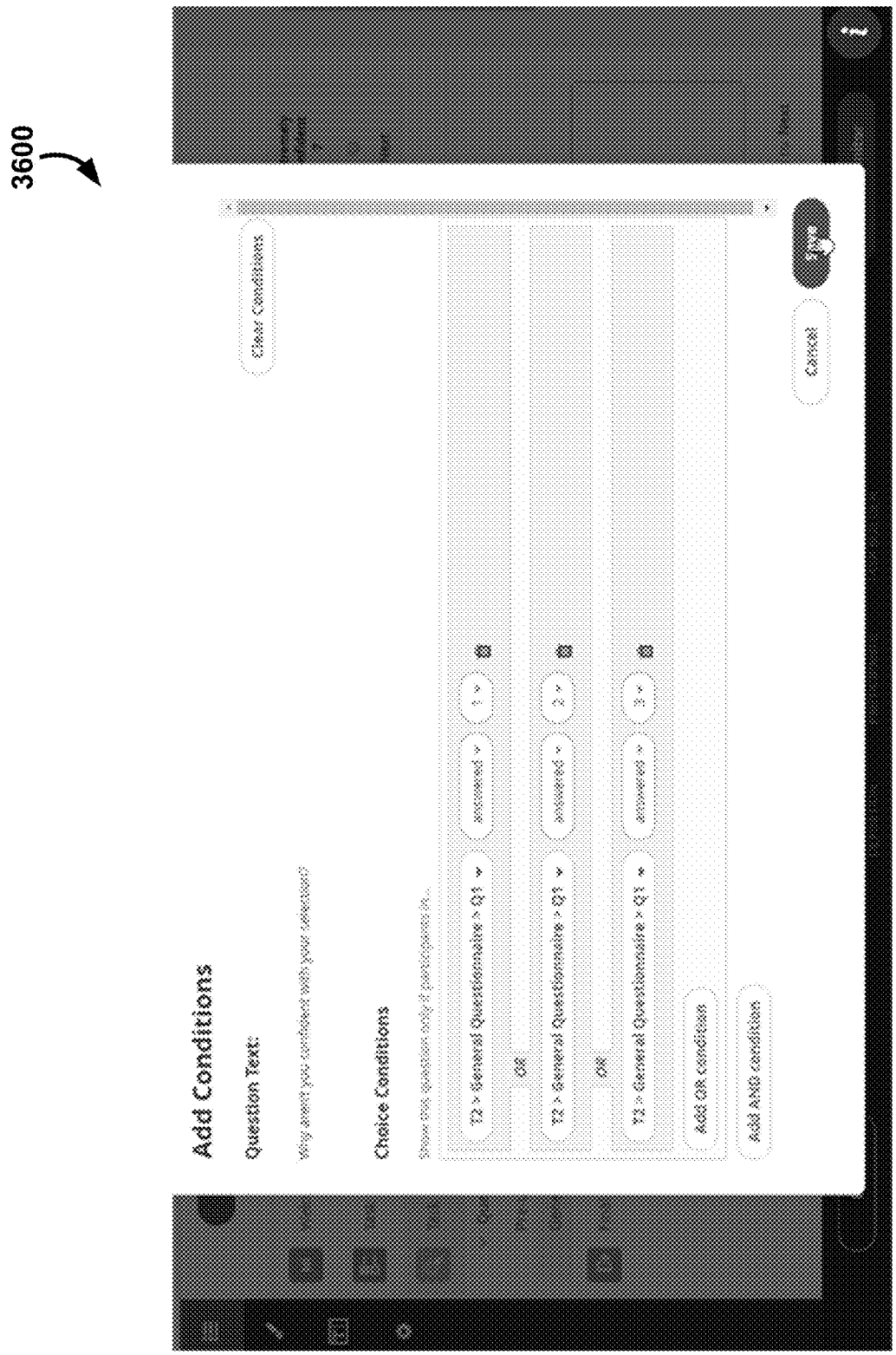
Figure 37:
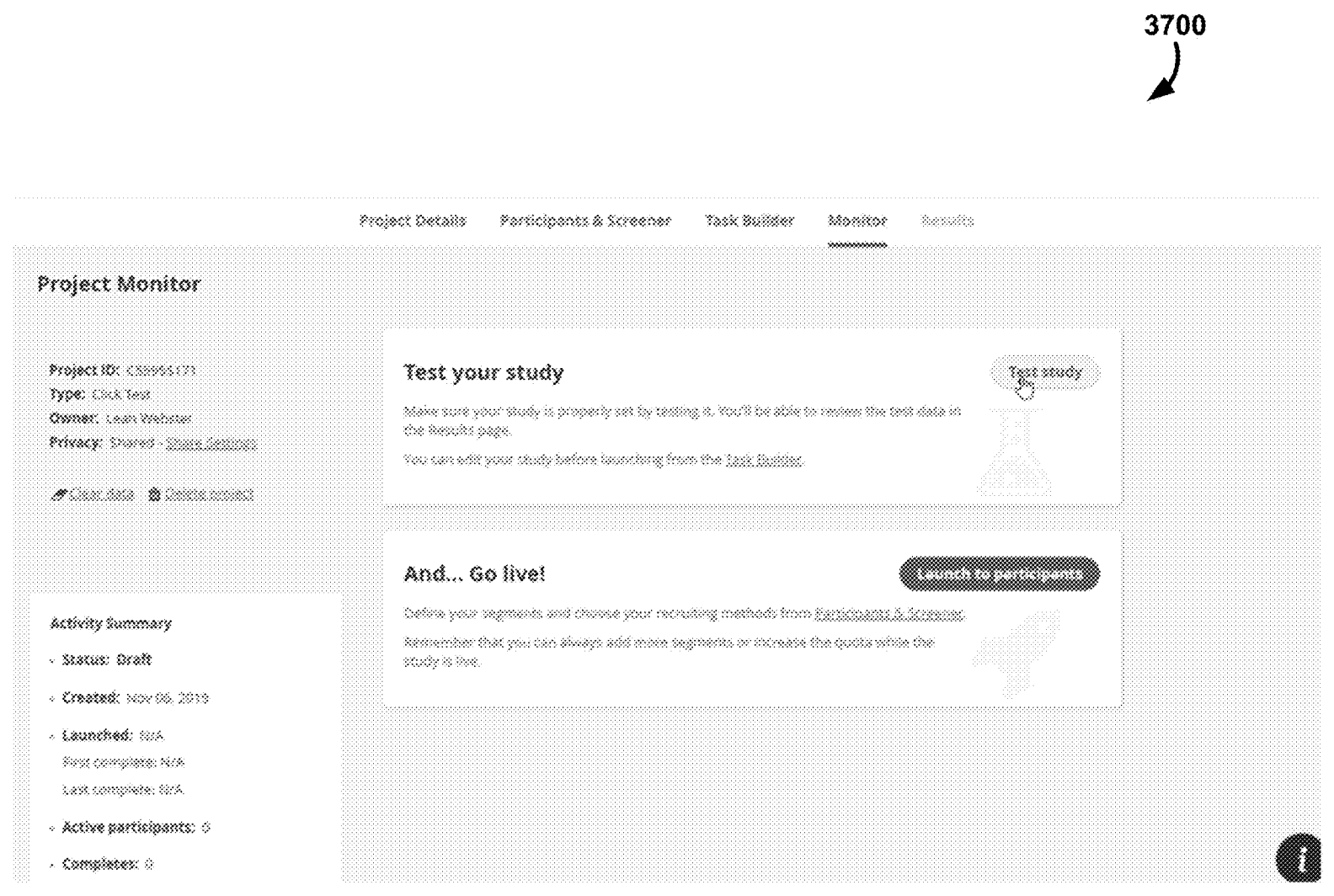
Figure 38:
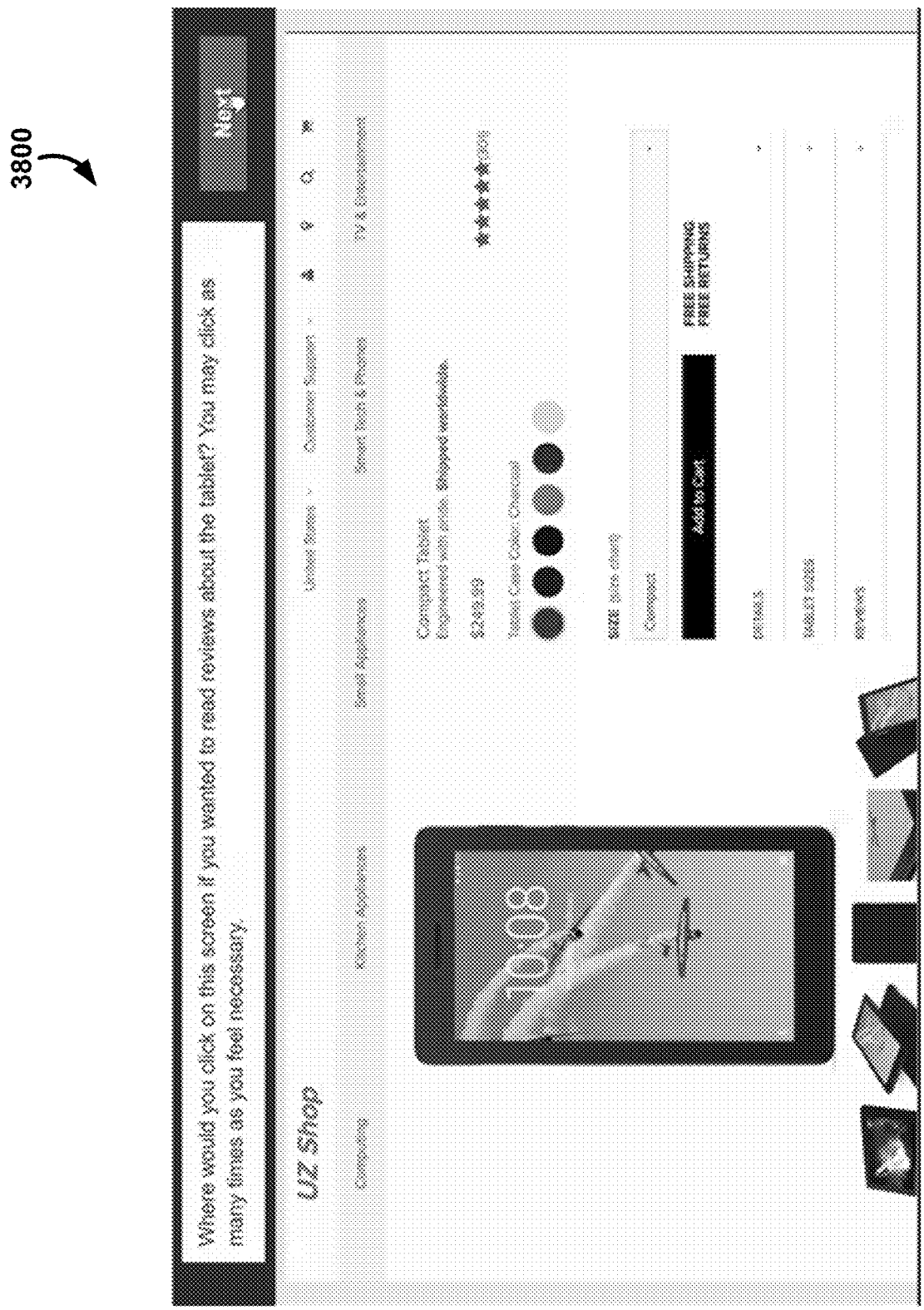
FIGS. 38-41 are example illustrations of the administration of the click test, in accordance with some embodiment.
Figure 39:
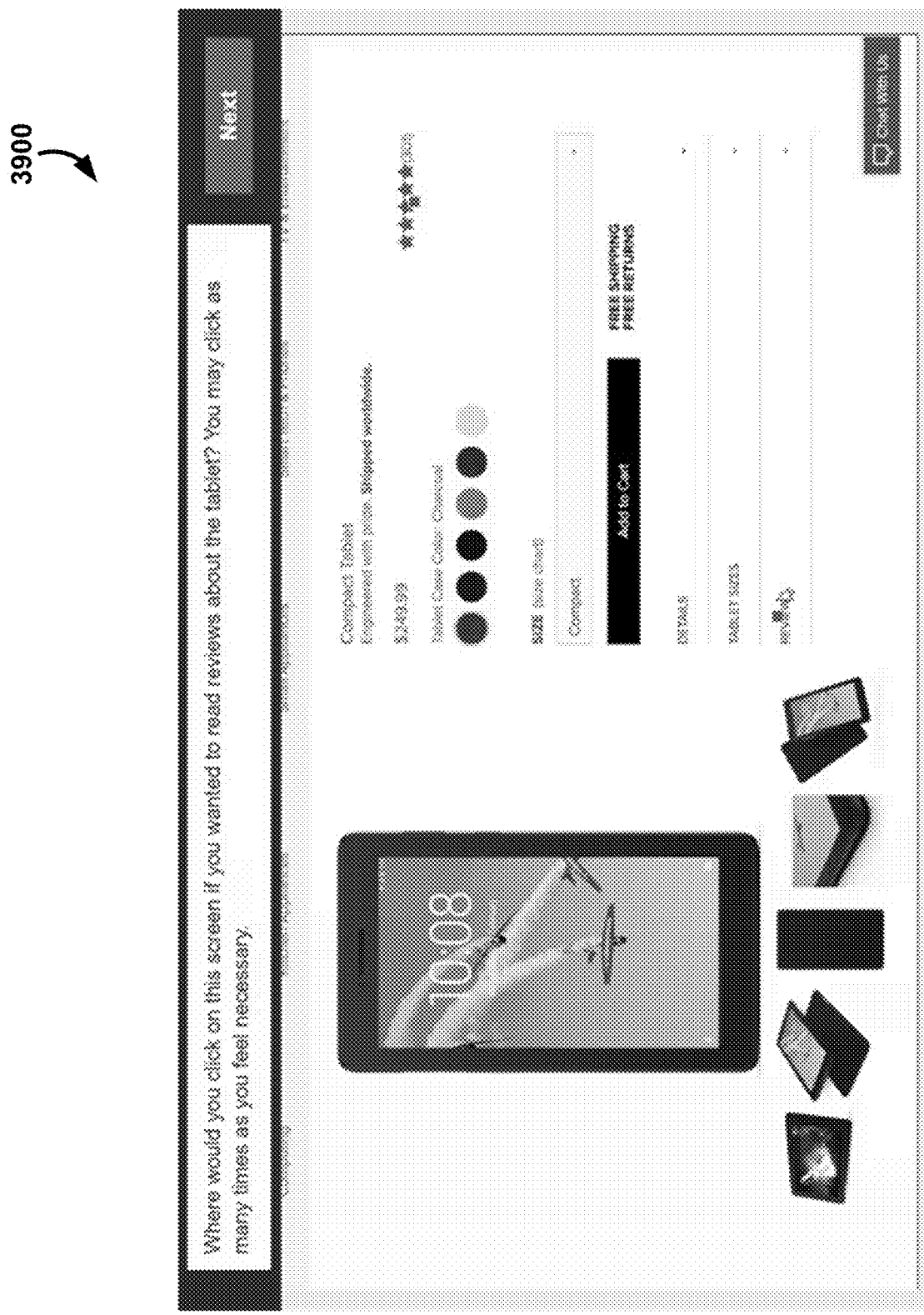
Figure 40:
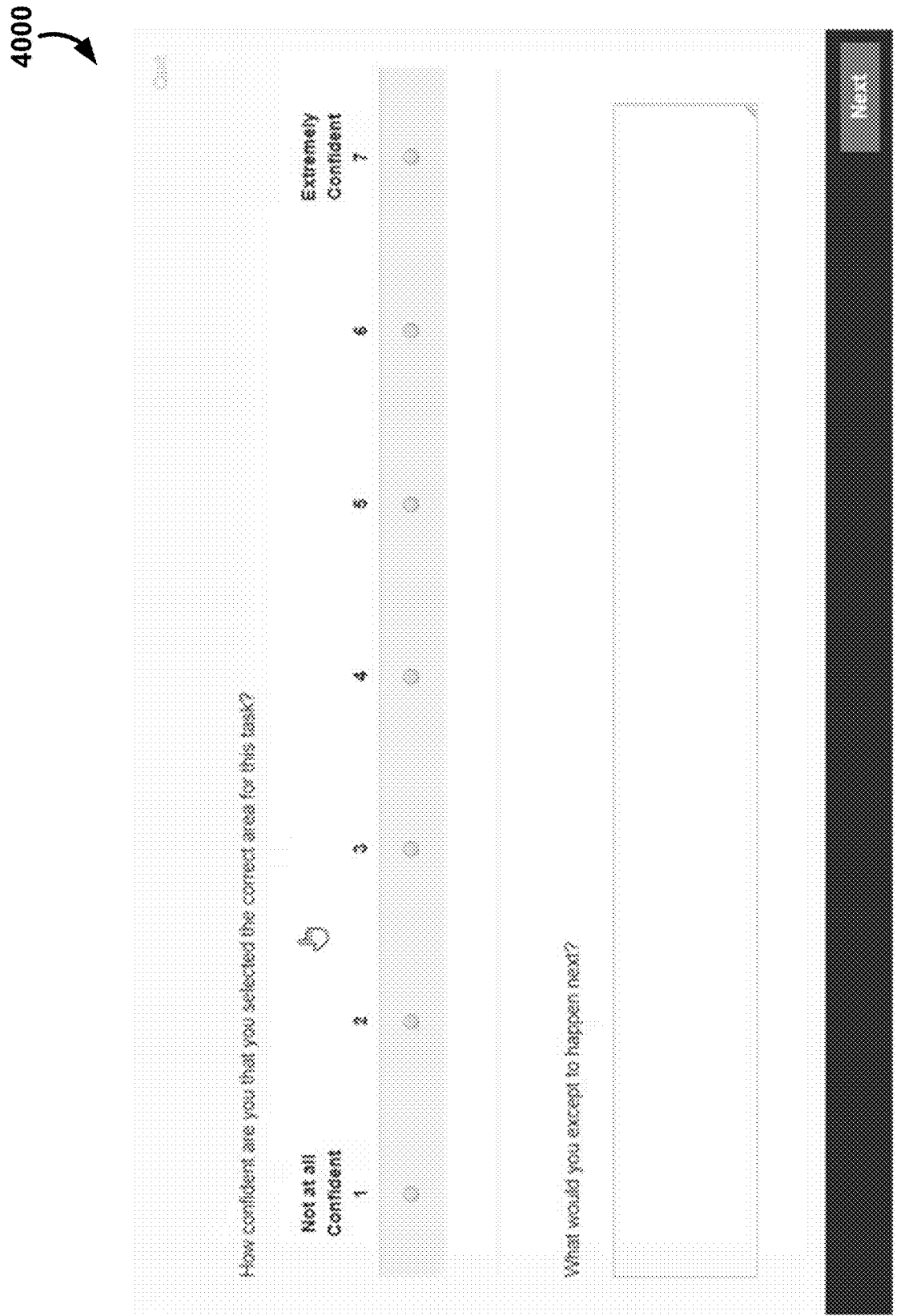
Figure 41:
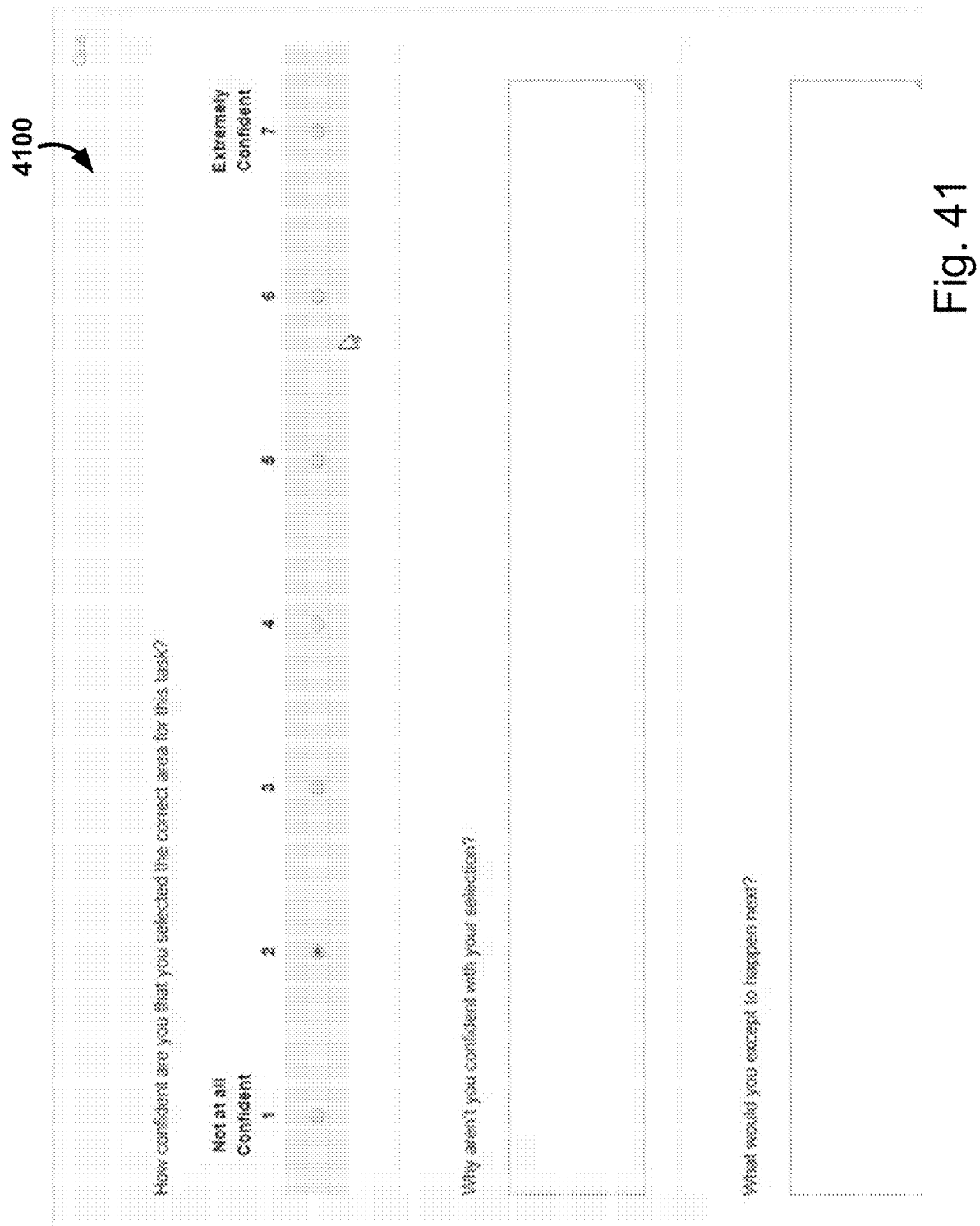

Follow-up questions may likewise be defined, at 3600 of FIG. 36. These questions may be mandatory (such as the initial question illustrated in this example screen), or may be conditional, as seen here if the answer to question one is rated a 1, 2 or 3. This completes the click test study generation. Afterwards, the user is given the option to test the study, or to "go live" with the study with actual participants, as seen at 3700 of FIG. 37. An example of the live study is seen at 3800 of FIG. 38. The task is written at the top of the page, and the participants are invited to respond accordingly. At this stage the participant clicks, or selects, portions on the image in response to the tasks. In this example, the task is to click in the location where the user would navigate to read reviews. Once the user clicks on the image, based upon configurations, the location of the clicks is displayed to the participant, as seen in FIG. 39 at 3900. After the participant completes the study task, they are redirected to the follow up question defined by the study author. In example FIG. 40, at 4000, the participant is asked to rate their confidence in the task, and answer a question about what they expect to happen next. As noted in the previous example of the study generation, an additional conditional question is displayed if the participant indicates that they are not confident with the task, as an example, shown in FIG. 41 at 4100.

Figure 42:
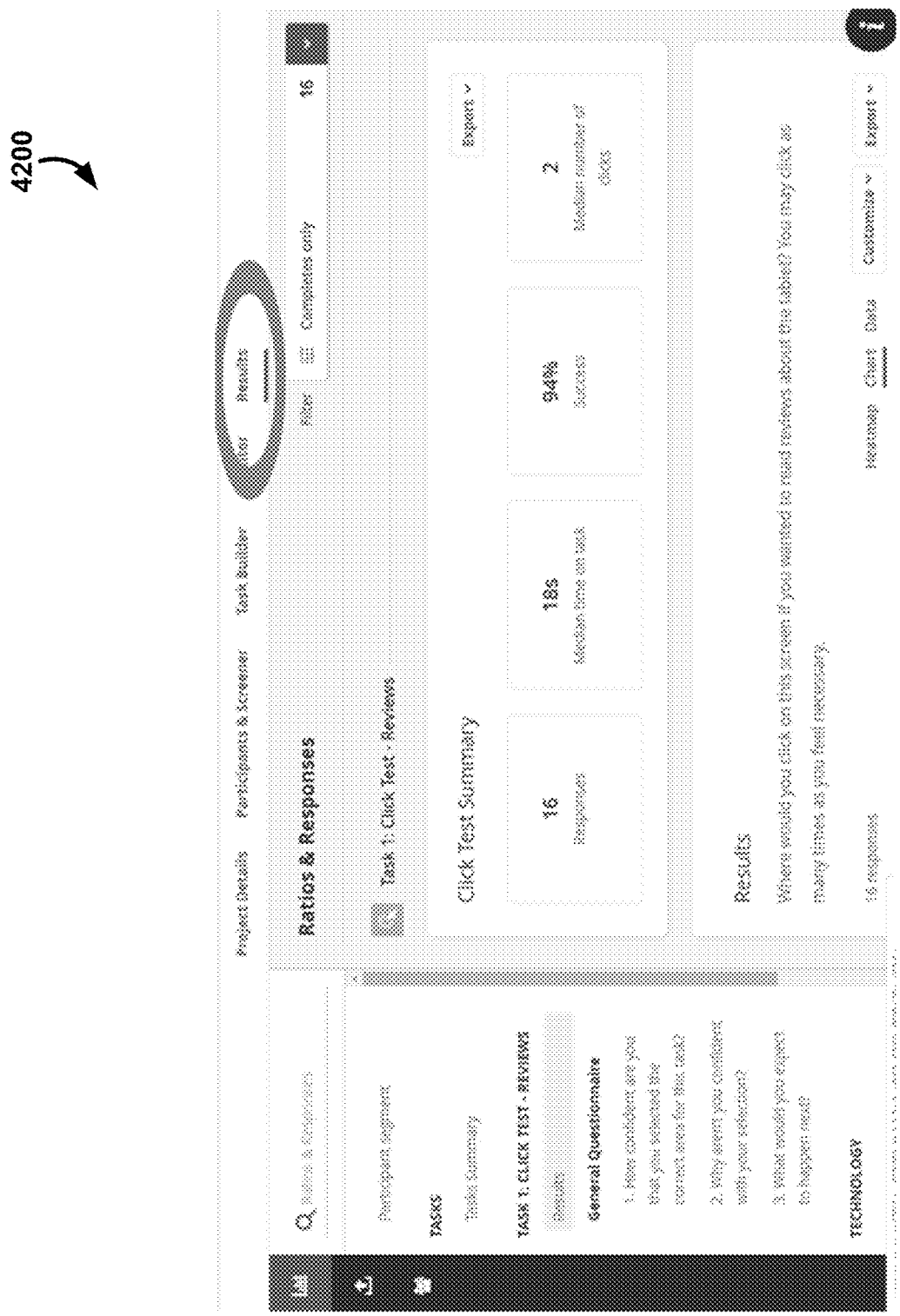
FIGS. 42-52 are example illustrations of the analysis of the click test, in accordance with some embodiment.
Figure 43A:
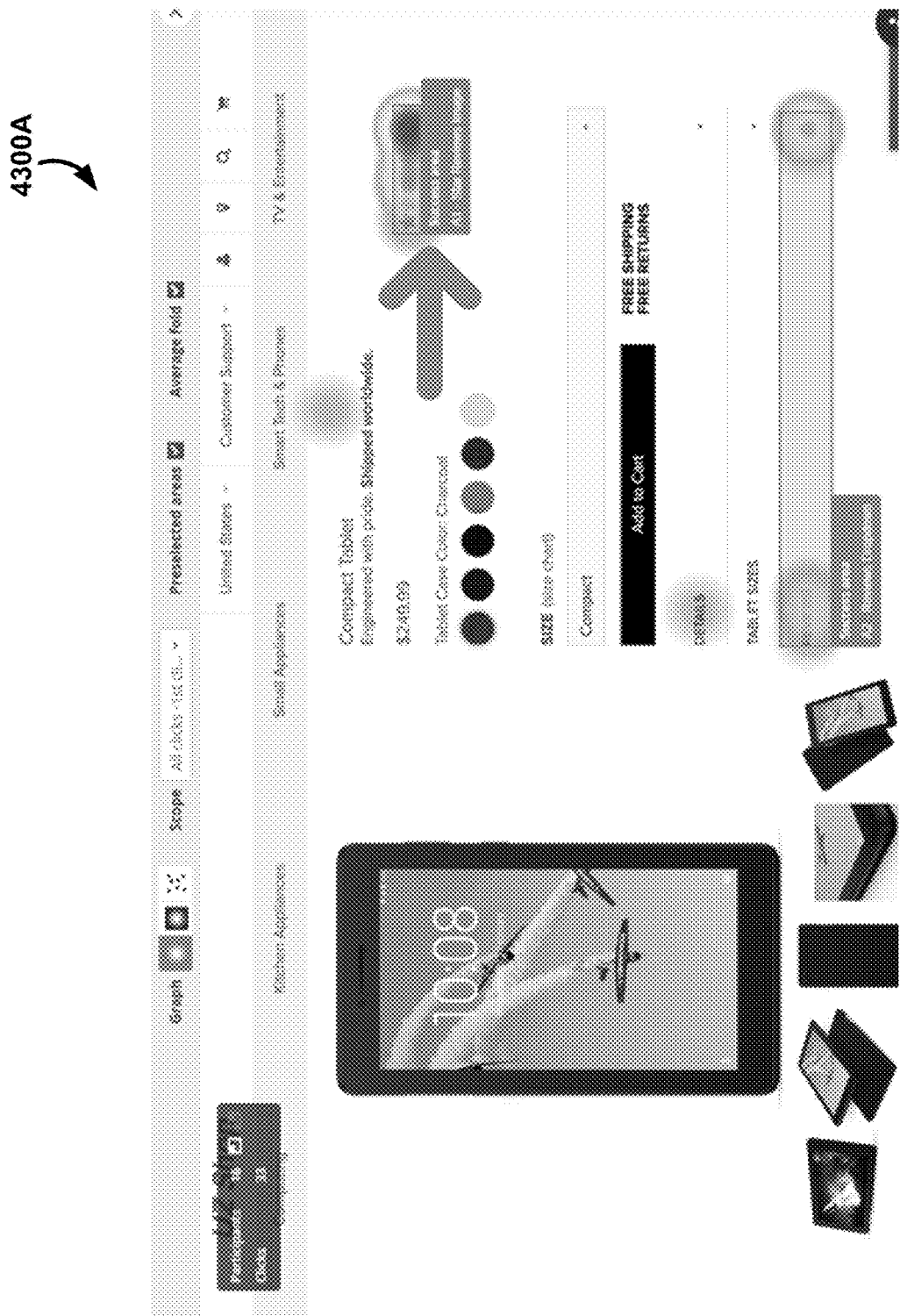

Moving on, after participants complete the study, the study author may analyze results. First the user is presented with a summary of the click test summary, including percent successful completion, timing of the study, average number of clicks taken, and the number of participants that engaged in the study, as seen in example FIG. 42 at 4200. Here the results tab is circled for emphasis. When selected, the user is provided with a number of analytical options. For example, at FIG. 43A at 4300A, a first heat map is generated for a webpage screenshot image using this click test. In this first heat map only the click locations are illustrated. In this example, the user defined the "star" hyperlink as a successful 'answer' to the prompt/question. Fewer, participants clicked below of the review box, and a single participant selected the "details" link.

Figure 43B:
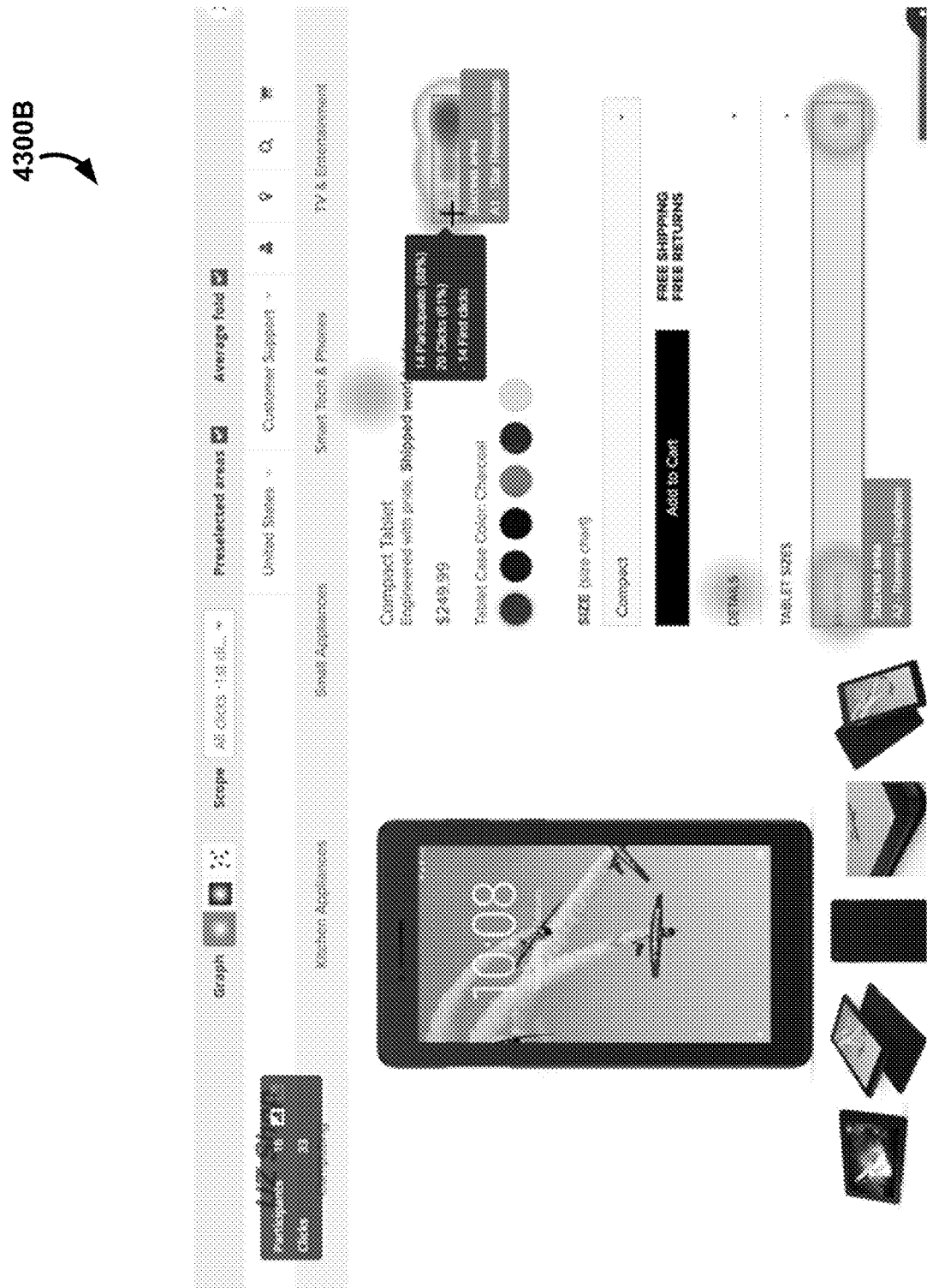
Figure 44:
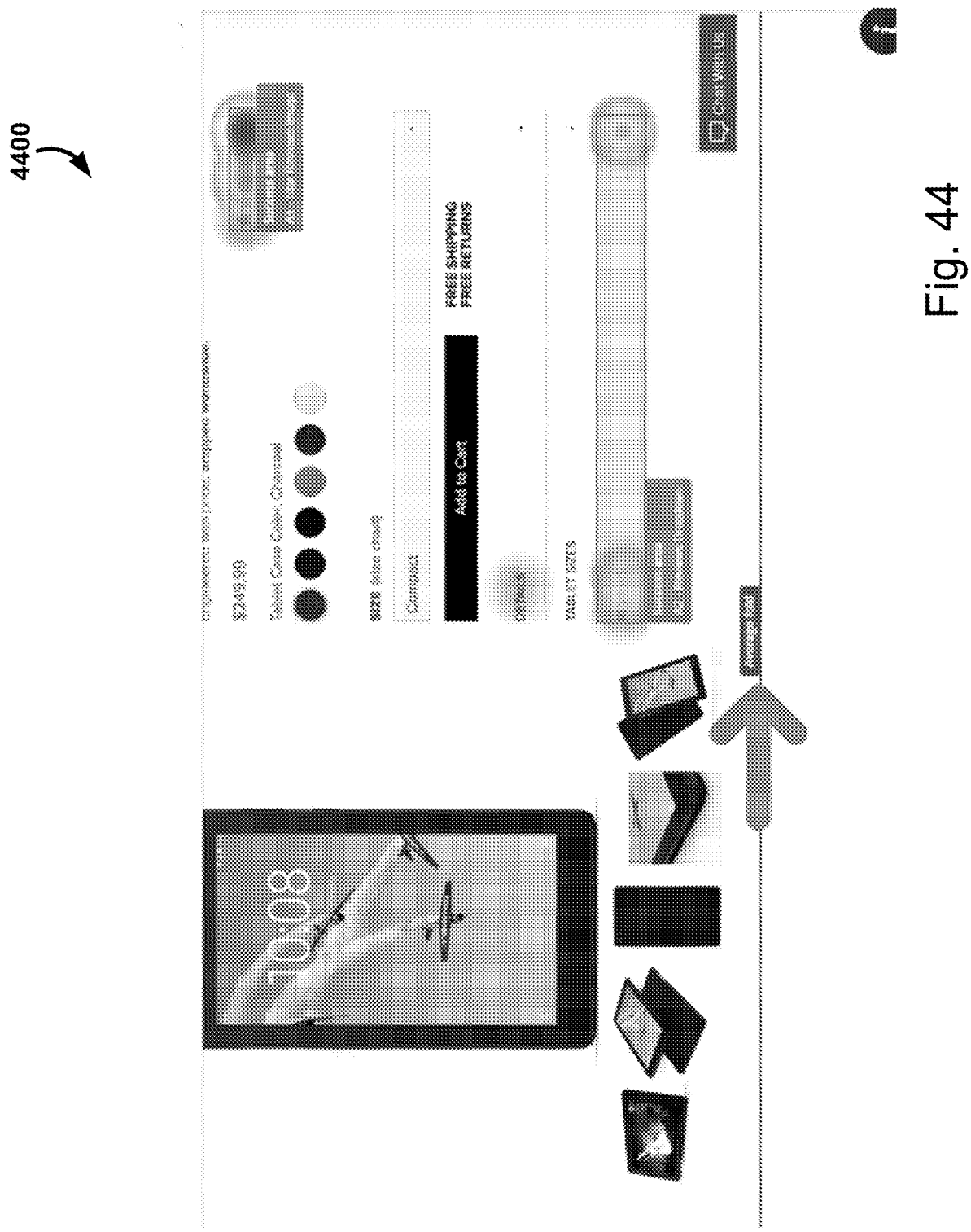

At FIG. 43B at 4300B, the user is able to hover over the cursor over a particular cluster of the heat map to see specifics of the selection, such ad number of participants, clicks percentages, and number of the clicks that are first selections. Importantly, the user is also shown the average fold level of the screenshot, as seen at 4400 of FIG. 44. The purpose of this is to illustrate the available real estate shown to the participants without the need to scroll down the page. This region of the interface if coveted real estate as most users won't bother scrolling further unless there is particular interest in the product. Any frustration with a task requiring scrolling can derail the user experience in an extremely detrimental manner. As such, from this example task, it can be seen that the vast majority of users correctly select the stars at the top of the screen, and as such, the review field may be redundant. Since this real estate is so important, this can tell the page designer that this space of the screen may be better leveraged for other purposes.

Figure 45:
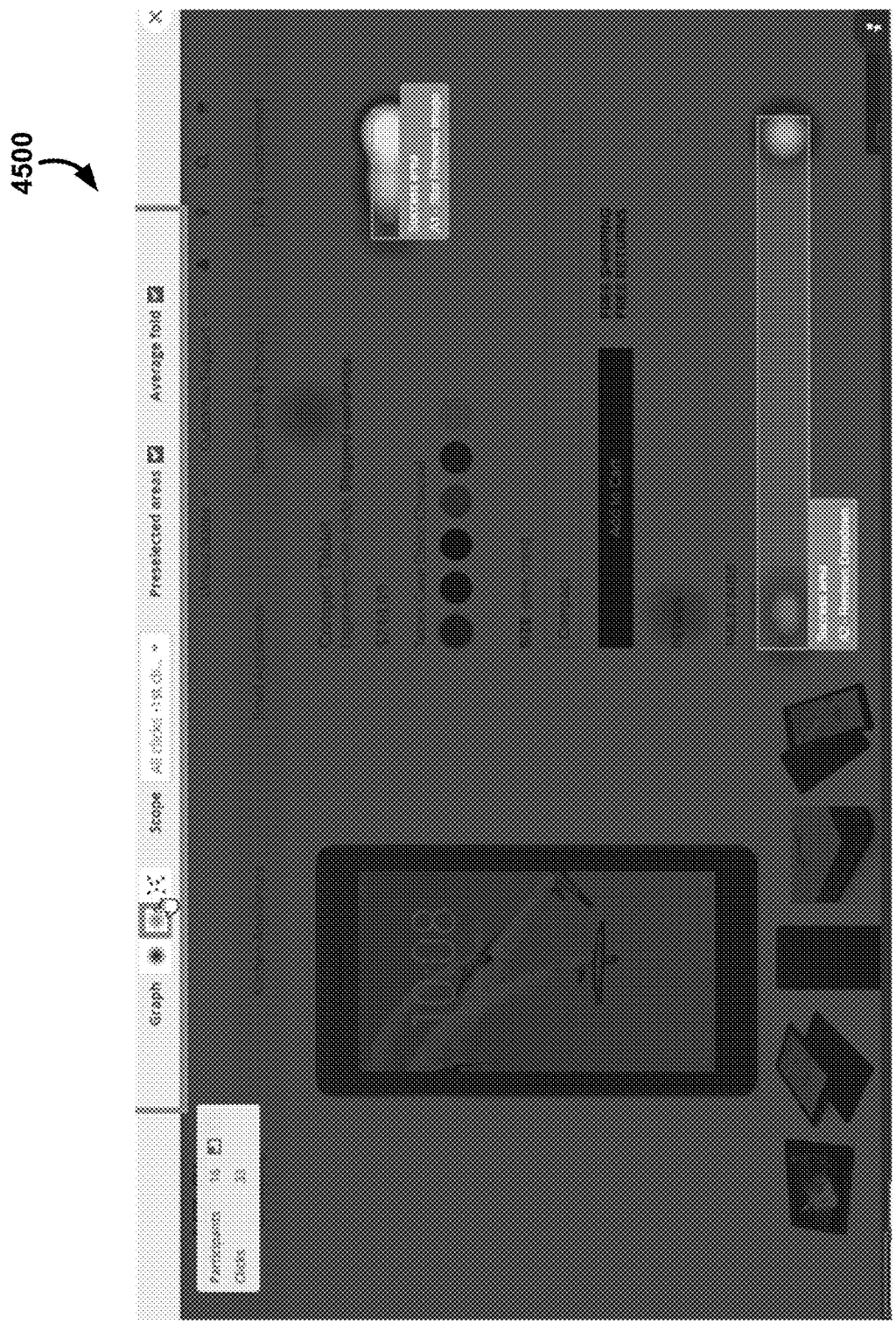
Figure 46:
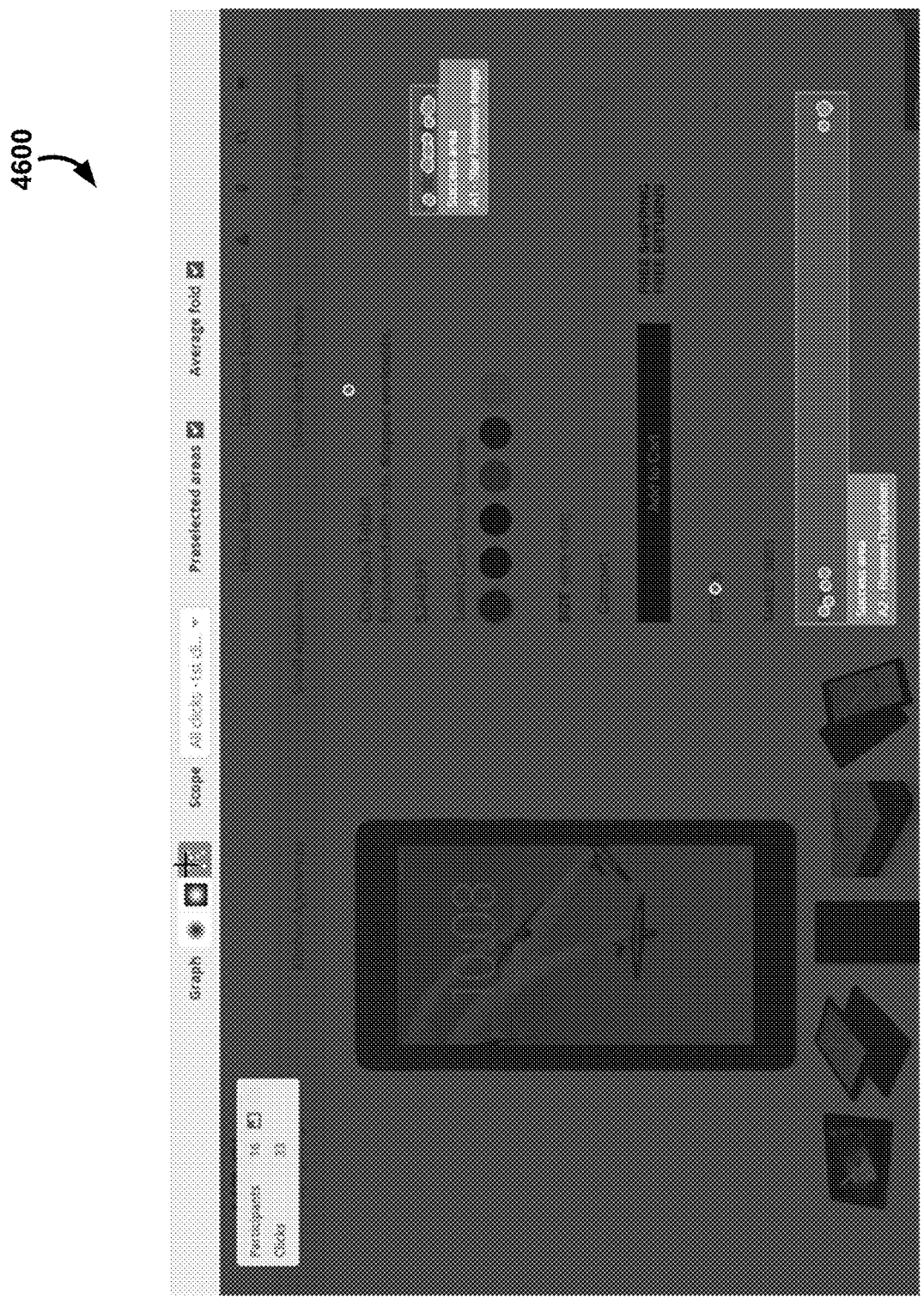
Figure 47:
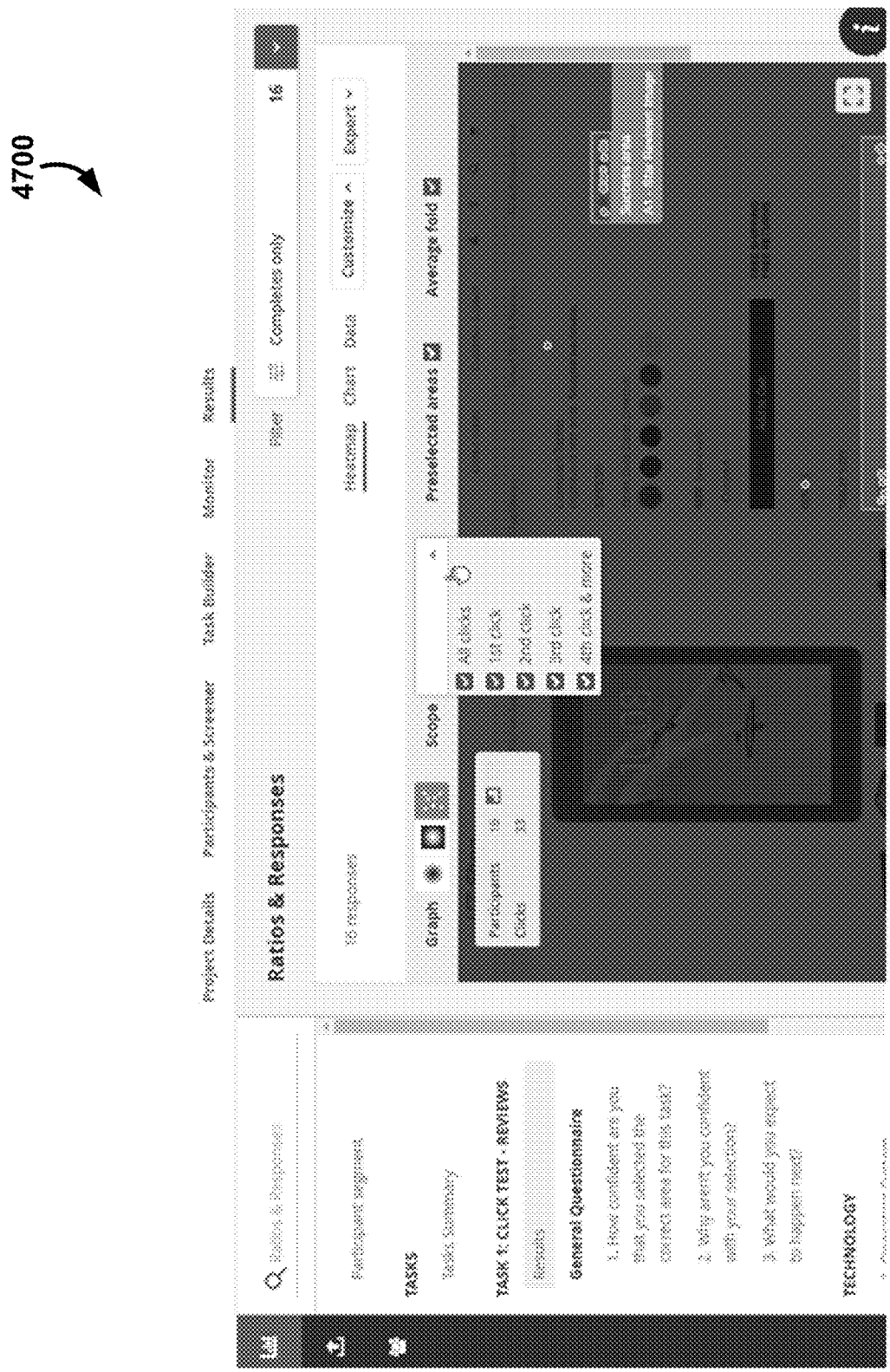

FIG. 45 provides an additional heat map interface with the heat map inverted/negative image with the background darkened, as seen at 4500. This heat map accentuates the click locations for user visibility. Similarly, FIG. 46 provides a negative image for the specific click locations of respondents (as opposed to a less granular heat map), as seen at 4600. The user may dive deeper into the analysis by selecting which click numbers to display, as well as illustrating other options like the fold location, preselected areas and map type, as seen at 4700 of FIG. 47.

Figure 48A:
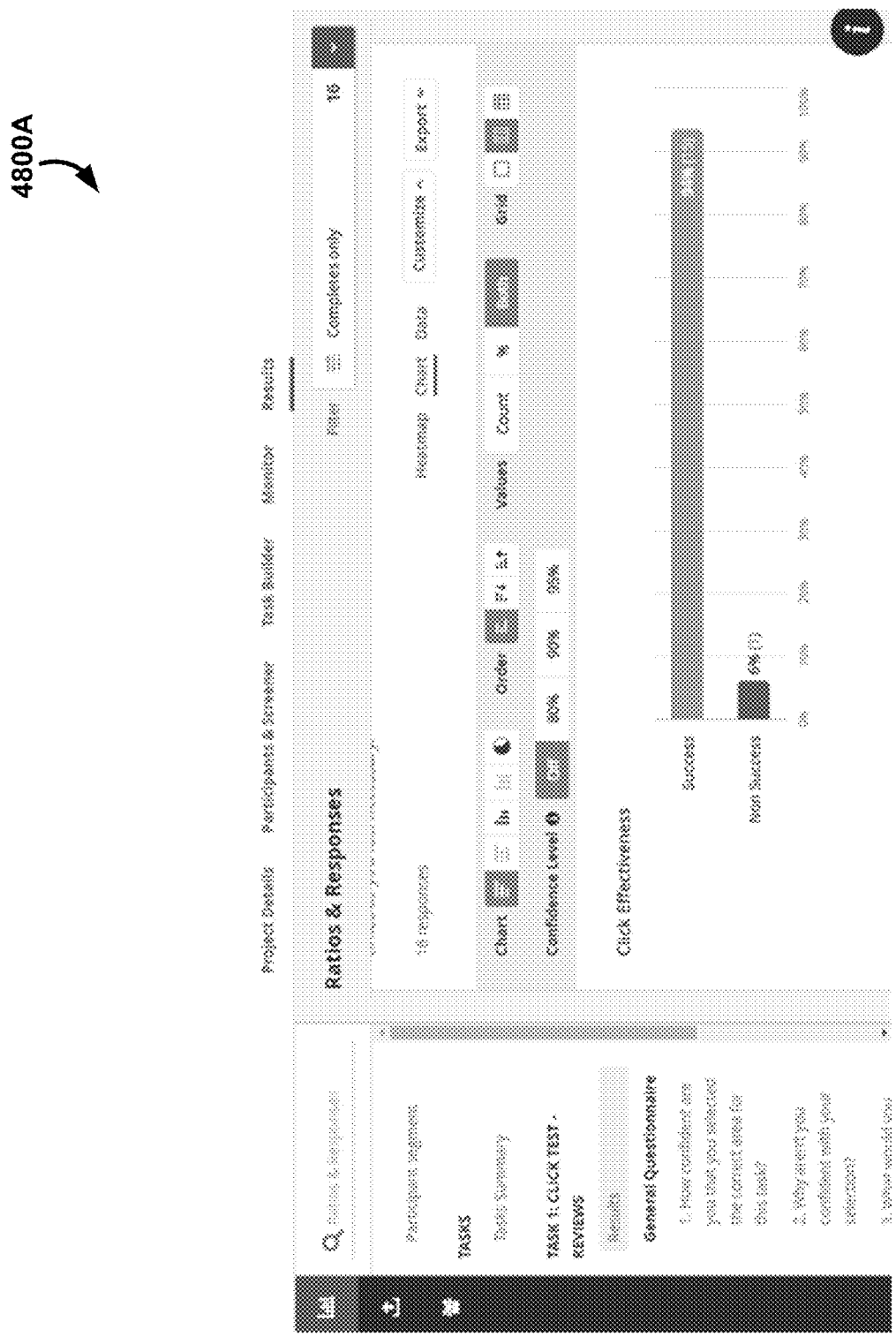
Figure 48B:
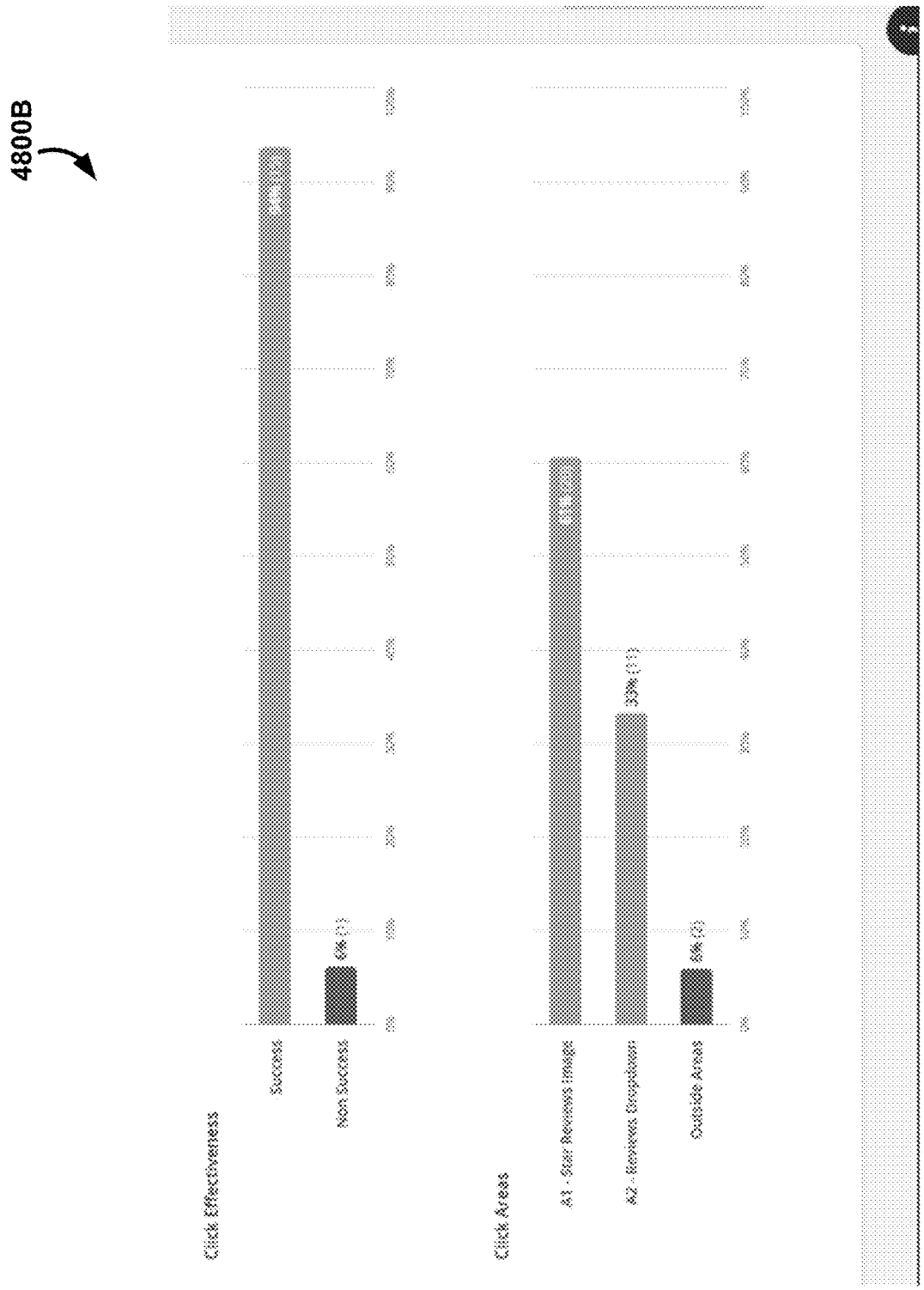

Additional analysis is likewise possible. In the results tab the user can view graphs about click effectiveness (success rating), and percentage of clicks in the designated areas. The user may alter the view between various histograms, pie graphs, and with or without confidence levels. These analyses are shown in reference to FIGS. 48A and 48B, at 4800A and 4800B, respectively.

Figure 49:
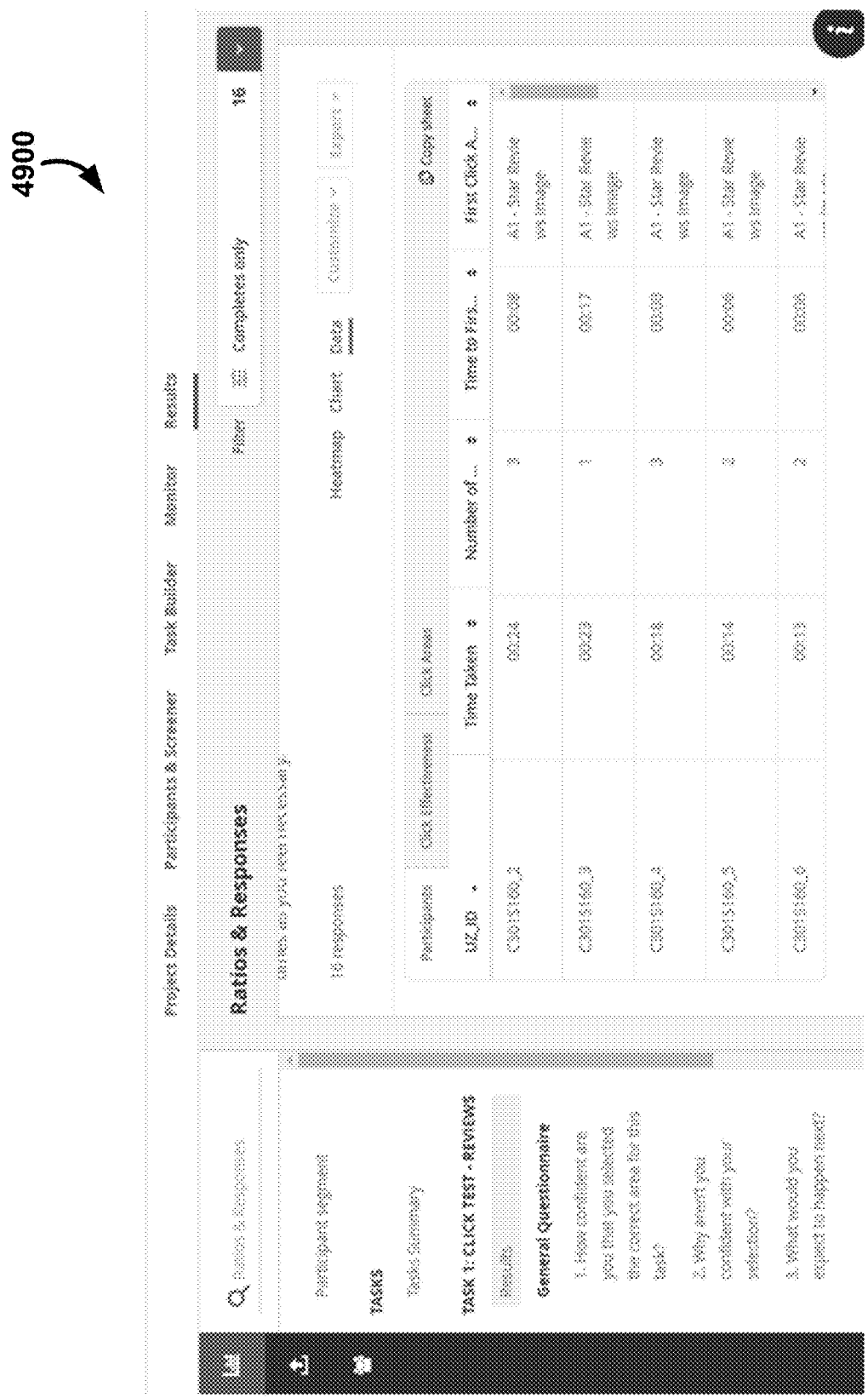

Further, more granular analysis is possible. For example, per participant metrics may be viewed, as seen at 4900 of FIG. 49. The participants are each displayed in relation to the time taken on the task, number of total clicks made by the individual, and the time to the first click. Additional information, such as the location of the first click may likewise be presented. The user may be able to configure the fields displayed.

Figure 50:
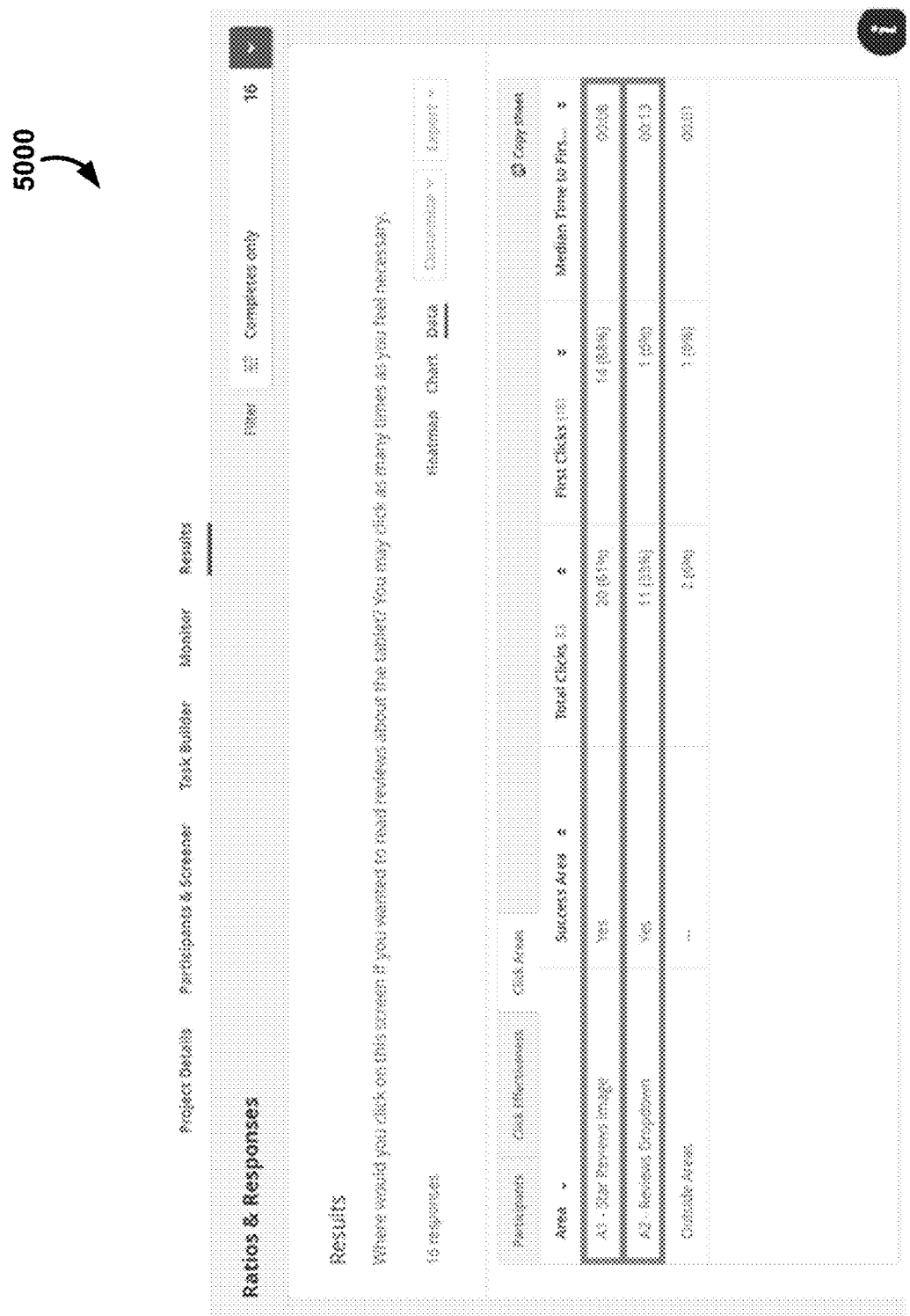
Figure 51:
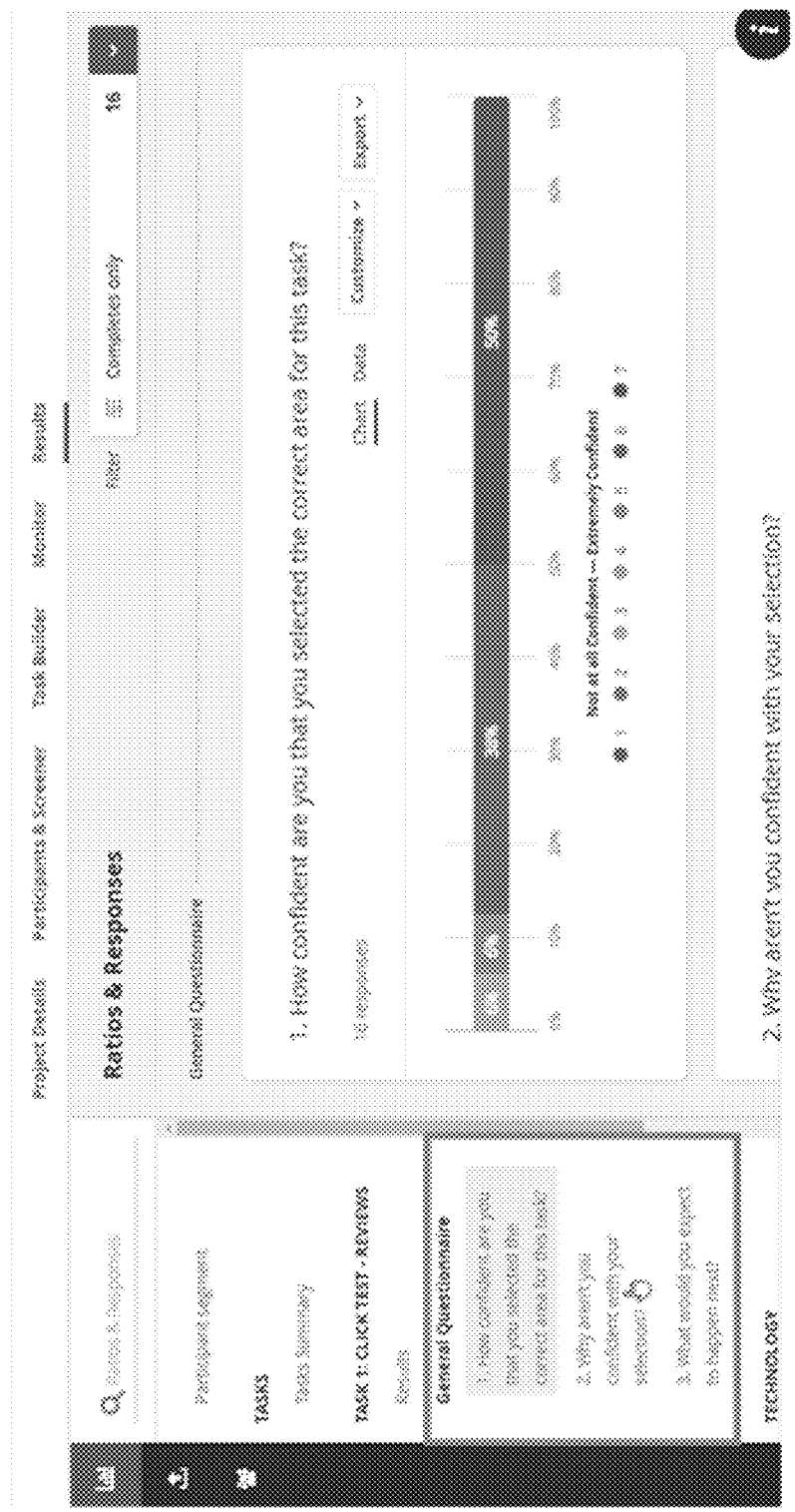
Figure 52:
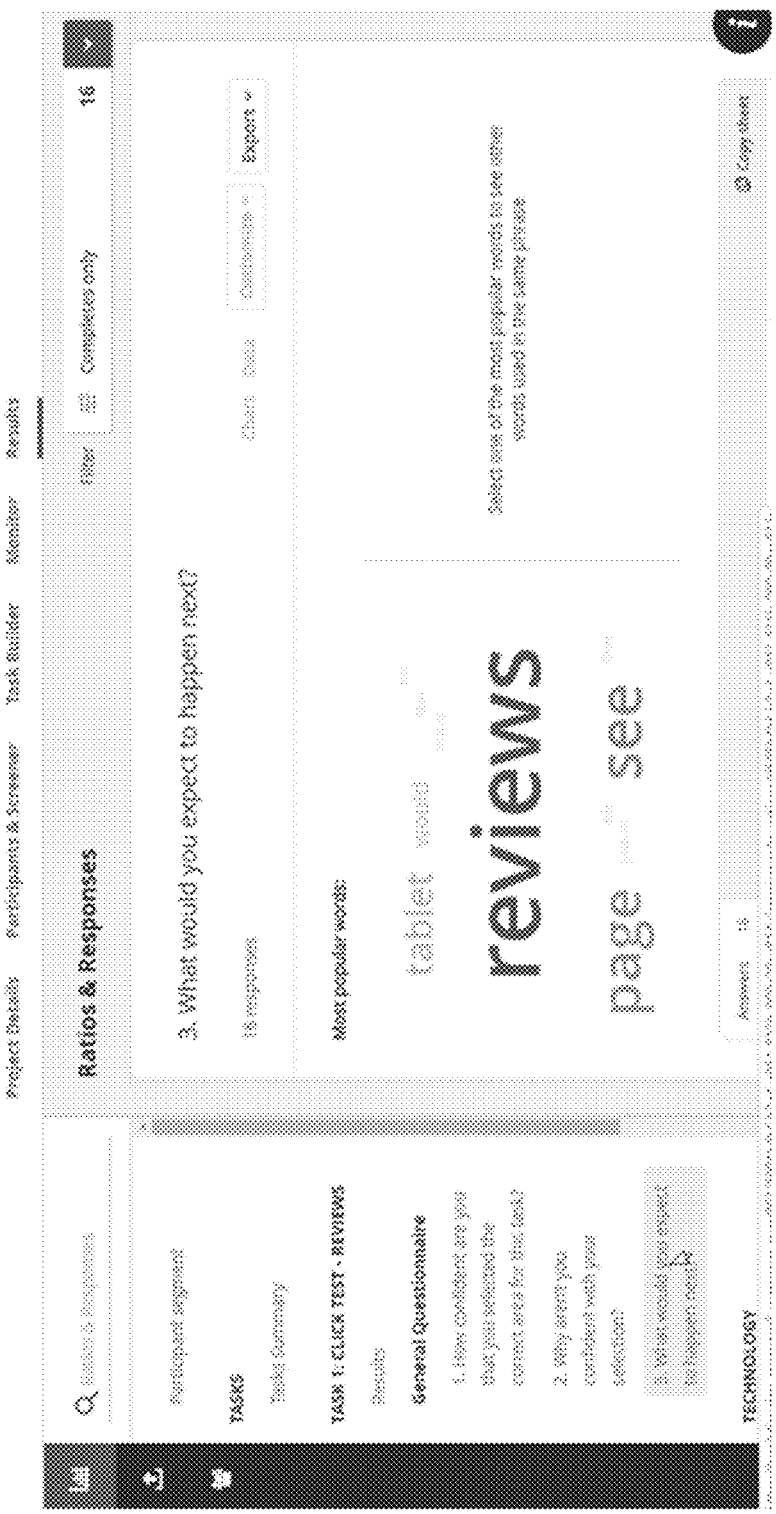

Likewise, specific data regarding each click area can be delved deeper into, as seen at 5000 of FIG. 50. This includes the percentage of total clicks occurring in each area, number/percent of the clicks that are first clicks in the given area, and the median time to the first click is likewise illustrated. Further, responses to the follow up questions may be presented to the user, as seen at 5100 of FIG. 51. This may be presented in chart form or as raw data. Moreover, additional, intuitive analysis of the questions is possible. For free-form answers, such as the question of 'what is expected to happen next' the system can allow the user to review each answer separately, or may generate an aggregate word cloud for the user, as seen at 5200 of FIG. 52.

Some portions of the above detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a virtual machine, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for a click test user experience study comprising:
    uploading a static image;
    selecting portions of the static image as answers;
    generating a prompt for a participant;
    presenting the prompt to the participant;
    displaying the static image to the participant in conjunction with the prompt;
    recording at least one location where, on the displayed static image, the participant clicks a cursor;
    measuring a delay between the prompt presentation and the participant clicking the cursor;
    generating at least one of a heat map and a click map of multiple participants responses to the prompt responsive to the recorded at least one location and the measured delay, wherein the heat map or the click map is populated at the at least one location where the participant clicked, and wherein a lower delay results in a first indicator type on the heat map and a longer delay results in a second indicator type on the heat map, and;
    comparing the at least one location to the selected portions to generate success metrics.

2. The method of claim 1, wherein the prompt is a question or instruction.

3. The method of claim 2, wherein the prompt is a question about what part of the static image evokes a particular emotion in the participant.

4. The method of claim 2, wherein the prompt is an instruction to navigate to a particular goal.

5. The method of claim 1, wherein the prompt is defined by a study author.

6. The method of claim 1, wherein the prompt is text.

7. The method of claim 1, wherein the prompt is an audio prompting.

8. The method of claim 1, wherein the heat map or the click map is populated at the at least one location where the participant clicked.

9. The method of claim 8, wherein a lower delay results in a darker population on the heat map and a longer delay results in a lighter population on the heat map.

10. The method of claim 8, wherein the heat map is presented as a negative image, and wherein the negative image is high contrast.

11. The method of claim 1, wherein the click map provides exact locations where the participant clicks the cursor, and wherein the click map is an aggregation of multiple participant click locations on the static image.

12. The method of claim 1, further comprising redirecting the participant to one of another static image, a question, or another usability test responsive to the at least one location the participant clicks the cursor, and wherein the redirecting the participant requires a combination of one or more locations the participant clicks the cursor.

13. The method of claim 1, further comprising enabling a client to configure at least one of another static image, a question, or another usability test responsive to at least one of the participant clicking the cursor on a specific location, and the participant clicking a combination of and/or locations.

14. The method of claim 1, wherein the click of the cursor includes any of a touchscreen input, and a stylus input.

15. A set of computer program instructions on a non-transitory computer storage product, when executed for performing a click test user experience study by executing the following steps:
uploading a static image;
selecting portions of the static image as answers;
generating a prompt for a participant;
presenting the prompt to the participant;
displaying the static image to the participant in conjunction with the prompt;
recording at least one location where, on the displayed static image, the participant clicks a cursor;
measuring a delay between the prompt presentation and the participant clicking the cursor;
generating at least one of a heat map and a click map of multiple participants responses to the prompt responsive to the recorded at least one location and the measured delay, wherein the heat map or the click map is populated at the at least one location where the participant clicked, and wherein a lower delay results in a first indicator type on the heat map and a longer delay results in a second indicator type on the heat map; and
comparing the at least one location to the selected portions to generate success metrics.

16. The computer storage product of claim 15, wherein the prompt is a question or instruction, and wherein the instruction to navigate to a particular goal.

17. The computer storage product of claim 15, wherein the heat map or the click map is populated at the at least one location where the participant clicked.

18. The computer storage product of claim 15, wherein a lower delay results in a higher visual representation on the click map and a longer delay results in a lower visual representation on the click map.

19. The computer storage product of claim 15, wherein the heat map is presented as a negative image, and wherein the negative image is high contrast.

20. The computer storage product of claim 15, wherein the click map provides exact locations where the participant clicks the cursor, and wherein the click map is an aggregation of multiple participant click locations on the static image.

21. The computer storage product of claim 15, further comprising redirecting the participant to one of another static image, a question, or another usability test responsive to the at least one location the participant clicks the cursor, and wherein the redirecting the participant requires a combination of one or more locations the participant clicks the cursor.

22. The computer storage product of claim 15, further comprising enabling a client to configure at least one of another static image, a question, or another usability test responsive to at least one of the participant clicking the cursor on a specific location, and the participant clicking a combination of and/or locations.

23. The computer storage product of claim 15, wherein the click of the cursor includes any of a touchscreen input, and a stylus input.

* * * * *